(12) United States Patent
Gunning

(10) Patent No.: US 11,917,066 B1
(45) Date of Patent: *Feb. 27, 2024

(54) SYSTEM FOR INTERACTING OBJECTS AS TOKENS ON A BLOCKCHAIN USING A CLASS-BASED LANGUAGE

(71) Applicant: Run Interactive, Inc., Marina Del Rey, CA (US)

(72) Inventor: Brenton John Gunning, Los Angeles, CA (US)

(73) Assignee: RUN INTERACTIVE, INC., Marina Del Rey, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/829,962

(22) Filed: Jun. 1, 2022

Related U.S. Application Data

(63) Continuation of application No. 17/305,591, filed on Jul. 9, 2021, now Pat. No. 11,398,911.

(Continued)

(51) Int. Cl.
 *H04L 29/06* (2006.01)
 *H04L 9/32* (2006.01)
 *H04L 9/00* (2022.01)

(52) U.S. Cl.
 CPC .......... *H04L 9/3213* (2013.01); *H04L 9/3236* (2013.01); *H04L 9/50* (2022.05)

(58) Field of Classification Search
 CPC ........ H04L 9/3213; H04L 9/3236; H04L 9/50

(Continued)

(56) References Cited

U.S. PATENT DOCUMENTS 10,362,103 B2    7/2019   Soni et al.
10,783,590 B1*   9/2020   Zhou .................. H04L 9/50

(Continued)

FOREIGN PATENT DOCUMENTS

EP    3432240       1/2019
WO    2017145006    8/2017

(Continued)

OTHER PUBLICATIONS

Aiken, A. The Cool Reference Manual. [online], 2000 [retrieved on Dec. 4, 2019.] Retrieved from the internet < http://theory.stanford.edu/-aiken/software/cool/cool-manual.pdf > 30 pages.

(Continued)

*Primary Examiner* — Evans Desrosiers
(74) *Attorney, Agent, or Firm* — SCHWEGMAN LUNDBERG & WOESSNER, P.A.

(57) ABSTRACT

In modern object-oriented programming, programs are written using typed objects like classes and instances that interact with one another via rules of composition, inheritance, encapsulation, message passing, and polymorphism. Some embodiments described herein can include a method for tokenizing such modern objects that maintains their interactive properties on a blockchain. It improves upon, and diverges from, the smart contract model used mainly on account-based blockchains today to create a generally-programmable token system that is native to UTXO-based blockchains, where individually-owned software objects interact with other software objects owned by other individuals. These tokenized objects are called jigs. Jigs, an abstraction like objects, enable applications to build their own digital assets that interact with other jigs from other applications. Jogs enable users to own their data as tokens and use their data independent of any one application's complete control.

20 Claims, 24 Drawing Sheets

Related U.S. Application Data

(60) Provisional application No. 63/058,762, filed on Jul. 30, 2020, provisional application No. 63/050,801, filed on Jul. 12, 2020.

(58) Field of Classification Search
USPC .......................................................... 713/155
See application file for complete search history.

(56) References Cited

U.S. PATENT DOCUMENTS

| | | | |
|---|---|---|---|
| 10,796,022 B2 | 10/2020 | Dassenno | |
| 10,839,386 B2 | 11/2020 | Kamalsky et al. | |
| 10,938,548 B2 | 3/2021 | Mercuri et al. | |
| 11,398,911 B1 | 7/2022 | Gunning | |
| 2002/0199034 A1* | 12/2002 | Beckett | G06F 8/34 719/328 |
| 2017/0103391 A1 | 4/2017 | Wilson, Jr. et al. | |
| 2018/0005186 A1 | 1/2018 | Hunn | |
| 2018/0097779 A1 | 4/2018 | Karame et al. | |
| 2018/0174255 A1 | 6/2018 | Hunn et al. | |
| 2018/0247191 A1 | 8/2018 | Katz et al. | |
| 2018/0285217 A1 | 10/2018 | Smith et al. | |
| 2018/0285996 A1 | 10/2018 | Ma | |
| 2019/0058581 A1 | 2/2019 | Wood et al. | |
| 2019/0079998 A1 | 3/2019 | Rush | |
| 2019/0095879 A1 | 3/2019 | Eyal et al. | |
| 2019/0164153 A1 | 5/2019 | Agrawal et al. | |
| 2019/0172026 A1 | 6/2019 | Vessenes et al. | |
| 2019/0188701 A1 | 6/2019 | Parsons et al. | |
| 2020/0005284 A1 | 1/2020 | Vijayan | |
| 2020/0348963 A1* | 11/2020 | Beberman | G06F 9/45508 |
| 2021/0011708 A1 | 1/2021 | Smith et al. | |
| 2021/0209596 A1 | 7/2021 | Ley | |

FOREIGN PATENT DOCUMENTS

| | | |
|---|---|---|
| WO | WO 2017 145006 | 8/2017 |
| WO | 2019105407 | 6/2019 |
| WO | WO 2019 105407 | 6/2019 |

OTHER PUBLICATIONS

Andrew Stone, "Bitcoin Cash Scripting Applications: Representative Tokens (OP_Group)", Oct. 16, 2017, 10 pages.

Craig Wright, "Turning Complete nBitcoin Script White Paper", Apr. 10, 2016, 15 pages.

Flavien Charlon, "Open Assets Protocol", open-assets-protocol/specification.mediawiki, Dec. 12, 2013, 8 pages.

International Search Report and Written Opinion for App. No. PCT/US19/47411, dated Jan. 17, 2020.

Killerstorm, "EPOBC_simple", May 12, 2015, https://github.com/chromaway/ngcccbase/wiki/EPOBC_simple, printed Apr. 21, 2021, 6 pages.

Y. Assia, et al., "Colored Coins whitepaper", 2012, https://docs.google.com/document/d/1AnkP_cVZTCMLIzw4DvsW6M8Q2JC0llzrTLuoWu2z1BE/edit, printed Apr. 21, 2021, 23 pages.

"U.S. Appl. No. 17/305,591, Non Final Office Action dated Oct. 25, 2021", 14 pgs.

"U.S. Appl. No. 17/305,591, Response filed Jan. 25, 2022 to Non Final Office Action dated Oct. 25, 2021", 15 pgs.

"U.S. Appl. No. 17/305,591, Examiner Interview Summary dated Jan. 28, 2022", 2 pgs.

"U.S. Appl. No. 17/305,591, Notice of Allowance dated Mar. 4, 2022", 15 pgs.

"U.S. Appl. No. 17/305,591, Notice of Allowance dated Jun. 1, 2022", 10 pgs.

"International Application Serial No. PCT US2019 047411, International Search Report dated Jan. 17, 2020", 3 pgs.

"International Application Serial No. PCT US2019 047411, Written Opinion dated Jan. 17, 2020", 5 pgs.

Aiken, A., "The Cool Reference Manual", [Online]. Retrieved from the Internet:URL: http: theory.stanford.edu -aiken software cool cool-manual.pdf, (2000), 30 pgs.

Assia, Y., "Colored Coins whitepaper", [Online]. Retrieved from the Internet:URL: https: docs.google.com document d1AnkP_cVZTCMLIzw4DvsW6M8Q2JC0llzrTLuoWu2z1BE edit, (2012), 23 pgs.

Charlon, Flavien, "Open Assets Protocol", open-assets-protocol specification.mediawiki, (Dec. 12, 2013), 9 pgs.

Killerstorm, "EPOBC_simple", [Online]. Retrieved from the Internet:URL: https: github.com chromaway ngcccbase wiki EPOBC_simple, (May 12, 2015), 6 pgs.

Stone, Andrew, "Bitcoin Cash Scripting Applications: Representative Tokens (OP Group)", (Oct. 16, 2017), 10 pgs.

Wright, Craig, "Turing Complete nBitcoin Script White Paper", (Apr. 10, 2016), 15 pgs.

* cited by examiner

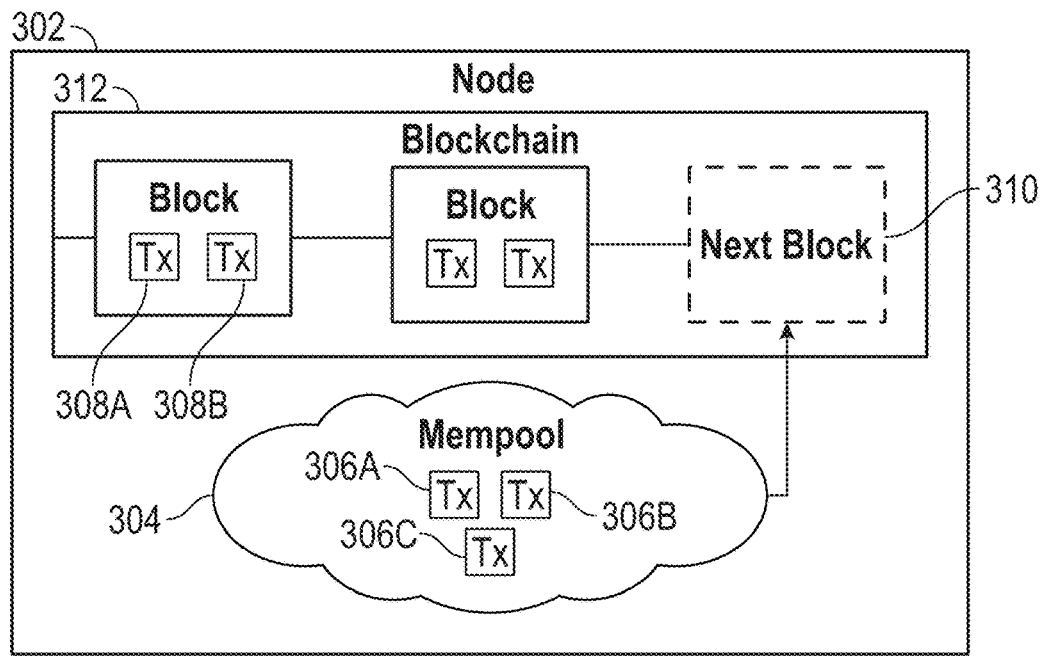
FIG. 3
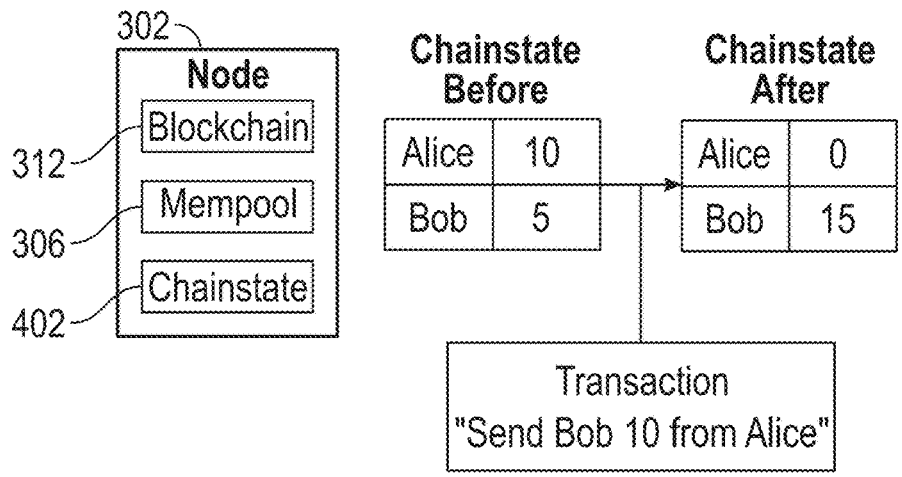
FIG. 4
FIG. 5

6 Depends On 4,3,2,1

Validation Rule : Sum of Inputs must be Greater than or Equal to the Sum of the Outputs

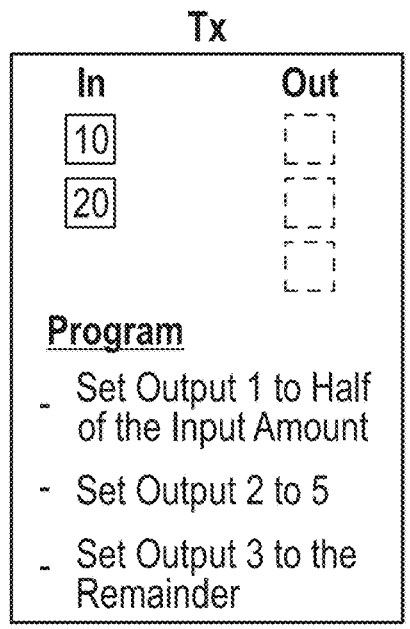
FIG. 23
State Cache
| TXID / Vout | | State |
|---|---|---|
| <TXID$_A$>/ 0 | → | { Amount: 10, Owner: <Owner1> } |
| <TXID$_B$>/ 1 | → | { Amount: 5, Owner: <Owner2> } |
| <TXID$_C$>/ 0 | → | { Amount: 15, Owner: <Owner3> } |
FIG. 24
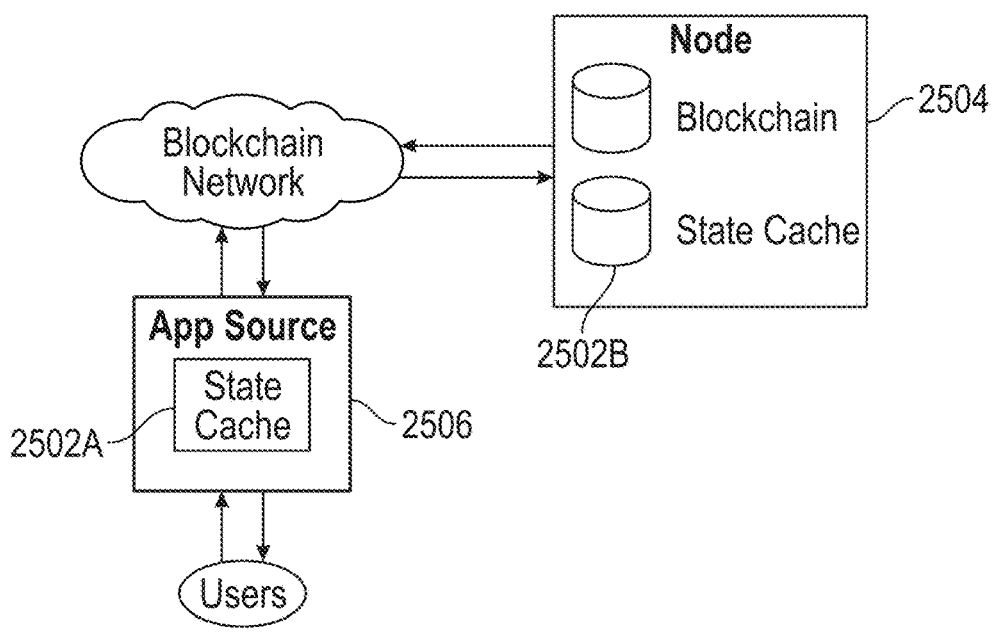
FIG. 25

Example 1

Example 2

Example 3

Example 4

SYSTEM FOR INTERACTING OBJECTS AS TOKENS ON A BLOCKCHAIN USING A CLASS-BASED LANGUAGE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application is a continuation of U.S. patent application Ser. No. 17/305,591, filed Jul. 9, 2021, and entitled "System for Interacting Objects as Tokens on a Blockchain Using a Class-Based Language," which claims the benefit of U.S. Provisional Application 63/050,801, filed Jul. 12, 2020, and entitled "Jigs: System for Interacting Objects as Tokens on a Blockchain using a Class-Based Language," and U.S. Provisional Application 63/058,762, filed Jul. 30, 2020, and entitled "Further Extensions to Jigs," the disclosures of which are considered part of this application, and are hereby incorporated by reference in their entirety for all purposes.

BACKGROUND

Field

Blockchains have many applications and they have become increasingly general-purpose over time to accommodate their growing list of use cases. The earliest application of a blockchain was to timestamp documents. Bitcoin in 2008 used a blockchain to record transactions in an electron cash system.

SUMMARY

Various implementations of methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

Some embodiments can include a blockchain computing system, comprising: a computer system having a processor and a memory, the computer system configured to: receive instructions to generate a class object; generate a class object; record the class object or instructions to recreate the class object onto a blockchain ledger; receive instructions to generate an instance of the class object; retrieve the class object from the blockchain ledger; process the class object to generate a first instance of the class object; and record the first instance of the class object or instructions to recreate the first instance of the class object onto the blockchain ledger.

In some embodiments, the class object comprises an object that defines characteristics for instances that are created for the class object.

In some embodiments, the characteristics include one or more functions for the corresponding instance.

In some embodiments, the characteristics include one or more properties for the corresponding instance.

In some embodiments, the properties include initial properties.

In some embodiments, the instance comprises an object that includes an occurrence of the class object, wherein characteristics of the instance is determined by the class object.

In some embodiments, the class object incudes a class type characteristic, and instances from the class object share the same class type characteristic.

In some embodiments, a blockchain associated with the blockchain ledger is transaction output based.

In some embodiments, the blockchain ledger is Unspent Transaction Output (UTXO)-based.

In some embodiments, recording the class object onto the transaction output based blockchain ledger comprises recording information needed to reproduce the class.

In some embodiments, the information needed to reproduce the class comprises source code for the class, properties for the class, and information on other source code that the class references to on the blockchain ledger.

In some embodiments, the computer system is further configured to determine an identifier for the recorded class object in order to identify the class object on the blockchain ledger.

In some embodiments, the computer system is further configured to: receive instructions from a first user to retrieve the first instance of the class object, wherein the instructions to generate the instance of the class object is from a second user; retrieve the class object from the blockchain ledger without prior authorization from the second user; and process the class object to generate a second instance of the class object, wherein the second instance initially shares the same characteristic of the first instance created by the second user.

In some embodiments, the instructions to generate the class object is from a first user, wherein the class object is only modifiable by the first user, wherein other users can reference the class object.

In some embodiments, the computer system is further configured to: receive instructions to generate a first class object extension of the class object; generate the first class object extension, wherein the first class object extension comprises characteristics of the class object and first characteristics separate from the characteristics of the class object; and record the first class object extension or instructions to recreate the first class object extension onto the blockchain ledger.

In some embodiments, the computer system is further configured to: receive instructions to generate a second class object extension of the class object; generate the second class object extension, wherein the class object extension comprises (1) characteristics of the class object and (2) characteristics separate from the characteristics of the class object and the first class object extension; and record the second class object extension or instructions to recreate the second class object extension onto the blockchain ledger.

In some embodiments, recording the class object or instructions to recreate the class object onto the blockchain ledger includes a token payment from a user providing the instructions to generate the class object, wherein the token payment is provided to one or more users assisting in the recordation of the class object onto the blockchain ledger.

In some embodiments, recording the class object or instructions to recreate the class object onto the blockchain ledger comprises performing a hash function on properties and a state of the class object or the instance, and recording the resulting hash value to the blockchain ledger.

In some embodiments, the computer system is further configured to: receive instructions to add a characteristic to the class object, wherein the characteristic includes a function to generate, from an instance of the class object, an instance of another class object; generate the function; record the function or instructions to recreate the function onto a blockchain ledger; receive instructions to perform the function onto the first instance of the class object; generate an instance of the other class object; and record the instance of the other class object or instructions to recreate the instance of the other class object onto the blockchain ledger.

In some embodiments, the computer system is further configured to: receive instructions to update the class object; update the class object based on the update instructions; record the updated class object or instructions to recreate the updated class object onto the blockchain ledger; and provide information of the updated class object to instances of the class object in order to provide an opportunity to update the corresponding instances.

In some embodiments, the computer system is further configured to: receive instructions to perform a function on the first instance of the class object; process the function on the first instance to generate an updated state for the first instance; and record the updated state of the first instance or instructions to recreate the updated state of the first instance onto a blockchain ledger.

In some embodiments, the computer system is further configured to: receive instructions to perform a function on the first instance of the class object; process the function on the first instance to generate an updated state for the first instance and a state for an instance of another class object; and record (1) the updated state of the first instance of the class object or instructions to recreate the updated state of the first instance of the class object and (2) the updated state of the instance of the other class object or instructions to recreate the updated state of the instance of the other class object onto a blockchain ledger.

Some embodiments include a method comprising: receiving instructions to generate a class object; generating a class object; recording the class object or instructions to recreate the class object onto a blockchain ledger; receiving instructions to generate an instance of the class object; retrieving the class object from the blockchain ledger; processing the class object to generate a first instance of the class object; and recording the first instance of the class object or instructions to recreate the first instance of the class object onto the blockchain ledger.

In some embodiments, the class object comprises an object that defines characteristics for instances that are created for the class object.

In some embodiments, the instance comprises an object that includes an occurrence of the class object, wherein characteristics of the instance is determined by the class object.

In some embodiments, a blockchain associated with the blockchain ledger is Unspent Transaction Output (UTXO)-based.

Some embodiments include a non-transitory computer storage medium storing computer-executable instructions that, when executed by a processor, cause the processor to perform the following method: receiving instructions to generate a class object; generating a class object; recording the class object or instructions to recreate the class object onto a blockchain ledger; receiving instructions to generate an instance of the class object; retrieving the class object from the blockchain ledger; processing the class object to generate a first instance of the class object; and recording the first instance of the class object or instructions to recreate the first instance of the class object onto the blockchain ledger.

In some embodiments, the class object comprises an object that defines characteristics for instances that are created for the class object.

In some embodiments, the instance comprises an object that includes an occurrence of the class object, wherein characteristics of the instance is determined by the class object.

In some embodiments, a blockchain associated with the blockchain ledger is Unspent Transaction Output (UTXO)-based.

BRIEF DESCRIPTION OF THE DRAWINGS

The above-mentioned aspects, as well as other features, aspects, and advantages of the present technology will now be described in connection with various aspects, with reference to the accompanying drawings. The illustrated aspects, however, are merely examples and are not intended to be limiting. Throughout the drawings, similar symbols typically identify similar components, unless context dictates otherwise. Note that the relative dimensions of the following figures may not be drawn to scale.

FIG. 3 illustrates an example node producing blocks containing transactions from users according to some embodiments.

FIG. 4 illustrates an example of the node in FIG. 3 for a transaction to send Bob 10 coins from Alice according to some embodiments.

FIG. 5 illustrates an example chainstate in account-based blockchains according to some embodiments.

FIG. 23 illustrates an example program using inputs to generate outputs according to some embodiments.

FIG. 24 illustrates an example of a state cache data structure keyed by the transaction ID and output index according to some embodiments.

FIG. 25 illustrates an example state cache that can be run on one or both of the nodes of the blockchain and the applications according to some embodiments.

DETAILED DESCRIPTION

Various aspects of the novel systems, apparatuses, and methods are described more fully hereinafter with reference to the accompanying drawings. The teachings disclosed may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different consumer goods and services industries. The detailed description and drawings are merely illustrative of the disclosure rather than limiting, the scope of the disclosure being defined by the appended claims and equivalents thereof.

Blockchains

Blockchains are a technology used by many different industries for many different purposes. The earliest use of a blockchain was to timestamp documents to ensure their authenticity. However, in 2008, Bitcoin was released and it used a blockchain in a new way: to record financial transactions immutably and publicly. This was the first practical peer-to-peer cash system on the Internet. Not long after, other inventors were inspired by Bitcoin to create new variations of this technology. One notable variation is Ethereum. The Ethereum blockchain introduced accounts and smart contracts which greatly expanded the programmability of the blockchain, at least in the eyes of developers at that time. By 2016, blockchains were used for reward tokens, decentralized organizations, crowdfunding, exchanges and more. Today there are applications in social media, gaming, law, finance, and healthcare. However, the general principles of blockchains, which will be discussed below, have remained the same.

Figure 1:
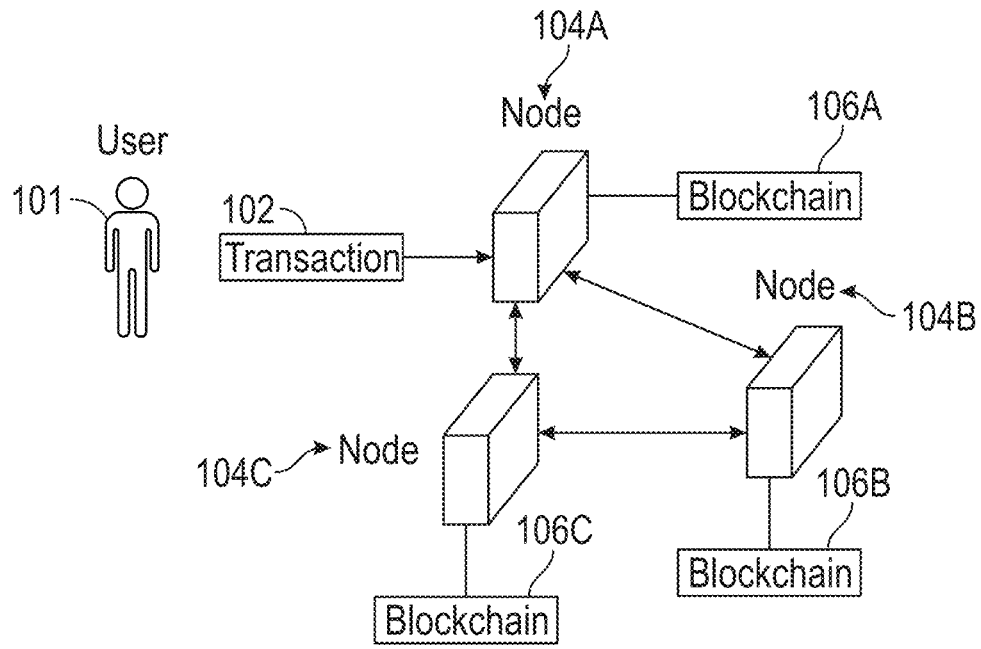
FIG. 1 illustrates an example of a blockchain transaction by a user via nodes and the blockchain ledger of the blockchain network according to some embodiments.

FIG. 1 illustrates an example of a blockchain transaction by a user 101 via nodes 104A, 104B, 104C and the blockchain ledger 106A, 106B, 106C of the blockchain network according to some embodiments. A blockchain system is a distributed network of computers, also called nodes, running node software that allows them to interact together to produce a data structure called a blockchain. The blockchain, also called the ledger, is the record of transactions (or events) relevant to that system. The blockchain grows over time as new transactions are added to it. With reference to Bitcoin, these transactions are financial transactions that expressed transfers of a digital coin, but transactions may represent anything important to users of the system, including "likes" on social media posts, market orders for exchanges, or updates to a legal contract.

In some embodiments, nodes on the network usually store a complete copy of the blockchain. Through a mechanism called consensus, they come to agree with other nodes about what this blockchain contains. Blockchain systems may be private or public, but the most popular blockchains today are public. In public blockchains, economics are essential to the operation of the system, and there is often a native coin or token used to incentive nodes on the network to continue to participate in the system.

Figure 2:
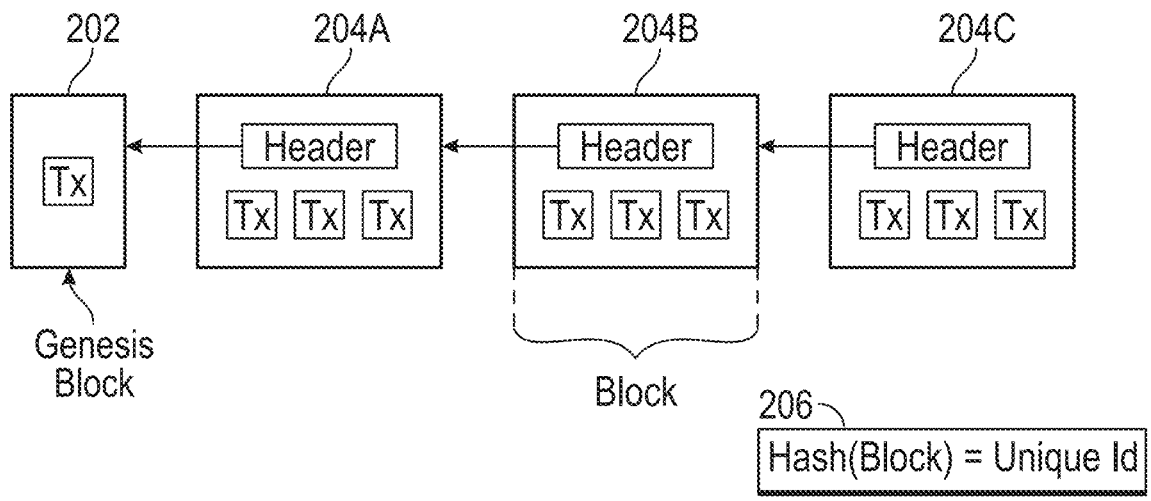
FIG. 2 illustrates an example of a blockchain data structure with a genesis block and other blocks linked in a time-ordered chain of data according to some embodiments.

FIG. 2 illustrates an example of a blockchain data structure with a genesis block 202 and other blocks 204A, 204B, 204C linked in a time-ordered chain of data according to some embodiments. The blockchain is a data structure made up of many individual blocks. Each block is itself a data structure which contains in it the set of transactions that happened over a certain window of time. Each block after the first links itself to its previous block, forming a time-ordered chain of data with all of the transactions relevant to the system. Nodes add new blocks to the end of the blockchain with new transactions at periodic intervals. Any block may be uniquely identified using a special number called its block hash 206.

In some embodiments, stored inside blocks are transactions in the form of transactions. Transactions are what cause the state of the system to change. Users create transactions and send them to nodes on the network, and nodes create blocks that include those transactions. Users may be individuals, applications, or services.

FIG. 3 illustrates an example node producing blocks containing transactions from users according to some embodiments. Different blockchain systems have different rules for what is allowed in a transaction. For example, one rule is that in order to send coins, the current owner of them may prove ownership with a cryptographic signature. systems have different rules for what is allowed in a transaction. When a user sends a transaction to a node 302, the node may first determine if the transaction follows those rules. If it does, that node first inserts the transaction into its mempool 304, which is a local data structure containing transactions that are not yet in a block. Transactions that are not yet in blocks are called unconfirmed transactions 306A, 306B, 306C. Transactions in blocks are called confirmed transactions 308A, 308B.

In some embodiments, through a process called consensus, nodes agree on blocks to be added to the chain. In general, one of the nodes can produce the next block 308 and add it to its local blockchain 312 and then notify the other nodes about their new block. A consensus mechanism is used between other nodes to accept or reject that block. On proof-of-work blockchains like Bitcoin, the consensus mechanism involves mining a rare number but there are other possible consensus mechanisms. Once a transaction is in a block accepted by other nodes, that transaction is considered confirmed. Changing historical blocks after they have been confirmed becomes increasingly expensive, which in practice makes the blockchain immutable.

FIG. 4 illustrates an example of the node in FIG. 3 for a transaction to send Bob 10 coins from Alice according to some embodiments. In addition to the blockchain and the mempool, each node also stores a special data structure called its chainstate 402. The chainstate is all of the current properties of the blockchain derived by processing transactions that are needed to enforce the system's ruleset. As an example, the chainstate could store the coin balances for all the users, to ensure that users do not send coins they do not have. In this example, when a transaction sends funds from one user to another, a node would need to update its chainstate to reflect the new balances.

In some embodiments, among the various blockchain systems, there are two major classes: Unspent transaction output (UTXO)-based blockchains and account-based blockchains. These two major classes refer to two different ways of structuring the chainstate. FIG. 5 illustrates an example chainstate in account-based blockchains according to some embodiments. Ethereum is an example of an account-based blockchain. In account based-blockchains, the chainstate is made up of a table 502 of accounts where each account stores the complete data owned by that account. Accounts represent actors on the system, which are often users, but may also be smart contracts. The prior example of having user balances being stored in the chainstate was an example of an account-based system, because there was a direct relationship between users and balances.

In some embodiments, the strength of account-based blockchains historically has been their intuitivity and flexibility. Accounts are an abstraction similar to bank accounts or website accounts which can store all the assets that its users care about. As an example, a single email account stores many emails for many different communications. Transactions in these systems are operations that change accounts and their assets within.

One problem with account-based systems is that in practice they have trouble scaling. One reason for this is that these systems are highly dependent on transaction ordering. Two transactions that change the same account might create very different chainstates depending in which order those transactions are executed. This makes these systems difficult to parallelize and scale more granularly than the account level. In practice, this means that users may wait for confirmations, and this leads to either slower apps or more centralized networks. Also, much of the complexity to scale these systems is pushed onto applications and users.

Figure 6:
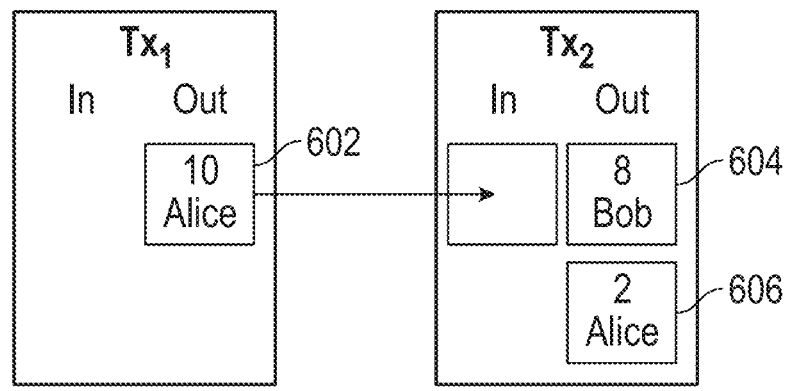
FIG. 6 illustrates an example transaction on the UTXO-based blockchain according to some embodiments.

In contrast, UTXO-based blockchains store their chainstate differently. FIG. 6 illustrates an example transaction on the UTXO-based blockchain according to some embodiments. Transactions in UTXO-based blockchains have inputs and outputs, which represent control over some particular data. In Bitcoin, that data would generally be coin amounts, but it could be other data too. A transaction spends outputs by including them as inputs, which effectively destroys them because they cannot be spent again. Spending an output requires proof of control over that output, such as a cryptographic signature, and this is used to own coins and other state in the system. For example, if Alice owns an output with 10 coins and she needs to pay Bob 8, she might create a transaction that spends her 10 coins as an input 602 and then generates two new outputs, one to Bob for 8 604, and another back to herself for 2 606. UTXOs stands for unspent transaction outputs, and refers to all of the outputs available to spend at the current time.

In some embodiments, transactions in UTXO-based blockchains are indeed more complex than account-based ones, but because outputs do not change and are only created or destroyed, the node chainstate is simpler and more scalable. The chainstate of the node is simply the set of unspent transaction outputs, or UTXOs, in the system. When a transaction is received by a node, the node removes the spent UTXOs from its chainstate and adds the new UTXOs created. Because users on UTXO-based blockchains do not have accounts, users use wallet software to manage the UTXOs they control and create new transactions.

Figure 7:
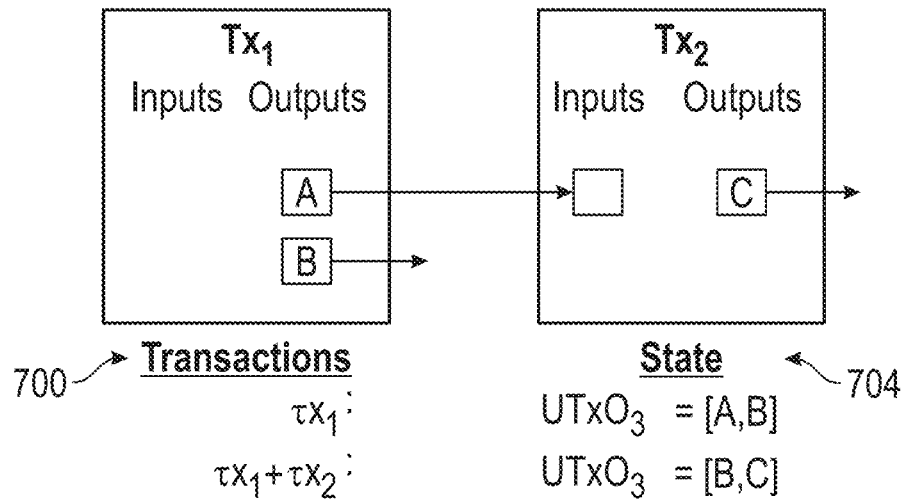
FIG. 7 illustrates an example of how UTXO-based transactions change the UTXO chainstate according to some embodiments.

In some embodiments, the strength of UTXO-based blockchains is their scalability. For nodes, the only global mutable state is the UTXO set which can be naturally sharded. UTXOs are also immutable and may be added and removed from the UTXO set, which allows UTXOs to scale similarly to functional programming paradigms used on large-scale systems. FIG. 7 illustrates how UXTO-based transactions change the UTXO chainstate according to some embodiments. For users, a single transaction describes everything about how the chainstate can change and this means that users don't need to wait for confirmations to know how a transaction 702 can affect the chainstate 704. However, one weakness of UTXO-based systems historically has been a lack of an intuitive programming model to develop complex applications and tokens upon, and thus most smart contracting applications have been built on account-based blockchains.

In some embodiments, there are some general concepts in cryptography used on blockchains. A private key is a large number that is randomly generated, kept secret, and used to own assets. The holder of a private key can generate from it a public key that may be shared with others. The public key allows other users to send them assets or messages, similar to how a mailing address allows others to send you mail. The holder of the private key alone however can generate a signature of some data like a transaction and this signature proves to others that he holds the private key for a corresponding public key. Signatures are how users prove that they own assets.

In some embodiments, there is also a concept of a cryptographic hash. A hash is a small piece of data that is deterministically generated from some other, usually much larger, data, which is called a preimage. The hash is like a fingerprint of the preimage. Hashes are used on blockchains to identify data and sometimes as a source of randomness. The function that generates the hash is called a one-way function because the preimage cannot be regenerated from the hash. Hashes are also used to prove the existence of data without revealing that data until a later point in time.

Terms

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Jig: Jig can include an object owned by a blockchain that may interact with other jigs. Specifically, a jig can include an object that may be a class, an instance, a function, or another software component, stored on and locatable within a blockchain system, having state and/or behavior, having an owner who solely may change that object, having a type that allows it to be grouped with other jigs of its kind, and/or having the capability to interact with other jigs through rules of object-oriented programming and according to its behavior. Jigs may also interact with, reference, and call methods on other jigs. For example, an instance jig may store a reference to its class jig, from which it acquires its behavior, and a class jig may have methods which its owner may call to change its state, which then affect all instances of the jig.

Instance: an instance can include an object that is a concrete occurrence of a more general class, also called its type, whose behavior is partially if not completely determined by that class. For example, a button on a website having a specific location, color, and/or other state may be an instance of a more general Button class, from which the general behavior of what happens when a user clicks a button instance is defined. In code, including certain examples of code segments herein, instance objects are usually named starting with a lower-case letter. The instances of a certain class can be of the same type. For example, the instance can include a type characteristic that can be the same for other instances derived from the same class.

Type: type refers to the class that the object was instantiated from.

Class: a class can include an object whose code defines the behavior for its instances. Classes often extend other classes to form hierarchies of types, for example every Car class being an extension of a Vehicle class. Classes themselves are also objects and have their own behavior and state, and changes to the state of a class may affect its instances. In some object-oriented programming environments where everything is an object, class objects themselves may also be instances of other more general class objects, which is its type.

Blockchain System: blockchain system can include a distributed system that records transactions in a shared ledger using a blockchain data structure that grows over time. Different blockchains can have different rules for what is considered valid or invalid and how the ledger may change. Users can interact with blockchain systems to transact with assets they own.

Transaction: transaction can include a data structure for an event for a blockchain system that changes the state of that system. For example, a transaction might send coins from one user to another, or call a function on a smart contract. The blockchain system can enforce rules on transactions to determine whether they are valid or invalid. One common rule requires users creating transactions to provide cryptographic proof of their identity.

Unspent Transaction Output (UTXO): UTXO can include a specific piece of data on a blockchain available to be consumed in a transaction. UTXOs can have a specific owner who is allowed to use that UTXO and may be thought of as individual property, like digital dollar bills. For example, in Bitcoin the UTXOs store the coin amounts and their owners. The term UTXO is short for unspent transaction output, because at a technical level UTXOs are structured as outputs of transactions, outputs which have not yet been spent in another transaction as inputs. UTXOs are a defining characteristic of UTXO-based blockchains, of which Bitcoin, Litecoin, and Cardano are examples.

Chainstate: A data structure in the node software of the blockchain system that is used to enforce the rules of the system, and is derived from all the transactions of the blockchain. As an example, in a simple account-based blockchain the chainstate might store the balances for every user, which is used to check and enforce whether a user is allowed to send a certain amount of coins. Different blockchain systems have different structures for the chainstate. In account-based systems, it is often a state trie, and in UTXO-based systems, it is often a UTXO-set. In both cases though, a node cannot check whether an arbitrary transaction is valid without it.

Consensus: Consensus can include the process of different computers coming to agreement about data in a distributed system. Blockchain systems usually have a consensus system that requires computers to prove they made an investment into the system in order to be trusted by other computers, such as proof-of-work in Bitcoin or proof-of-stake in Cardano. However, these proof-based systems are only one form of consensus which is useful when there is little trust, and consensus systems often take less-costly forms when there is some partial trust between the participants.

Layer 1: A blockchain system that determines whether a transaction is valid or invalid at a basic level and confirms and stores those transactions into blocks. Layer 1 systems usually use a highly secure consensus system based on proof of investment, allowing them to form a foundation for other distributed systems on top of them. Bitcoin is an example of a Layer 1 system.

Layer 2: A distributed system built on top of a Layer 1 blockchain, where the Layer 1 system performs enough consensus to allow Layer 2 to work, and Layer 2 adds new rules to the system that Layer 1 does not enforce. Layer 2 systems often are less expensive to use and deploy than building an entirely new Layer 1, because they can piggyback off the Layer 1 consensus system. Layer 2 data may exist outside of the Layer 1 system, such as the Lightning network, or it may exist inside of the network, such as with Colored Coins. However, in both cases a separate piece of software must be used to enforce the Layer 2 ruleset that is distinct from the Layer 1 software.

Token: A digital asset with a specific owner. The term token is not limited to digital coins, and also includes other digital property, such as game items, social media posts, and private data. When tokens are owned in a blockchain system, the blockchain system ensures that the ownership is secure, and that the owner may use that asset according to certain rules. The idea of tokenizing an object, whether that object is physical or digital, is the process of recording ownership of that object on a blockchain.

Colored coin: A reinterpretation of a coin on a Layer 1 UTXO-based blockchain as some other asset in a Layer 2 system. This would be similar to stamping dollar bills and using those stamped bills as coupons for a restaurant. Colored coin systems have a ruleset for what is a valid token that is in addition to the rules that the base blockchain provides. For example, in the stamped bill example, an incorrectly stamped bill might not be accepted as a coupon by the restaurant. These additional rules, called the protocol, are defined in a special Layer 2 software library.

Smart contract: A program stored and executed on a blockchain system that has both state (data) and behavior (code), and which any user of that blockchain system may interact with. The author of a smart contract writes code to determine which users may call the smart contract, what they may do, and how the data changes as a result. As an example, one popular smart contract on Ethereum is ERC-20. ERC-20 stores numerical balances of tokens for its users as data and contains behavior that allows users to send their tokens to other users. The term smart contract has other definitions too, but the preceding definition specifically describes an Ethereum-style smart contract, which is the most popular type today and is also the type referred to in this document.

Reference: A pointer to another software component, which is usually an object or piece of data. References might take various forms, but often they are either a memory address to a component on the same machine, or a URL to a component on a different system. What separates an object reference from an object value is that an object reference does not contain the actual information about that object. However, through a process called lookup a reference may be converted into a value to then be used or manipulated. References are commonly used in object-oriented programming to identify objects and pass them around and even store them in other objects.

Hash: A short string that deterministically identifies a much larger piece of data, generated by passing that larger data into a special hash function configured for the system. Hashes may be used to uniquely identify data of arbitrary size on a blockchain, like transactions and blocks.

Tokens

In some embodiments, tokens are digital assets owned by individuals and stored on a blockchain. They may represent tickets, shares, game items, social media data, votes, and more. Sometimes these digital assets have a physical twin such as a piece of artwork, but other times they are purely digital. Sometimes these assets have an issuer that redeems the token, such as an event venue for a ticket, but other times there is no redeemer. What is common between tokens is that they are each unique and owned by someone.

In some embodiments, tokens may be fungible or non-fungible. Fungible tokens are assets which can be transferred and combined with other tokens, such as currency, shares, or reward points. Non-fungible tokens, or NFTs, are unique assets that exist on their own, such as a specific sword in a game, a social media post, or a digital pet.

Figure 8:
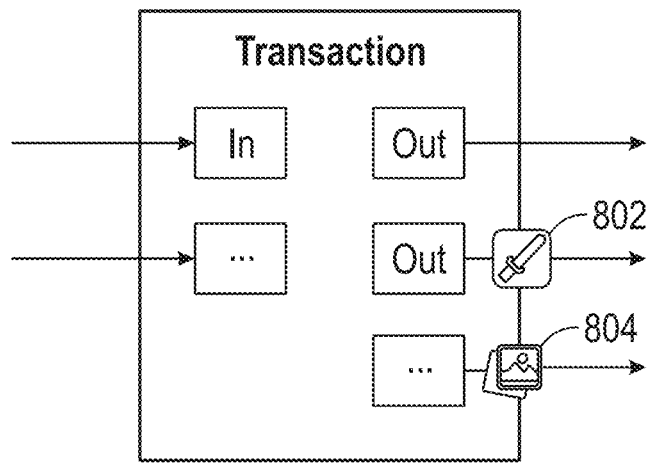
FIG. 8 illustrates an example of a transaction where the output includes colored coins according to some embodiments.

FIG. 8 illustrates an example of a transaction where the output includes colored coins 802, 804 according to some embodiments. Outputs in a UTXO-based blockchain designed for money, like Bitcoin, may also be used to represent simple tokens. This may be accomplished by reinterpreting coin outputs to mean ownership of other assets, in the same way that you could stamp a dollar bill with a message saying that the holder of this dollar bill may redeem it for an item at a store. This approach was called colored coins because the native coins of the blockchain are metaphorically colored to have a new meaning. One advantage of using an existing UTXO-based blockchain as a backbone for an auxiliary token system like colored coins is that the underlying blockchain can ensure various properties about the tokens including ownership and tracing that otherwise would otherwise need to be recreated in a separate blockchain for those tokens with likely less security.

In some embodiments, colored coin token systems are sometimes called Layer 2 or L2 systems because they require a second layer of validation to reach consensus with other parties interested in the tokens. In L2 token systems, the base blockchain enforces simple rules on transactions, such as ownership and correct structure, but a second ruleset called the token protocol describes the L2 rules for the tokens, which is implemented by a software called a token library that runs outside of the node. In this way, the base blockchain is able to scale independent of the token systems built on top of it. However, because the base layer does not validate all of the rules of the L2 token system, the blockchain may include transactions that are valid in L1 but invalid in L2, so there is generally a rule that if a particular UTXO is invalid according to L2 system, the L2 token is either entirely invalidated or its most recent action cancelled.

Figure 9:
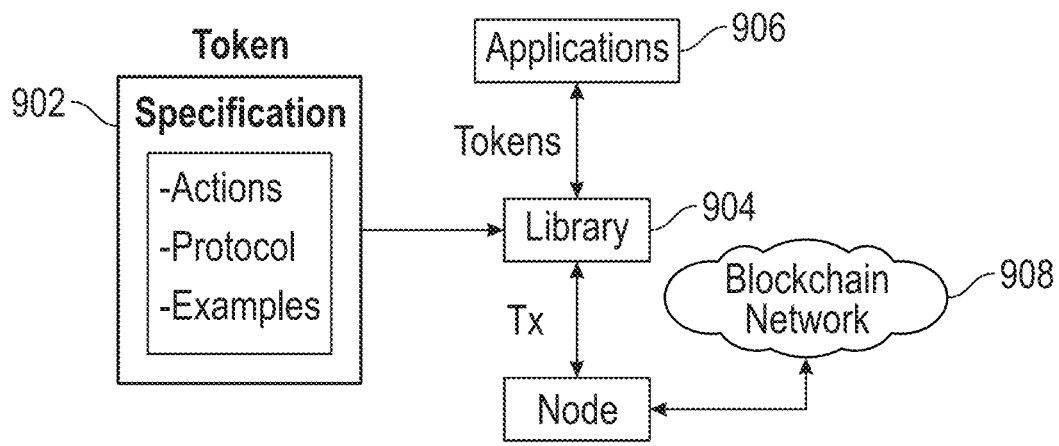
FIG. 9 illustrates an example relationship between token specification, library, application, and the blockchain according to some embodiments.

FIG. 9 illustrates an example relationship between token specification 902, library 904, application 906, and the blockchain 908 according to some embodiments. There are many colored coin systems each with different features. Applications use a token library to interpret UTXOs as tokens and to create new token transactions. Applications may also run a blockchain node, or connect to a third-party service that does, in order to discover relevant token transactions.

In some embodiments, the token protocol describes the possible actions allowed in the token system and how those actions are encoded in transactions on the blockchain. Possible actions may include minting tokens, setting metadata, sending tokens, or consuming tokens. A specification is usually used to produce the token library that is used by applications. There is generally some special data in every token transaction meant for the token library to interpret the UTXOs as tokens. For example, this special data might describe that output #3 has 5 tickets to see a particular movie. This data may be stored in the colored coin outputs themselves or in a separate special output, sometimes called the OP_RETURN output, that only serves to store this L2 metadata.

Figure 10:
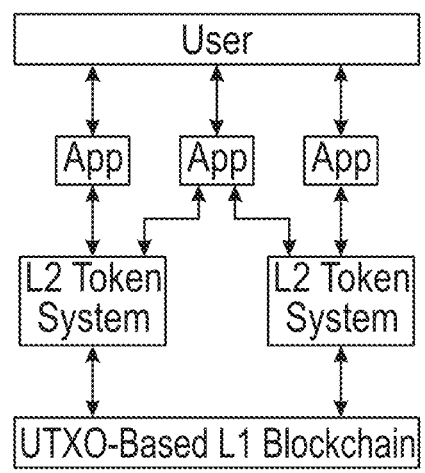
FIG. 10 illustrates an example token system according to some embodiments.
Figure 11:
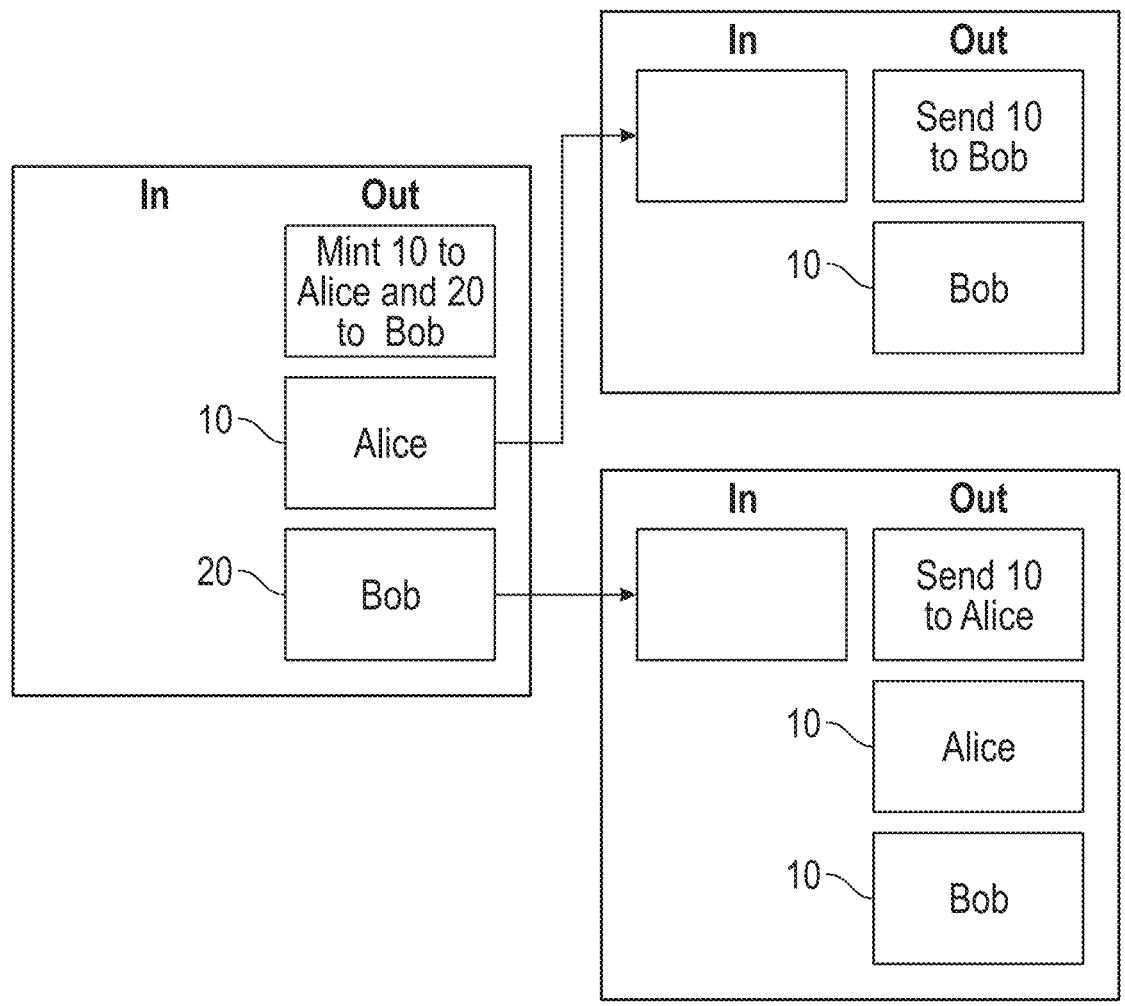
FIG. 11 illustrates an example SLP token system applied in example transactions according to some embodiments.

In some embodiments, one example of a Layer 2 Token System is Simple Ledger Protocl (SLP) which is a very simple token system that demonstrates the idea of colored coins. It is being used on Bitcoin Cash to represent numeric amount tokens. FIG. 10 illustrates an example token system according to some embodiments. FIG. 11 illustrates an example SLP token system applied in example transactions according to some embodiments. SLP has been used for virtual shares, reward points, and in-game currencies. The protocol specification describes several different transaction templates that may be used to define, mint, send, and attest to tokens on top of an existing UTXO-based blockchain. There is also a token software library that creates and loads these tokens by parsing transactions and it implements all of the rules of the specification. Tokens in SLP are owned by having control over certain bitcoins that have special meaning in this protocol, called colored coins. Every SLP transaction also includes a special metadata in an OP_RETURN output to describe which actions were performed. The example above shows a token being minted to two users in one transaction, and then those two users sending their SLP tokens in two different transactions. This is the most common use case for SLP. However, SLP tokens are not programmable in a general-purpose way because the token protocol only describes very specific actions that users may perform.

Figure 12:
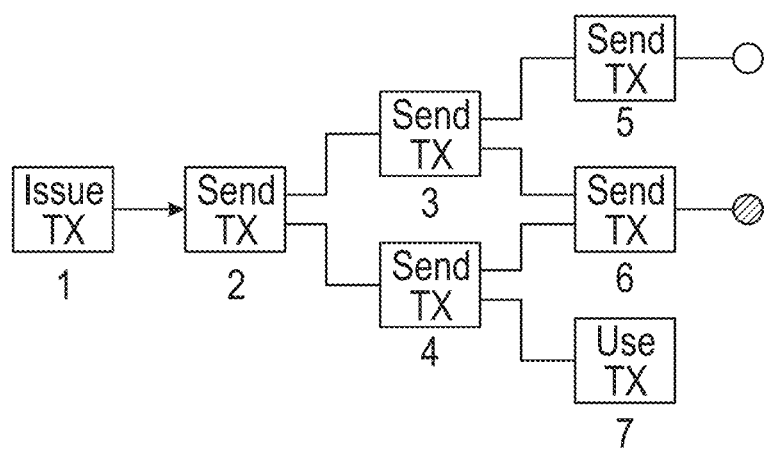
FIG. 12 illustrates an example of back validation where transaction 6 depends on transactions 4, 3, 2, and 1 according to some embodiments.

In some embodiments, colored coin token systems have different scaling properties than native coins. If a user receives a colored coin token they know nothing about, their token library has to back-validate all of the transactions that led to the current transaction containing the token. FIG. 12 illustrates an example of back validation where transaction 6 depends on transactions 4, 3, 2, and 1 according to some embodiments. This back-validation process checks that every preceding transaction follows the rules of the L2 token system. The longer the history, the more validation is required. This is of course a scaling bottleneck and an attack vector. There are techniques to prove that a token's history is valid without needing to back-validate, but these techniques have not been applied yet to L2 token systems and it's not clear that they can be able to scale for a general-purpose token system. Therefore, another approach to scaling L2 tokens is called forward-validation.

In some embodiments, with forward validation, applications run special node software that performs validation on new token transactions as they are received by the blockchain network and cache the results. Applications and services generally, not users, would run this forward validation software because it requires processing the blockchain in real-time. The main downside of forward validation is that users must trust the applications running these nodes to tell them accurately about the state of their tokens. While users maintain ownership over the assets via the UTXO, if the application software has a problem, or if there is an attack on the server, a user's token state might be misrepresented to the user, potentially allowing the destruction of their tokens when they are used. This makes users less sovereign over their assets and tokens less interactive between applications. For both scaling and sovereignty reasons, it was believed that colored coin approaches were less desirable than tokens implemented in Layer 1.

In some embodiments, there are other kinds of token systems besides the colored coin approach described above, such as metacoins and Layer 1 tokens, but all early token systems were like swiss army knives: they could do a few things well but struggled to generalize their applications beyond a few use cases. It wasn't until the introduction of smart contracts that blockchains supported the general programmability of tokens.

Smart Contracts

Figure 13:
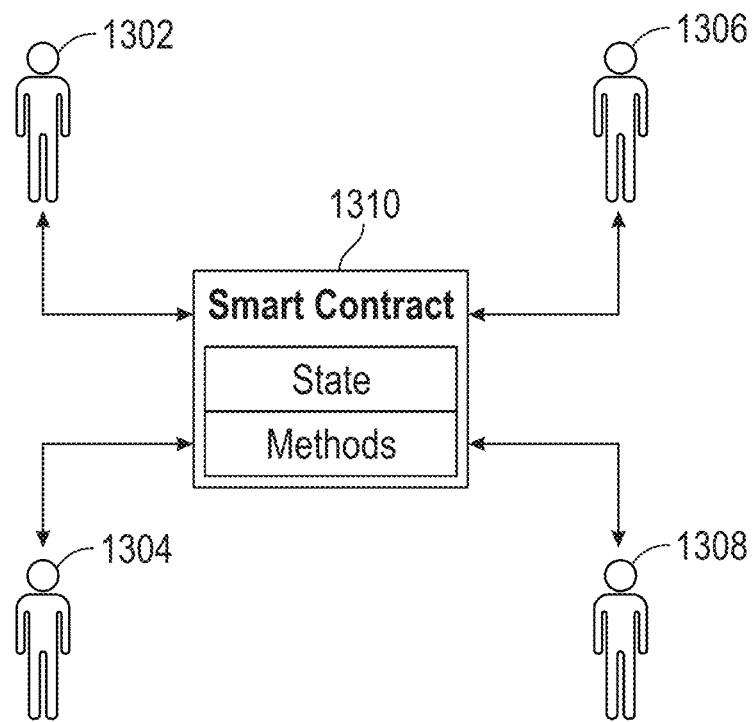
FIG. 13 illustrates an example of many users interacting with shared smart contracts according to some embodiments.

FIG. 13 illustrates an example of many users 1302, 1304, 1306, 1308 interacting with shared smart contracts 1310 according to some embodiments. In this embodiment, a smart contract in an account-based blockchain is an object stored on the blockchain that many different users call methods on to update. The code for the smart contract enforces what kinds of updates are possible. Nodes run the code for the smart contract and store its state in their node chainstate. Users call methods on smart contracts by sending transactions to nodes that include their authentication and the methods they wish to call. Generally, smart contract transactions include the following properties:

Sender—The account address or public key performing the action

Signature—Proof of the sender's identity

Target—The target smart contract

Action—Usually the method and arguments to call on the smart contract

In some embodiments, this data may be encoded in various ways and may also include additional information like the nonce, the gas price, and more. The action may also be a special deploy action for when a smart contract is first being created. When a node receives a method call transaction, it runs the method on the smart contract which updates the contract's state. The code for the smart contract determines what methods may be called and how the object can change by calling those methods. Smart contracts may be programmed for many applications.

Figure 14:
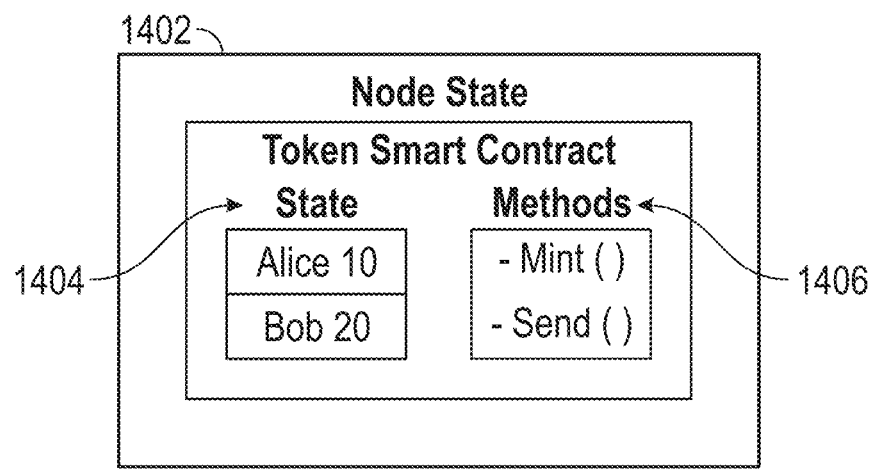
FIG. 14 illustrates an example smart contract that include objects with states and methods according to some embodiments.

FIG. 14 illustrates an example smart contract 1402 that include objects with states 1404 and methods 1406 according to some embodiments. The most popular use case for smart contracts is to create and store fungible tokens. For example, a smart contract may store the numeric token balances for all its accounts and its methods may allow accounts to transfer tokens from one to another. The code for the smart contracts protects that only the owners of the tokens being sent may send those tokens.

Figure 15:
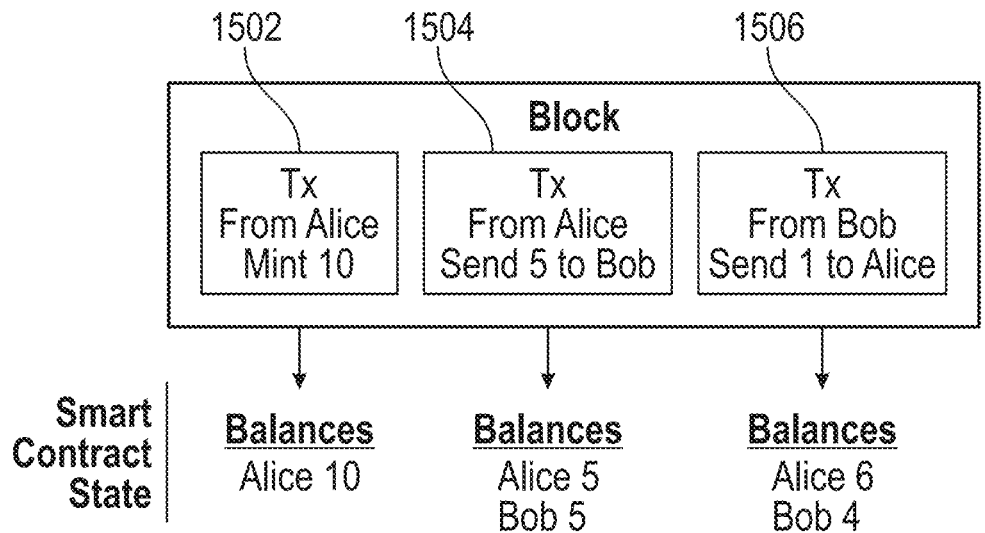
FIG. 15 illustrates example transactions from users to update smart contracts according to some embodiments.

FIG. 15 illustrates transactions from users to update smart contracts according to some embodiments. First Alice mints 10 tokens to herself 1502. Then she sends 5 to Bob 1504 and Bob acquires a balance of 5. Finally, Bob sends her back 1 token. 1506. These updates are all happening on a single smart contract. A single smart contract then controls the tokens and how they interact.

In some embodiments, conceptually, a smart contract is a shared resource. Unlike tokens, the smart contract is not exclusively owned by any single user and any user in theory may call methods on it. The code for the contract determines which users may call which methods, but the nodes have to run the code to enforce that. It is possible to program a smart contract which has a single owner but this is not common nor the default. Security therefore needs to be designed in, in comparison to tokens which have a specific owner. Smart contracts are usually written in a domain-specific language (DSL) on their blockchain. The original contract code may be compiled down to Virtual Machine (VM) bytecode that the blockchain nodes execute.

In some embodiments, users may interact with each other through smart contracts and smart contracts may also call methods on other smart contracts. However, compared to objects and classes in modern programming languages, smart contracts are more restrictive in their possible interactions. This is because the class for a smart contract is itself an instance. While some smart contract languages provide syntactic sugar to simulate inheritance, polymorphism, type checking on instances, contract classes are not independent objects that can be passed around, owned, and updated as objects themselves. For example, smart contract classes do not have state and behavior the same way that a class in normal object-oriented programming might have state and static methods. Because of this, upgrading a smart contract for example is more complex than it would be if the class were its own updatable object.

In some embodiments, smart contracts generally run on account-based blockchains because they require global state. This global state needs to be stored somewhere and it is intuitive to store it in a smart contract account on an account-based blockchain. Individuals may also have their own data and assets in a smart contract and this user-specific data is stored in user accounts. Therefore, the data for a smart contract may be stored across several accounts. The smart contract is the code that links this separate data together. Achieving similar functionality on a UTXO-based blockchain would require a richer interaction model between UTXOS. While some attempts have been made at this, UTXO-based blockchains still don't have a standard model for generally programmable assets that is as native to UTXO-based blockchains as smart contracts are to account-based blockchains. What is needed is a new model for programmable assets on UTXO-based blockchains that does not require global mutable state and still allows for rich interactions between user assets like smart contracts.

Overview

Figure 16:
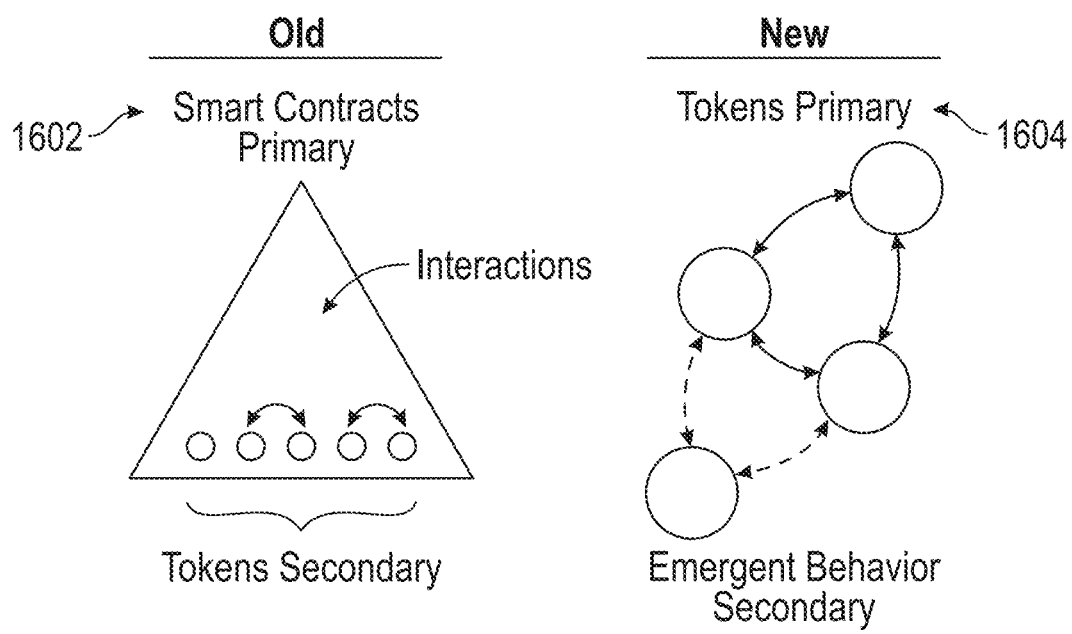
FIG. 16 illustrates example differences between the architecture of traditional systems and the JIG system according to some embodiments.

At a high-level, four new embodiments and then extensions to, and applications of, are described herein:
1. Jig Objects—A new kind of conceptual object that improves upon smart contracts
2. Executable Transactions—A modified UTXO-based transactions to enable interactivity between outputs
3. Jig Blockchain System—A system and protocol to relate jig objects to tokens using executable transactions
4. Jig Library—A software library for applications that implements the jig blockchain system and executable transactions as colored coins on a UTXO-based blockchain.
5. Extensions—Embodiments that extend the capabilities of the jig blockchain system
6. Applications—Embodiments for specific applications of the jig blockchain system FIG. 16 illustrates differences between traditional systems and the JIG system according to some embodiments. In some embodiments, in account-based blockchains 1602, smart contracts are the main way to create tokens that interact with other tokens in complex applications. Smart contracts store individually-owned tokens and define their possible interactions. Smart contracts may be thought of as fiefdoms and tokens live inside those smart contracts. The JIGS system 1604 flips this inside out. Instead of there being a smart contract that manages tokens, the JIGS system bakes the logic for how tokens interact into the code for each and every token to make tokens the primary objects, which can work naturally in a UTXO-based blockchain system.

In some embodiments, tokens can be more than just numerical assets. Tokens can become powerful programmable software objects that interact with other objects. Complex behavior like what smart contracts do today can emerge out of individual interactions between tokens. That is the goal and these programmable interactive tokens the disclosure calls jigs. Jigs may be represented and owned on UTXO-based blockchain using both L1 and L2 systems.

Figure 17:
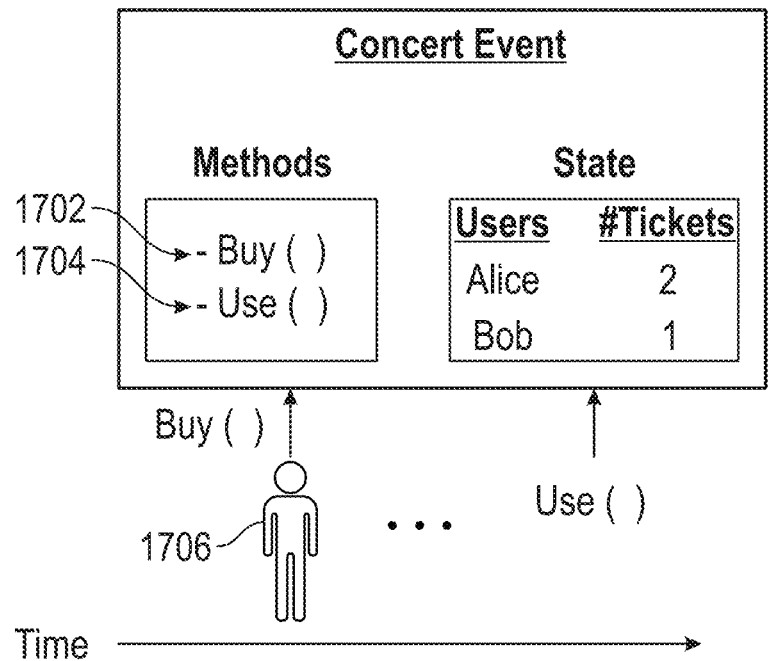
FIG. 17 illustrates an example of a smart contract system that allow users to buy tickets to an event according to some embodiments.

FIG. 17 illustrates an example of a smart contract system that allow users to buy tickets to an event according to some embodiments. If the application uses the smart contract, the application would create a smart contract with a buy( ) method 1702 that allows users to buy tickets. Users 1706 would call the buy method and send some money to the application's account and in return an entry in the smart contract would record that the user now owns a ticket. Later, a user could call another method to use their ticket, such as via a use ( ) method 1704, and the smart contract would store a record that the ticket was used.

This approach is simple to understand but there are a few disadvantages with it. First, every user interacts with the same smart contract, creating a scaling bottleneck on the blockchain. Second, because every user interacts with the same smart contract, the smart contract code needs to authorize every user and their actions. Security may be designed in rather than included by default, which creates a risk and opportunity for hackers. Third, the tickets only exist in the smart contract, so this limits user sovereignty over their data and their interactions with other smart contracts. For example, a review app might want users to review an event they've attended only if they could prove they owned a ticket. If the smart contract doesn't support the necessary functionality to prove ownership, then the users and third-party applications cannot do this.

Figure 18A:
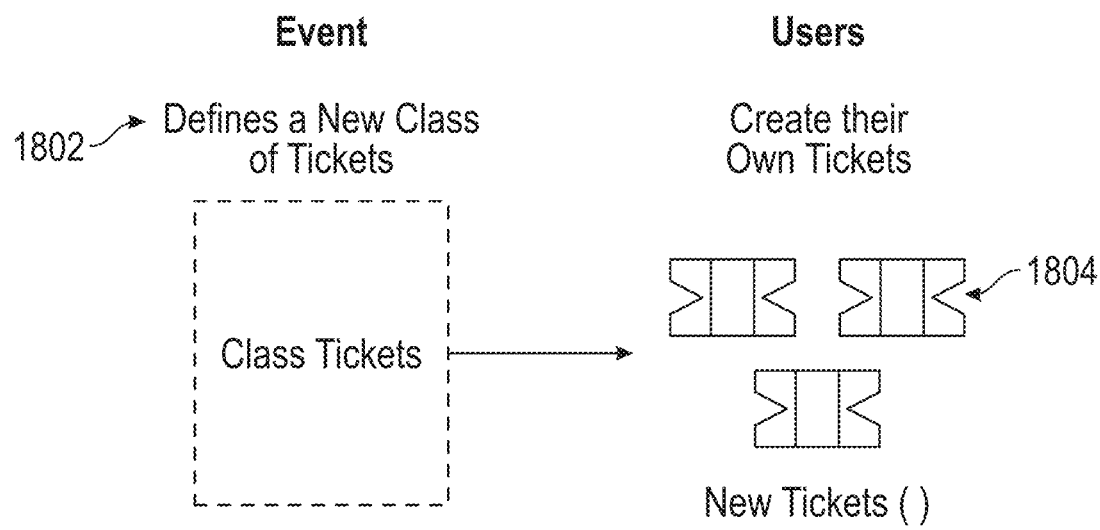
FIG. 18A illustrates an example of a JIGS approach to allowing users to buy tickets to an event according to some embodiments.

FIG. 18A illustrates an example of a JIGS approach to allowing users to buy tickets to an event according to some embodiments. Instead of the concert creating a smart contract, the concert might define a new class of tickets for their event 1802. Users could create their own tickets 1804 and own them individually. Tickets are tokens owned by the users. However, whenever the user creates a ticket from the Ticket class, a payment may be sent to the application that also serves as a notification of the purchase. This would be baked into the code the concert defined. Therefore, the only way a user could own a ticket is if that payment was made. There is no central smart contract on the blockchain that creates a scaling bottleneck here. Users would own their own tickets at all times and they would use them independent of the concert application in third-party apps. If the concert wishes to limit the number of tickets, they can disable creation of new ticket instances once the number of tickets is reached by upgrading the class code, and this logic can live off-chain. It is possible to do refunds, revokes, and more using interactive tokens rather than smart contracts.

This reversal in thinking around digital assets, from top-down planning in smart contracts to bottom-up interactions through tokens, and a mixture between on-chain and off-chain logic to scale, is the general idea behind building with jigs.

Figure 18B:
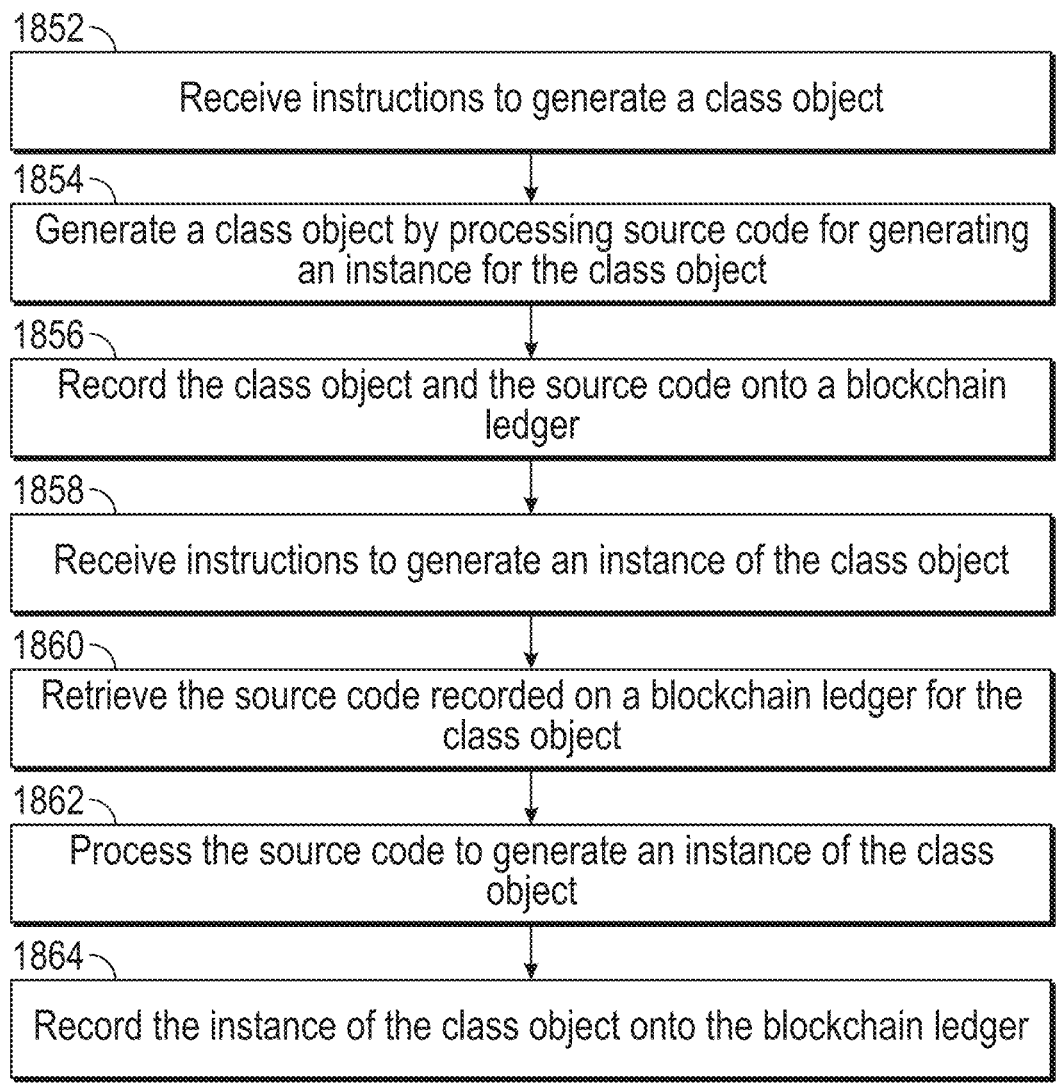
FIG. 18B illustrates an example flow diagram for generating a class object and an instance thereof.

FIG. 18B illustrates an example flow diagram for generating a class object and an instance thereof. At block 1852, the jig system can receive instructions to generate a class object. For example, the class object can be a class for a virtual egg object. For example, the class object can include egg properties, such as the size, weight, a hatch function, etc for the virtual representation of an egg. The jig system can receive such instructions via a command prompt, a user interface button, and/or the like. Instances of the egg class object can include initial states and properties of the egg class object.

At block 1854, the jig system can generate a class object by processing source code. The source code comprises code for generating an instance for the class object. For example, source code can include at least a portion of the instructions that the user inputted via the command prompt. The jig system can compile the source code to object code in order to process the source code to generate the instance of the class object.

At block 1856, the jig system can record the class object and/or the source code onto a blockchain ledger. In some embodiments, the blockchain associated with the blockchain ledger is Unspent Transaction Output (UTXO)-based. The source code that is recorded on the blockchain can include at least a portion of the instructions that the user inputted via the command prompt. Thus, the blockchain can include recordings on the ledger of source code that others can process. Thus, the class object for the egg and the source code to create the egg can be recorded on the ledger. In some embodiments, the class object can be recorded on layer 1. The source code can be recorded on layer 2.

At block 1858, the jig system can receive instructions to generate an instance of the class object. For example, a user can input instructions to generate an instance of the egg from the egg class object. At block 1860, the jig system can retrieve the source code recorded on a blockchain ledger for the class object, and at block 1862, the jig system can process the source code to generate a first instance of the class object. For example, the jig system can pull the source code for the egg class, compile the source code to generate object code, and run the object code to generate an instance of the egg class. At block 1864, the jig system can record the instance of the class object onto the blockchain ledger. For example, the jig system can record the egg instance on the blockchain.

In some embodiments, the class object and/or the instance of the class object can be recorded on the blockchain ledger. For example, the egg class object and the egg instance of the egg class object can be recorded on the blockchain ledger. Another user can retrieve the egg class object and/or the egg instance and view the properties of the class object and the instance.

In some embodiments, the jig system can receive instructions to create extensions of the class. For example, the jig system can receive instructions to generate a dragon egg class from the egg class. The jig system can create a new dragon egg class. In some embodiments, only the owner of the egg class can create extensions, such as the dragon egg class.

In some embodiments, the jig system can receive instructions to create objects from other objects. For example, the jig system can receive instructions to generate a hatch function within the dragon egg class, whereby the hatch function creates, from an instance of a dragon egg, a new instance of a dragon. Upon performing a hatch function on a dragon egg instance, the dragon egg instance is destroyed and a dragon instance is created from another class, e.g., the dragon class.

Jig Objects

To explain jigs, the disclosure will begin with the simple idea of a software object in the abstract and expand it until it has all the properties of a jig.

State and Behavior

Figure 19:
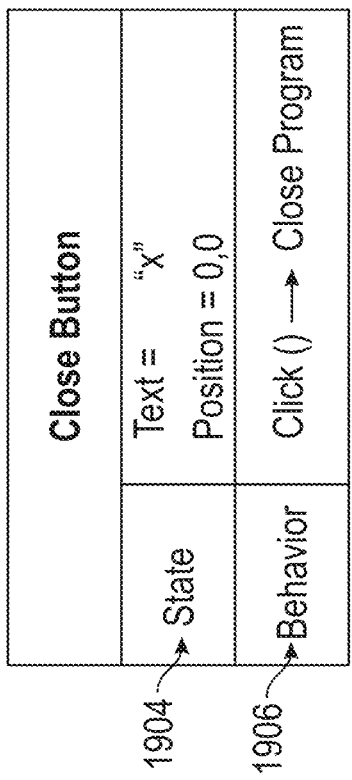
FIG. 19 illustrates an example of a button in object oriented programming according to some embodiments.

In some embodiments, there are different programming paradigms used to write a program, and programming languages tend to orient themselves around one or more of these paradigms. One popular and successful paradigm is called object-oriented programming. In object-oriented programming, an application is made up of individual parts called objects and these objects have their own state and behavior. Programmers define objects in code and these objects then interact with other objects when the application runs to create complex functionality. FIG. 19 illustrates an example of a button in object oriented programming according to some embodiments. For example, a user interface may have a button object 1902 with a state 1904 that describes its text and position and a behavior 1906 that includes a click( ) method to close the program.

In some embodiments, smart contracts are objects in this sense too. Every smart contract has its own state and behavior. Its contract code defines what it can do. Its state is usually stored in one or more accounts in blockchain nodes. Users on blockchains create transactions to call smart contract methods to update state similar to how local code calls methods on local objects to update state. Contracts are objects, but the disclosure will explain that they are a limited kind of object.

In some embodiments, jigs are also able to be stored by reference inside the state of other jigs. This property is called composition and is a property of object-oriented programming. There is no limit to the number of times a jig may be referenced by other jigs or how those other jigs are to be structured. Jig references form a graph that may even include circular references. Jigs are independent objects and as independent objects their own capabilities do not change when they are referenced by other jigs. The disclosure does not specify here whether jigs may always be referenced in their latest state or whether referencing past states are allowed. This is a decision to be made by the jig blockchain system.

In some embodiments, jigs, like smart contracts, are objects having the following two properties:
State
Behavior
Location In some embodiments, the current state of any object is simply the result of every action performed on it. For example, imagine there is an object called Sum that has a method called add( ) which increases an internal number in its state called value. As a smart contract, this object's behavior might be described with the following code:

```
contract Sum {
  value: number=0;
  add(x: number) {
    value=value+x;
  }
}
```

In some embodiments, if a user creates transactions that call add three times with the numbers 1, 4, and 5, the value in the contract would be 10.

| Transaction # | Action | State |
| --- | --- | --- |
| 1 | CALL add(1) | { value = 1 } |
| 2 | CALL add(4) | { value = 5 } |
| 3 | CALL add(5) | { value = 10 } |

This means that the jigs system can record the actions performed on objects on a blockchain and those actions may be replayed later to arrive at the same state. Transactions describe calls to smart contract methods. The three steps above would usually be recorded in three separate transactions. There might also be a special first action to initialize the smart contract. New nodes that join the blockchain network would replay this history to update all of the smart contracts to the same state as every other node.

In some embodiments, the range of possible actions on objects can depend on the programming language and the kind of object. Calling a method and deploying a new smart contract are often the only actions for users and smart contracts to interact with other smart contracts. However in general programming languages, there may be additional actions possible for objects including:
define a class (possibly with inheritance)
define a standalone function
create an instance of a class
set a property of a class or instance
replace behavior
change metadata
implement an interface
get the source code for a class
etc.

In some embodiments, when an action on a smart contract produces an action on another smart contract, such as a contract calling another contract's methods and thereby creating an interaction between them, only the top-most action needs to be recorded on the blockchain, because any subsequent actions that were performed as part of the action can be automatically replayed when the top-most action is replayed. This assumes the blockchain's virtual machine is deterministic, and this is how smart contracts are recorded.

In some embodiments, every time a smart contract is updated, it explicitly or implicitly has a new location on the blockchain. That location may be a transaction output on a UTXO-based blockchain or it may be the pairing of a state trie hash and contract address in an account-based blockchain. However regardless of how the location is defined, the latest smart contract state can be uniquely identified. The disclosure calls that unique identifier for the latest state of an object on a blockchain its location. The very first location of a smart contract may be distinguished as a unique identifier for the smart contract as a whole, and the disclosure may call that special first location its origin.

In some embodiments, all jigs, like all smart contracts, are objects with these three properties:
State
Behavior
Location In some embodiments, jigs and smart differ in at least some of the following features.

Type

Figure 20:
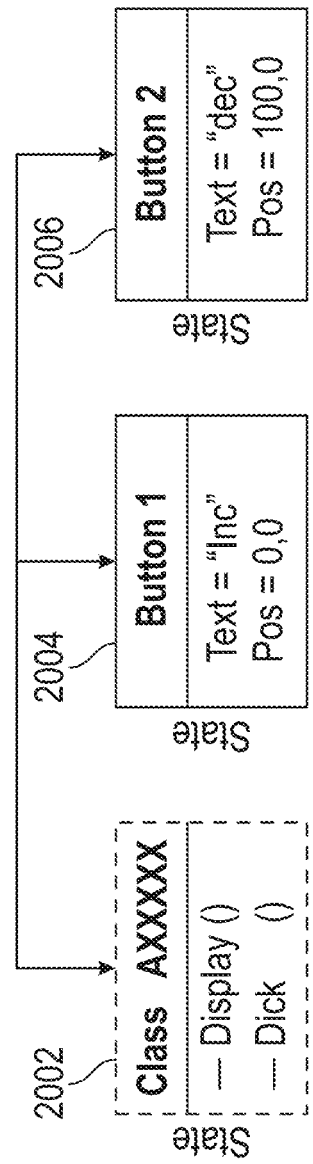
FIG. 20 illustrates an example of a class and two instances according to some embodiments.
Figure 20:
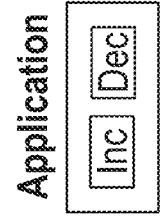

FIG. 20 illustrates an example of a class 2002 and two instances 2004, 2006 according to some embodiments. There is a subset of object-oriented programming languages that are class-based. The idea behind class-based programming languages is that instead of creating every object individually, programmers first define blueprints, or templates, for objects, and these templates are called classes. Classes define the behavior for all instances of that kind of object. Programmers create instances from classes via instantiation usually using a special keyword called new. As an example, in a user interface there may be many buttons which all share the same general look and feel but each has their own position and effects. A common Button class would define the common behavior shared among them to draw the button on the screen and that Button class would be used to instantiate the different button instances each with their own state.

In some embodiments, objects in class-based languages still have state and behavior, but they also have a third property: Type. Type, also called identity, or type information, refers to the class that the object was instantiated from. Code may use this type information to make decisions. For example, in a social media application, there might be a class for a Post and a class for a Like, and instances of Likes can be attached to instances of Posts, but if you tried to attach an instance of a Like to an instance of a Button, either the language or runtime environment would throw an error. Type information makes this possible.

In some embodiments, classes also enable programmers to define inheritance hierarchies of types and behavior. For example, a social media site might define a class called Post and then extend from it a separate class called ImagePost that inherits all of the behavior of Post but also adds additional behavior for images. All instances of ImagePost would be considered instances of Post and this property is called polymorphism. Applications can construct hierarchies of classes this way and model their data structures to match the domain. When an instance of a class has type information that links it to its specific class, which determines its class hierarchy and relationship to other types, and that type information is shared by other instances of the same class, the disclosure considers objects in the language to be strongly-typed. Also, when type information can be understood and traversed at runtime, we consider that these objects support type introspection.

Smart contracts disadvantageously have never been both class-based and strongly-typed, nor have they supported type introspection. This requires explanation because syntactically it might appear to be the opposite. At a low level, every time a smart contract is created on Ethereum using the CREATE opcode for example, a transaction is submitted to the blockchain with the complete code for that smart contract and all its dependencies. This alone should be an indicator because it suggests that two contract instances sharing the same contract class would have their code deployed twice, and any shared helper logic would be duplicated. The user creating the smart contract pays the blockchain fees twice and the previous contract code cannot be referenced to create the smart contract. This is equivalent to creating a class for every instance of an object and it is both inefficient and does not encourage strong types. Now Ethereum does have a way to check that code, but inspection is at the level of code, not types, which is insufficient since code may be made up of multiple types.

Some higher-level smart contracting languages like Solidity allow programmers to reuse and extend contract classes though. However, this is mostly syntactic sugar and is not the same as strong typing. For example, when a contract extends another contract, the final contract code that is deployed on-chain is simply the combination of all of its parts rather than actually being an extension of an existing contract. There is no reference to the existing contract if it was already deployed. This means that when two smart contracts interact and one of them has an inheritance chain, the other smart contract cannot safely determine which contracts are part of that chain.

On some blockchains, smart contract instances reference their contract code using a code hash. Two instances with the same code then would share the same code hash and one could argue that this is a form of strong typing. However, classes are not distinguished by its code, but by type. Two classes might have the same source code and even the same name and be considered different types according to the programming language. This is especially true in languages where classes are objects and may themselves change over time. Regardless of whether you agree with this argument, a smart contract instance may have multiple classes in its inheritance chain and this information is definitely not captured by the code hash approach.

Finally, smart contracts in existing blockchain languages are referred to by their address that is not strongly typed. Programmers may sometimes cast this address to a strongly typed contract object in order to call methods on the smart contract, but the original address did not itself have a type and casting is not secure and one could cast to an address to a different contract and cause a runtime error. While there may be a way to ask the contract what code it uses, this is not the same as strong typing because of the points above. Also, while there may be a way to ask the contract what interfaces it implements, this is not secured by the blockchain and it is possible for contracts to deceive other contracts. Only in very specific circumstances can a smart contract rely on contract types within its logic, such as when contracts that interact are all deployed together. This limits their interactivity with other contracts. This is true for smart contracts on account-based blockchains and is also true on all UTXO-based smart contract attempts.

This is a problem because type information becomes very important when smart contracts interact. Smart contracts especially need to know what they are interacting with to be secure. Developers in Ethereum and other languages have accomplished this with complex workarounds, but having type information natively on contracts would make smart contract interactions safer to use. Also, by separating classes from instances and making smart contract classes first-class entities, new features become possible like the ability to change a class's code and have that change the behavior of all instances. This is a very difficult task on existing smart contracting platforms that do not make classes first-class entities.

The jigs system mitigates and/or eliminates the above described disadvantages and take this idea further. In many modern programming languages, classes themselves are objects with state, behavior, and type. Classes may have static properties as state, static methods as behavior, and may themselves be instances of more abstract types. Classes in these modern languages become updatable and referenceable just like any other object. The programming paradigm here of classes as objects is called everything is an object and it extends past classes. Many parts of code, including functions, operators, interfaces, numbers, attributes, and more, can be strongly-typed objects that change over time.

The everything-is-an-object model is useful because it allows all parts of code to interact with itself, giving incredible flexibility to the programmer. Programmers may pass classes into functions, store classes as variables, and even modify application behavior while a program is running. The paradigm of everything-is-an-object has not made it into smart contracts and blockchains at all. In order for a smart contracting language to support this paradigm, at minimum they would need to make smart contract classes first-class entities with their own locations and state separate from instances. To-date, no blockchain has taken this approach.

Thus, in some embodiments, jigs are objects in this most general sense, as strongly-typed parts of code with state and behavior, that include both instances and classes, and that interact with other parts of code according to the rules of the language. Jigs are stored on a blockchain like smart contracts. Jigs can reference other jigs in their state, behavior, and type the same way that objects can reference other objects. There may be different kinds of jigs, like there are different kinds of objects, such as instances, classes, and functions, and more, and this information is part of the object's type. When class jigs are extended from other class jigs, the parent class is referenced by the child class in its type information and both are separate jigs. Jigs then are objects with the following four properties:

State
Behavior
Location
Type

The benefits of splitting smart contracts into classes and instances and making them strongly-typed include:

1. Reliable type information—Objects have identity information about their class and this information may be used in logic when objects interact together.
2. Updatable classes—Classes may have their own state that evolves over time. They can also be upgraded with new behavior that affects all their instances, enabling new relationships between developers and users.
3. More efficient storage—Because class jigs that extend other class jigs do not need to duplicate the code for the base class, and instances can refer to their type by reference, space is saved on the blockchain. This encourages more lighter-weight objects with more interactivity.
4. New kinds of smart contracts—Any kind of object can in theory be described as a jig. This includes instance jigs, class jigs, function jigs, interface jigs, operator jigs, data jigs, and more.

It is worth thinking about why this has not been done before. There are at least three possible explanations:
1. Need to invent an interaction model—Smart contracts today may call methods on other smart contracts, but that is the extent of their interactions. For smart contracts to interact in more complex ways like a type system in a programming language, there needs to be a model that maps every possible interaction to its recording on the blockchain and creates safe rules for those interactions. This embodiment is described below.
2. Everything-is-an-object is an advanced language feature—Smart contracting programming languages generally have been custom-built without the bells and whistles of modern programming languages. For these ideas to be possible, either smart contracts would need to be written in modern programming languages, or new smart contracting languages would need to be created to support these features. Both are big tasks.
3. Abstraction leap—Taking smart contracts and generalizing them to both classes and instances requires an abstract understanding of both programming languages and blockchains. Creating a simple smart contract would involve creating not one but two smart contracts: one for the class and another for the instance.

It has been a few years since the first public smart contracts on Ethereum, and many variants of smart contracts continue to be produced today, however, the following features have not yet been applied in traditional systems:

Separation of smart contracts into class contracts and instance contracts

The introduction of type information generally to contracts in the form of references to other contracts Class contracts with updatable state and behavior defined by static properties and static methods Contract type hierarchies made up of distinct contract classes each with their own locations Generalizing smart contracts to modern ideas of objects including functions, interfaces, etc.

Ownership

A problem and a feature of smart contracts is that by default any user may call any method on a smart contract. This means that security has to be added in and oversights in the past have enabled hackers to attack smart contracts. To address this, the Libra and Flow blockchains created a second asset called a resource, which is a token inside of a smart contract that has explicit ownership protected by the blockchain. In that way, there is some base layer protection of who can do what with assets. However, the problem still exists at the smart contract layer.

Figure 21:
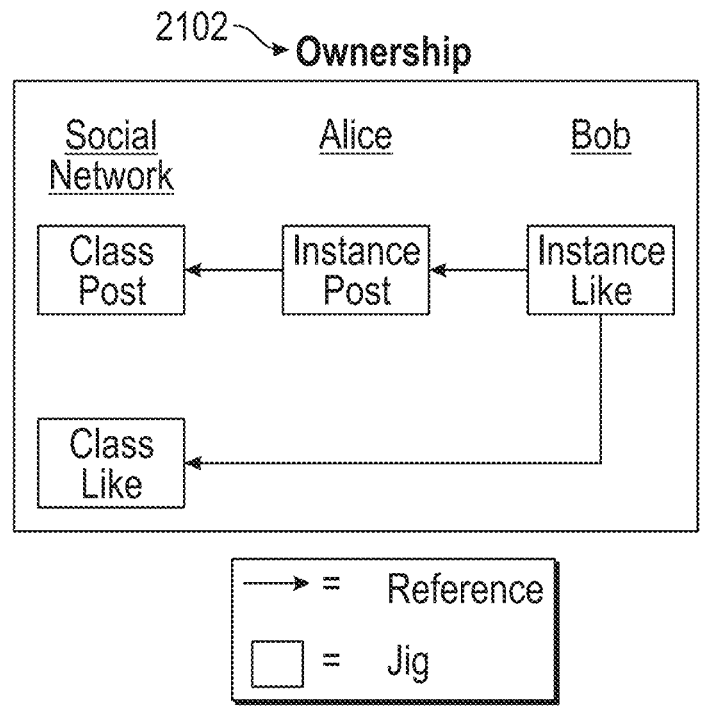
FIG. 21 illustrates an example of ownership and jig relationships according to some embodiments.

FIG. 21 illustrates an example of ownership 2102 and jig relationships according to some embodiments. Whereas smart contracts are shared resources, jigs always have a specific owner. As property, ownership grants the following rights over the jig (also referred to herein as jig ownership rules):
1. Ownership grants the right to change the jig's state through an action.
2. Ownership grants the right to create new jigs from the jig, where those new jigs initially have the same owner as the creator jig.
3. Ownership grants the right to enact actions on other jigs from the jig that change the states of those other jigs, as long as the owners of those changed jigs approve.

In some embodiments, likewise, without ownership, the above actions cannot be performed. There is a fourth rule of ownership that is a right granted to all jigs.

4. By default, a jig may reference or read the state of another jig with or without the owner's approval.

In some embodiments, this fourth rule enables jigs as property on the blockchain to interact with other jigs freely.

As an example, an instance jig can always reference its class jig as its type, but the class jig need not have the same owner as the instance. A social network might own the class jig for the Post and Like classes, but individual users on the network own the instances of those posts and the likes that they created. This allows the social network to update the code for a class and have it affect all instances. Ownership in this way can be used to create applications where you own your data in the sense that only the owner may update that data, but the rules upon which that data can be updated are defined by the application.

In some embodiments, ownership may be defined cryptographically with both a private and a public component. The public part is assigned to the jig in a way that others can see. This is akin to an address of your house. The private part is what proves ownership of the jig. This is akin to the key to your house. The private part should not be shared. On blockchains, ownership is usually in the form of a cryptographic public-private keypair and signatures that prove ownership, but ownership and approval may also be implemented using any predicate system such as Bitcoin script, allowing for shared ownership.

In some embodiments, the combination of these four rules are novel and have not been present together in any smart contract system to-date. Disadvantageously, smart contracts don't have owners by default. Smart contracts can be written to have ownership similar to the above, but ownership is not a universal rule applied to every smart contract and how they interact. When individually-owned tokens or resources are stored in smart contracts, users interact with the smart contract rather than with the tokens. And unlike resources in Flow and Libra, jigs are programmable objects in a class-based language. There are UTXO-based token systems that support some of the rules of ownership above but not all. Specifically, reading or referencing a jig does not require an owner's approval is entirely novel for the jig system. Therefore, these four ownership rules do not apply on traditional systems.

In some embodiments, jigs can have the following five properties:
State
Behavior
Location
Type
Owner In some embodiments, the benefits of introducing single ownership to smart contracts include:
1. Secure by default—No code bug can cause an object to change without the owner's approval
2. Ownership creates stewardship—There can be fewer tragedies from the commons and as well as hacks
3. Simple, uniform model of ownership—All jigs regardless of their kind, whether a class or an instance or another kind of object, interact undership ownership in a uniform rule set that is easy to understand.
4. Works on both kinds of blockchains—Ownership is inherent to both kinds of blockchains: UTXO and Account based. In UTXO-based blockchains, an output can represent the state of an object and its owner. In account-based blockchains, jigs can be a new kind of smart contract.

The following explanations can help explain for why individual-ownership according to these rules has not been made default in smart contracts or tokens and are disadvantageous for smart contracts:
1. Technically complex—To implement the jig ownership rules above, the jig needs to run in an environment where every action and subaction on jigs is tracked and jig references are specified so that all actions are deterministic.
2. Single-ownership is believed to be too simple—Smart contracts are believed to be more flexible than jigs because they may have multiple owners or no owners at all. Object capabilities are yet another model for ownership. In both cases, ownership is very complex to understand and implement and this risks bugs. Jigs, in contrast, are very simple to understand, and shared ownership can still be made possible, but may be explicit instead of the other way around.

The following describe the following variations on the above embodiment:
   Jig ownership rules where #2 and/or #3 are not present
   Jig ownership rule where #2 is modified to have a different initial owner
   Jig ownership rules where more rules restricting the use of jigs via ownership are added Summary In some embodiments, jigs are objects with the following five properties:
   State
   Behavior
   Location
   Type
   Owner The jig ownership rules described above allow jigs to interact safely with each other when located on a blockchain. This has not been used in traditional systems before. When these properties are considered together, the object model is sufficiently different from smart contracts that it requires a new name. The jigs system calls objects that implement most or all of these features above jigs. They may be written in a general purpose language, or a domain-specific language.

The disclosure will describe embodiments that encode and enable jigs on a UTXO-based blockchain both as L1 tokens and L2 colored coins. This system can be called the jig blockchain system and the disclosure can describe an embodiment called a jig library that implements the token system in a software package that may be used by applications as an L2 colored coin. However first, the disclosure will explain modifications to the traditional UTXO model to enable outputs to interact which is a prerequisite for jigs. The disclosure calls this extension executable transactions.

Executable Transactions

The disclosure now describes a new embodiment called an executable transaction that extends a UTXO-based transaction to enable the general programmability of outputs in transactions. This can be used to create complex interactive tokens or smart contracts because it enables rich interactions between input states, output states, and other data. Later, the disclosure can use executable transactions to encode jigs. The disclosure starts with a standard UTXO-based transaction and modify it until it has all the capabilities of an executable transaction. The disclosure assumes the executable transactions are being verified by an L1 blockchain node in the initial description of them. Then the disclosure shows a way to use executable transactions on existing UTXO-based blockchains using an L2 colored coin system.

Inputs and Outputs

Figure 22:
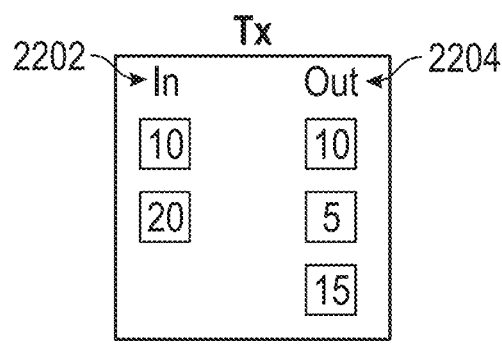
FIG. 22 illustrates example inputs, outputs, and validations for UTXO-based transactions according to some embodiments.

FIG. 22 illustrates inputs, outputs, and validations for UTXO-based transactions according to some embodiments. UTXO-based transactions have inputs 2202 and outputs 2204. Outputs may be spent or unspent and when they are unspent they are called UTXOs. Outputs usually store two properties: a number of unspent coins and an owner in the form of a public key or locking script. Inputs are references to previous outputs via their transaction ID (txid) and output index (vout), sometimes called an outpoint, and they also have some proof-of-ownership required to spend that output, usually in the form of a signature in an unlocking script. A very simple UTXO-based transaction then might be the following data structure:

struct Input {
        txid: TransactionHash,
        vout: number,
        proof: Signature
    }
    struct Output {
    amount: number,
        owner: PublicKey
    }
        struct Transaction {
            inputs: [Input],
            outputs: [Output]
        }

In some embodiments, the information in the Output data structure is called the output state. This state is rather simple in the above data structure, containing only the owner and amount, but in theory it could be arbitrarily complex to store smart contract states or token states. For example, Cardano extends the UTXO data structure to include smart contract data. The disclosure can assume that all output states have an owner but the disclosure may not assume that they have amounts. For simplicity, the examples can continue to use output states with an owner and amount. Regardless of the data that is stored, this output state is immutable meaning that for a given output, specified by a txid and vout, this data never changes.

In some embodiments, a transaction can either be valid or invalid according to the consensus rules of the blockchain system. For example, when UTXOs store coin amounts, there is usually a consensus rule that says that the total number of coins spent as inputs may be greater than or equal to the number of coins stored as outputs. This ensures there is no coin inflation. This rule is checked by the nodes on the blockchain system.

Program

In some embodiments, the disclosure defines an executable transaction as a transaction with a program in it. The program is a special part of the transaction that encodes executable code to deterministically generate the output states for the transaction. With the program in place, output states no longer need to be stored in the transaction data structure itself, because they can be computed from the program. An executor is the piece of software that reads and runs this program. When executable transactions are possible transactions in an L1 blockchain system, the executor would be part of every node on the blockchain network. Executable transactions, like UTXO-based transactions, still describe atomic transitions from one set of output states to another set of output states, but the output states are now the result of some computation.

In some embodiments, an executable transaction has the following structure:
```
struct Input {
    txid: TransactionHash,
    vout: number,
    proof: Signature
}
struct Transaction {
    inputs: [Input],
    program: Program
}
```

In some embodiments, the program may be stored in any way that a program is stored in a computer, such as using a custom programming language, a command-based data protocol, bytecode for a VM, etc. The program may also require gas like Ethereum to run. The disclosure uses a simple pseudo-code in the examples below but the program should be imagined to be as complex as the designer intends. Here is a very simple program that has three commands in a custom programming language to create three outputs each with a different amount.

Output:
  program:
    CREATE_OUTPUT {amount: 5, owner: <owned>}
    CREATE_OUTPUT {amount: 10, owner: <owner2>}
    CREATE_OUTPUT {amount: 15, owner: <owner3>}

FIG. 23 illustrates a program using inputs to generate outputs according to some embodiments. In some embodiments, outputs are not present by default in the executable transaction data structure, but an executable transaction still has implied outputs that can be referred to by an outpoint as if they were present. The disclosure calls these virtual outputs. The program may also be more complex than just simply creating outputs as seen above. The program may use the output states of the executable transaction's inputs as part of their computations. These input states would be made available somehow to the program before running it. For example, in the above figure, transaction's input states would be an array containing the following:

inputStates=[
  {amount: 10, owner: <owner1>},
  {amount: 20, owner: <owner2>}
]

In some embodiments, the input states are the states of the prior outputs that are being spent, and this enables interactions between inputs and outputs In the transaction above, the program calculates the amounts for the outputs from the input amounts. The first output can be assigned half of the total coins from the inputs. The second output can be assigned 5 coins. The third output can be assigned the remainder. The corresponding program might look like:

Program:
  LET total=SUM AMOUNTS inputAmounts
  CREATE_OUTPUT {amount: total/2, owner: <owner1>}
  CREATE_OUTPUT {amount: 5, owner: <owner2>}
  CREATE_OUTPUT {amount: total/2-5, owner: <owner3>}

In some embodiments, the benefit for storing a program rather than specific outputs states is that it allows for new blockchain rules based around the transition capabilities from input to output states and the specific programs written using them, instead of just the final results. This is more powerful, since every rule you can code about final output states you can also code about the program inside the executor. It also enables smaller transactions when the program to transform the input states into output states is smaller than the data in the output states themselves, which is often the case when making small changes to large data. It also enables smaller transactions when the program to transform the input states into output states is smaller than the data in the output states themselves, which is often the case when making small changes to large data.

Hashes

Compared to traditional UTXO-based transactions, the output states of executable transactions cannot be determined simply by parsing the transaction data structure. Disadvantageously, its program may be executed. This is a problem because output states are often the most important parts of a transaction for applications, users, and node software. Calculating those output states may be time-consuming because an executor needs to run the program using previous input states and those input states were calculated from previous executable transactions which themselves might have histories. A transaction's dependency graph can be quite large and getting larger over time. Worse still, the program itself might take a long time to run and so users might not want to run this program every time they need an output state. Therefore, traditional systems need a solution to scale the process of determining output states.

One solution is to store the output states in the executable transactions themselves with the program. However, this is redundant information because those output states can be computed from the transaction graph, wasting space and fees. Instead of storing output states in an executable transaction, in some embodiments, the jigs system can store output state hashes in the transactions, and state caches can provide the pre-calculated state for those hashes quickly. If ever an output state is required but no cached state is available, it can be calculated by running the program. A secondary benefit of storing the hashes is that this is a quick way to determine the number of outputs which is sometimes useful.

In some embodiments, a cryptographic hash H(S) of an output state S can be computed from S. This hash has a fixed size no matter how large the state is. Using state hashes, transactions can reference arbitrarily large output states without bloating the transaction and programs can grow this state over time. Second, in an L1 blockchain system, these hashes would be verified by nodes on the network when accepting the transaction ensuring that transactions that are confirmed have valid hashes. Finally, state hashes, like output states, are immutable for a given output. This enables applications and nodes to scale the process of determining output states by caching states in key-value databases. The jig system can cache states by their hash or by their transaction ID and output index. FIG. 24 illustrates an example of a state cache data structure keyed by the transaction ID and output index according to some embodiments.

In some embodiments, state caches are key-value stores for output states. They may be implemented as an in-memory map, as a Redis Database, or as any other key-value store. The key is the output's location, described with a txid and vout. Nodes in executable transaction blockchains would have state caches in order to load input and reference states when verifying transactions. Third-parties such as applications would also have state caches and store the output states of transactions they care about. Third-parties may even share data from their state caches in a peer-to-peer way with other applications to reduce the communication with the blockchain nodes. State caches then become an important part of scaling the use of executable transactions. FIG. 25 illustrates a state cache 2502A, 2502B that can be run on both the nodes 2504 of the blockchain and the applications 2506 according to some embodiments.

In some embodiments, the transaction format can look like:

```
struct Input {
    txid: TransactionHash,
    vout: number,
    proof: Signature
}
struct Transaction {
    inputs: [Input],
    program: Program,
    hashes: [OutputHash]
}
```

References

In some embodiments, so far, the only external data provided to the program that calculates the output states were the input states. The jigs system can now extend the executable transactions to store references to previous outputs and make available the output states of those references to the program like the inputs. References are previous outputs like inputs specified with a txid and vout. However, unlike inputs they are not spent as part of the transaction. They are called references because they are links to other outputs and don't require the owner's approval to use. The disclosure can later use references to support reading jigs that are not owned by other users. The executor that runs the program can likely treat references and inputs differently because one has owner approval and the other does not.

As an example for where references might be useful, perhaps there is a social network whose likes and posts are stored on a programmable-transaction blockchain as outputs. To create a "like", the jig system may want to reference a certain post which is another output but that other post may be owned by another user. The jig system therefore cannot easily spend that output as an input, and so a reference to the post would be used instead when creating the like.

These references are themselves outputs but they need not be unspent outputs. Consensus rules can determine what references are allowed in an executable transaction. There may be systems where references are allowed to link to previously spent outputs via their txid and vout, or where references are allowed to be used only if they are recent where recent means not spent within some time window. However, regardless of the specific requirements for references, references may exist for the transaction to be valid.

```
struct Input {
    txid: TransactionHash,
    vout: number,
    proof: Signature
}
struct Reference {
    txid: TransactionHash,
    vout: number
}
struct Transaction {
    inputs: [Input],
    references: [Reference],
    program: Program,
    hashes: [OutputHash]
}
``` a. Executor

Figure 26:
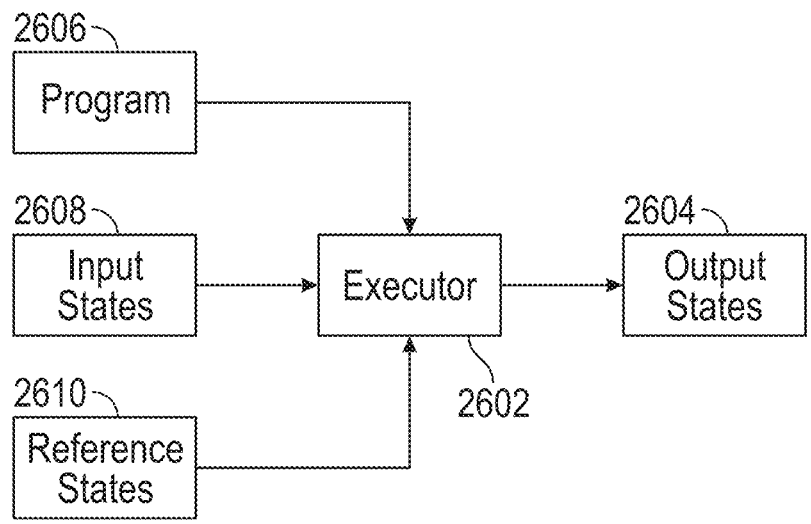
FIG. 26 illustrates an example executor computing output states from the program, inputs, and references according to some embodiments.

This section describes how a jig transaction can be replayed to generate output states and jig objects. FIG. 26 illustrates an executor 2602 computing output states from the program 2606, inputs 2608, and references 2610 according to some embodiments. The executor is the piece of software that runs the transaction's program. The executor is used by the node software to validate transactions to compute their output states. Here is its function signature:

```
function execute(program, inputStates, referenceStates) {
    // Run the program and return the new outputStates
}
```

In some embodiments, the input states and reference states are passed into the program as parameters. These states may be loaded by running the executor on their previous transactions to generate the relevant output states, or by retrieving output states from a state cache. After computing the output states for a transaction, the executor or the code that calls it may also insert those output states into the state cache for each computed output. This can improve performance the next time.

In some embodiments, it is very important that the executor be deterministic, meaning that for the same program, input states, and reference states, the executor may compute the same output states every time. If the executor were non-deterministic, then the output states would not be immutable and this would break the state caching described above. Therefore, randomness, network calls, etc. cannot be supported since they are non-deterministic. Ideally, the executor would be entirely isolated from other software using a virtual machine or sandbox environment to make it deterministic.

In some embodiments, the executor should not rely on any external state other than the input states and reference states, and in particular, it should not use any global mutable state shared between executions. Doing so would make this system unscalable and potentially nondeterministic. The figure above shows the executor as an isolated box that computes the output states from only those inputs passed to it.

Partial Outputs

The disclosure now describes a small optional variation on executable transactions to allow for partial outputs. In some embodiments, it may be useful to store parts of the output states in an executable transaction rather than not including any output state information. For example, a partial output might contain just the owner information and the remainder of the output state would need to be generated by running the program. This has an advantage that some basic information is easily retrievable from just the transaction. If an executable transaction has partial outputs, one embodiment would define an example partial output data structure and include it as part of the transaction as follows:

```
struct PartialOutput {
    owner: PublicKey
}
struct Transaction {
    inputs: [Input],
    partialOutputs: [PartialOutput],
    references: [Reference],
    program: Program,
    hashes: [OutputHash]
}
```

In some embodiments, the validation logic for the blockchain would need to check that these partial outputs are correct when the transaction is received by a node, in a similar way to how the hashes are checked for correctness.

Layer 2

In some embodiments, the executable transactions described have been described for use on a blockchain as a native transaction format. This means that to use executable transactions the jig system would modify a UTXO-based blockchain architecture to use this new transaction format, executor, and state cache. The jigs system would also modify the validation logic of the node to check the correctness of executable transactions. To deploy such a system, the jig system would either need to fork an existing blockchain and make these modifications or create a new blockchain system from scratch. Both are very complex tasks. Therefore, the disclosure will now describe an embodiment to implement executable transactions as layer 2 colored coins on an existing UTXO-based blockchain. This can allow executable transactions to piggy-back off the underlying blockchain system's security and network effects. It can allow the jig blockchain system described in the next section to not concern itself with which blockchain the jigs runs on as long as executable transactions are possible.

One main idea of this embodiment is that since layer 2 colored coins reinterpret outputs to mean something other than the native coin on the blockchain, the jig system can use this idea to reinterpret UTXO-based transaction outputs to mean outputs in an executable transaction. All of the data in an executable transaction can still be present in its UTXO-based transaction form, but the underlying blockchain can only enforce some of the rules that make an executable transaction valid. The jigs system can also use the layer 1 blockchain to enforce some of the consensus rules that are applicable such as ownership of outputs and spending requirements for inputs. However, the jigs system can also use a second layer of validation in a token library to check that the executable transaction is fully valid. If the transaction is invalid according to this second layer of consensus, it can be treated by the token library as if the executable transaction is invalid as a whole.

Transaction Format

Figure 27:
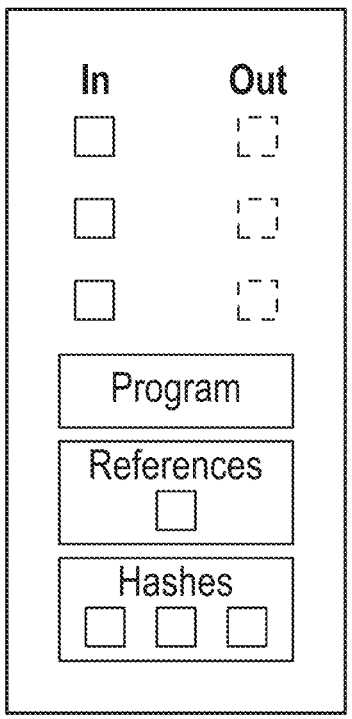
FIG. 27 illustrates an example of L1 vs L2 executable transactions according to some embodiments.
Figure 27:
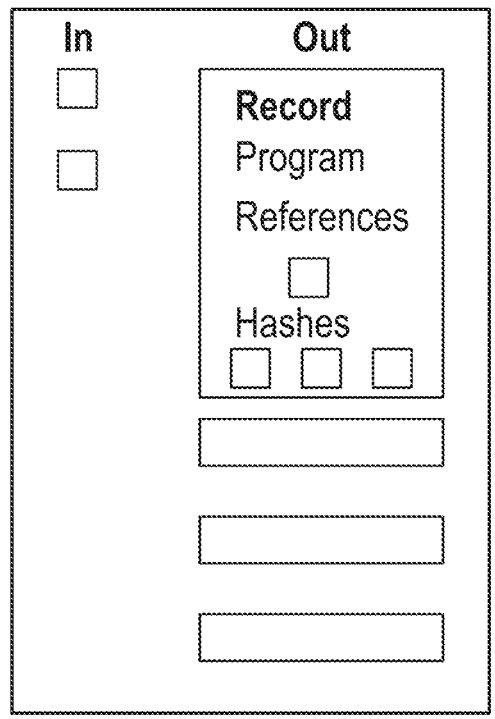

FIG. 27 illustrates an example of L1 vs L2 executable transactions according to some embodiments. UTXO-based transactions in existing blockchains have inputs and outputs. They don't have programs, references, or hashes. Therefore, the jigs system need a way to store this data in a UTXO-based transaction. There are various ways to encode arbitrary data in UTXO-based transactions, and one approach is to store arbitrary data in a special unspendable output called an OP_RETURN output. In many colored coin protocols, the first output of the transaction is such an OP_RETURN output used to describe the tokens contained in the other outputs and the jig system can follow this approach. The disclosure can call the first output the metadata output because it can contain additional data needed to interpret the UTXO-based transaction as an executable transaction. However, this particular approach towards storing metadata is not a requirement. There are other ways to store such data, such as OP PUSH outputs, input script push datas, storing data in other transactions and even storing data off of the blockchain. This general description can be extended to use any one of those approaches but the disclosure can assume the first output is a special metadata output for this description. The metadata output can be the first output of the transaction, and it is designed to be unspendable. The structure of the metadata is as follows:

struct Metadata {
      protocol: string,
      program: Program,
      references: [Reference]
      hashes: [OutputHash]
    }

In some embodiments, the protocol string is a new addition to the executable transaction format and it is used to differentiate executable transactions from other transactions on the blockchain since the L2 executable transactions can coexist with other non-executable transactions. The program, references, and hashes can all be stored using the same data structures as in an L1 executable transaction. However, this data can not be checked for correctness by L1 blockchain nodes.

In some embodiments, the next N outputs after the metadata output are the partial outputs for the N output states that are generated by running the program. The owners of those next N outputs may be the same owners as those that would be generated by the program. The amount value in those outputs can by default be dust, which is the smallest amount possible in an output. In other words, the complete output state can still be generated by running the program, but some of that state is stored in the L1 UTXO-based transaction outputs. The L1 blockchain can enforce ownership transfers and the L2 token library can validate the remaining rules of the blockchain and generate the complete output state for a transaction.

In some embodiments, the first M inputs of the transaction are by default the same as the M inputs that would be in the executable transaction. These are spends of previous L2 executable transaction outputs. There may also be additional non-program inputs and outputs in the transaction used to pay fees.

Executor

In some embodiments, the executor in an L2 executable transaction system is very similar to L1 executable transaction executor except that it has a few additional checks since L1 blockchain nodes do not validate the executable transaction format. Here are the new steps for the executor:

1. Verify the metadata output is a valid data structure
2. Get the L2 output states for the inputs, either by running the executor, or querying the state cache
3. Get the L2 output states for the references, either by running the executor, or querying the state cache
4. Execute the program
5. For each new L2 output state, check that the hash of the state matches the output hash stored
6. For each new L2 output state, check that its owner matches the corresponding L1 partial output
7. For each new L2 output state, check that its corresponding L1 partial output has a dust amount In some embodiments, steps 1, 5, 6, and 7 would normally be performed by nodes if this were a L1 executable transaction blockchain, but the jig system may perform these checks by the token library in an L2 system. This executor is part of this L2 token library. If any of the checks fail, then the transaction is an invalid L2 executable transaction and all program outputs lose their meaning as if they were destroyed. They become regular L1 outputs.

In some embodiments, output states are still cached afterwards in a state cache but this is performed not by nodes on the network but by applications and third-party services that are interested in executable transactions. If a state cache has a particular output state in it, then that output state is assumed to be part of a valid transaction that passed all of the checks above. This can be economically secured with a secondary consensus mechanism for the state cache if necessary. For example, there could be a blockchain system specifically to secure the state cache using a proof-of-work consensus mechanism and a hash tree similar to the Ethereum state trie, and this would allow applications to rely on those values similar to querying the system under L1. The advantage of this would be that the base blockchain could scale independent of the executable transaction requirements and applications would retain all the benefits of an L1 executable transaction system when it is used in L2.

Summary

In some embodiments, an executable transaction is a transaction whose output states are generated by running a program. This new transaction format may be native in a new L1 blockchain system or built on top of an existing UTXO-based blockchain using a L2 colored coin system. An executor runs the code to generate the output states and this allows programmable interactions between output states without bloating transaction sizes. An executable transaction data structure may include:

Inputs
Program
References
Hashes
Partial Outputs (optional in L1, required in L2)

To date, no L1 blockchain or L2 token system implements executable transactions. To compare this embodiment with other systems:

In both account-based and UTXO-based blockchains that support smart contracts, transactions sometimes includes data used to parameterize a smart contract call, and that data together with the contract code might be thought of as a program, but the resulting code is not used to generate output states but to update some global smart contract state that exists separate from the outputs.

There exists a UTXO-based blockchain that supports smart contracts by making owner scripts in outputs more powerful so that they may validate properties on the entire spending transaction and also store arbitrary data in its output. These scripts may be thought of as programs in the general sense. However, these scripts do not generate output states but instead restrict their future states so they are not the same kind of program as in executable transactions. Additionally, there is no single program that generates all output states together, there are no references, there are no state hashes, and there is no method to use this system on L2.

There exist several L2 colored coin systems whose transactions have special metadata which may be thought of as a limited program. However, this limited program only adds new information to existing outputs and cannot generate outputs in their entirety like a program in an executable transaction can. Also, transactions in these systems do not have references, do not have output state hashes, and are not designed to be used in L1.

There exists a L2 colored coin system that has the idea of a verification function to relate input and output states, but the verification function is the same for all transactions in a given token system, whereas programs are unique to every transaction and describe unique interactions for just that transaction. Additionally the verification function is intended to check that a relationship is correct rather than generate the output state.

There exists an L2 colored coin system that uses transactions to record function calls on objects and outputs in this system correspond to created or updated objects. While a function call may be thought of as a command to generate new L2 output states, there is only a single command in every transaction and this command is restricted to calling a function on a particular object. In comparison, programs in executable transactions are more general-purpose and may operate across multiple input and reference states simultaneously. Programs in executable transactions may also have multiple commands unlike this colored coin system. Finally, unlike executable transactions, there is no concept of a reference list or hash list in the transaction, and there is no description for how the L2 colored coin system would work in L1.

The disclosure also describes the following variations to the above embodiment:

An embodiment where either the program, hashes, or references are not stored in the transaction, but stored elsewhere, either in another transaction off of the blockchain.

An embodiment that does not store the state hashes in the transaction, but instead stores them as part of the blocks that the transactions are added to.

An embodiment where the L2 metadata is spread across multiple outputs and/or multiple transactions.

An embodiment where the inputs of an L2 executable transaction may be re-ordered, and others added, but the transaction generates the same resulting L2 output states An embodiment where the references are not used or stored but other properties are retained An embodiment where the hashes are not used or stored but other properties are retained An embodiment where actual output states of an L2 executable transaction are stored in the outputs of the L1 UTXO-based transaction An embodiment where other metadata is stored in either the L1 or L2 executable transaction An embodiment where a secondary blockchain secures the state caches when using the L2 colored coin approach as described above.

An embodiment where partial outputs are stored in an L1 executable transaction

The jigs system vastly and advantageously improves on traditional systems because:

1. Abstraction Leap—It takes a general understanding of input states, output states, and UTXOs as well as a creative leap to run arbitrary programs to deterministically generate outputs for entire transactions.

2. UTXO-based understanding—Most of the research into programming blockchains has been for account-based blockchains and smart contracts.

3. It has been more than 10 years since Bitcoin, a UTXO-based blockchain, launched, and there have not been similar ideas.

The benefits of an executable transaction include:

Rich interactivity rules—Inputs and outputs usually only interact according to the consensus rules of the blockchain, and when outputs are programmable, they are limited to simple checks on themselves. Programs allow outputs to interact with other outputs of a transaction as a whole like the consensus rules of the blockchain. It also allows rules to be based around behavior instead of just states.

Reduced storage size—Because output states are not stored in the transaction itself but instead generated by running a program using prior input and reference states, transaction sizes can be much smaller, especially when output states grow large with complex data structures.

The disclosure described the data structures and processes to represent and use executable transactions, but there are many details left to the implementation. To implement an executable transaction blockchain system, one may:
- Define the possible data and encoding format for storing output states
- Define the possible commands and encoding format for storing the program
- Define the executor, its ruleset, and its runtime environment
- Define the other data structures including references, hashes, and partial outputs
- If necessary, define how L2 transactions map to L1 transactions if using colored coins In the next section, the disclosure will customize this executable transaction system to store jig objects in outputs.

Jig Blockchain System

In some embodiments, the jig objects previously described were conceptual in nature and required a token system to use, just as objects in a programming language are conceptual and require a compiler or interpreter to use. Now that the disclosure explained executable transactions, the disclosure will describe the embodiment for a complete jig blockchain system that allows applications to create and use jigs on a blockchain. The jig blockchain system is a collection of software functions, data structures, and protocols working together to enable jigs. In the next section titled Jig Library, the jig blockchain system can be packaged into a software library for use as an L2 system on an L1 blockchain and to be included in many different kinds of applications, but in this section describes the parts of the jig blockchain system generally and does not assume a particular packaging.

In some embodiments, just as artwork and movie tickets can be represented as tokens, so can jig objects. By tokenizing jig objects, which are software components such as classes and instances, applications can be able to define their own specific assets by writing code similar to how they would define and use assets in a non-blockchain setting, except that now the assets can have owners and locations on a blockchain and may follow the jig ownership rules. All of the legwork to synchronize jig objects with their blockchain tokens can be handled by a common token system that is shared for all jigs.

The disclosure can provide a high-level overview of the descriptions for this embodiment. First the disclosure will describe the relationship between jig objects and blockchain transactions. Each jig object is tokenized by storing its latest state in a transaction output. Executable transactions describe atomic state changes to the jigs represented by these outputs, where inputs to the transaction represent jigs being changed and outputs represent the new jig states. The programs in these executable transactions contain the actions performed on jig objects, stored as commands, and these actions either create new jigs or update existing jigs. Transaction inputs are the jigs used by the program that require an owner's approval. Transaction references are the jigs used by the program that do not require the owner's approval. At a high level, this is how jigs are stored in transactions.

Next the disclosure will describe how the programs are executed. A jig executor takes the input and reference jig states, along with the program, and generates the new jig output states. However, jig output states are data and cannot be acted upon directly. They first need to be turned into jig objects. To do this, the executor converts the jig states from the inputs and references into live jig objects using a recreate function. Then it performs every action in the program in sequence using both the loaded jig objects and any newly created jig objects. While executing these actions, a record data structure keeps track of every jig created, updated, or referenced as actions happen. To do this, jig objects are instrumented with special action handlers that intercept actions performed on the objects and update the record accordingly. These action handlers also enforce the jig ownership rules where necessary. Upon completion of the actions, the executor generates new output states for each jig object created or updated in the record using a capture function. The jig executor is entirely deterministic meaning that re-executions of the same transaction always generate the same jig output states every time.

This describes how jig objects are stored in transactions and how executable transactions are executed, and finally the disclosure will describe how transactions are created. In some embodiments, to create transactions, applications or users perform actions on live jig objects just like the executor. Users are able to load a jig object from its location, which is an output on the blockchain, by recreating the live jig object from its jig state's in the output. This jig state may come from executing the program or from a state cache. Then, the user performs actions on the live jig objects to update their state. After performing these actions, the resulting record can be converted into an executable transaction to be broadcast to the blockchain. Other users then load these now-updated jigs by replaying the actions stored in the new transaction.

At a high level, this is how the jig blockchain system works, but there are many details to flesh out in the following sections. First, the disclosure will describe the structure of transactions in the jig blockchain system from the bottom-up. The disclosure will describe how jigs are stored in output states, how those output states are part of executable transactions, how the programs are structured, and what commands may be included in the programs. Then, the disclosure will describe how actions on jig objects produce jig transactions. The disclosure will describe how jig objects relate to their output states as tokens, how to transform output states into jig objects and vice versa, how jig objects are instrumented to track their behavior, how actions on jig objects produce changes to a record, and how the resulting record is converted to an executable transaction. Finally, the disclosure will combine these ideas together to show how jig transactions are executed and verified and the disclosure will also discuss the requirements for programming languages to implement this embodiment.

Outputs

This section describes how jig objects can be stored in transaction outputs in the form of jig output states. In some embodiments, from a jig object, the jig system can create a jig output state and from a jig output state the jig system can produce a jig object. The two forms are equivalent. A jig output state is a data structure that captures all of the relevant information about a jig object at a point in time, including its type information, ownership information, location information, and properties. The jig output state is pure data though and cannot be acted upon. It cannot be used to perform actions the way that a jig object can be used because it is not the actual object. For example, here is a jig object being created on the left and then on the right the disclosure show its corresponding jig output state.

| Jig Object | Jig Output State |
|---|---|
| new Pet('Charlie') | {<br>  kind: 'instance',<br>  owner: <public key>,<br>  location: <reference to self>,<br>  origin: <reference to self>,<br>  nonce: 0,<br>  properties: { name: 'Charlie' },<br>  class: <reference to Pet class>,<br>  source: null,<br>  dependencies: null<br>} |

In some embodiments, the output state relates to the five jig properties from the Jig Objects section to show that the jig output state completely captures the state of a jig. State is represented by the properties field. Behavior is represented by the class reference whose functions are available to the instance. Location is represented by the location field, and also related to the origin and nonce. Type is represented by the class reference as well as the kind field. Finally, Owner is represented by the owner field. The source and dependency fields are not used for instance jigs but for class jigs they would be part of its State. In this way, the jig system can store all properties of jig objects in the jig output state.

In some embodiments, the jig output states can be the actual output states for executable transactions. This means that an executor can be able to generate the jig output state from a program, input states, and reference states. Remember though the jig output state is not stored in the transaction itself but generated on-demand and cached. Also, implementations may vary the following data structure so long as it fully captures the state of the jig object. The precise format is not very important to this embodiment but the disclosure can assume the following data structure for the purpose of describing the embodiment. However all jig output states may be valid outputs for an executable transaction meaning at minimum they may specify an owner.

In some embodiments, here is the data structure for the jig output state:

enum JigKind='class' or 'instance'
    struct JigReference {
      txid: TransactionHash or NULL,
      vout: number
    }
    struct JigOutputState {
      kind: JigKind,
      owner: PublicKey,
      location: JigReference,
      origin: JigReference,
      nonce: number,
      properties: Object,
      class: JigReference or NULL,
      source: string or NULL,
      dependencies: Map<string to JigReference> or NULL
    }

Here are descriptions for each of the above data structures and fields in them:

JigKind

In some embodiments, this is the kind of jig object. The disclosure describes two jig kinds in this jig blockchain system: class jigs and instance jigs. When the target programming language for jigs supports the everything-is-an-object model, other jig kinds may be defined for other kinds of objects such as functions, attributes, interfaces, etc. These become increasingly language-specific though and someone with the capability to implement class and instance jigs would be able to apply the same principles to define other kinds of objects.

JigReference

In some embodiments, this is a link to a jig output on the blockchain, meaning this is a reference to a particular jig state. From the reference, the jig system can load the output state and then load the jig. Jig references are used whenever one jig refers to another jig in its output state. For example, an instance jig object can have a reference to its class jig that defines its behavior. The txid property in the JigReference may be NULL and when it is NULL it refers to the current id of the transaction containing the output state. The jig system can store this as NULL because the current txid cannot be known when the output state is being built because those output states contribute to determine the txid because of the hashes in the executable transaction.

JigOutputState

In some embodiments, the JigOutputState is the data structure that is an Output for an executable transaction. The disclosure described earlier that the Output data structure in executable transactions need not contain just an amount and owner. The disclosure will now describe each property:

kind—Whether the jig is a class jig or an instance jig owner—The public part of the owner of the transaction output. This may be a public key, a locking script or another such ownership mechanism. The jig system can use public keys for simplicity. The owner may also be a higher-level object that may be converted to a native UTXO-owner.

location—A reference to the output that stores this jig state. This is used to identify the jig's current state.

origin—A reference to the first output for a jig. This is used to uniquely identify the jig across all future states.

nonce—The nonce, which stands for number-used-once, is a counter that starts at 0 for the first transaction and is incremented for every subsequent transaction this jig is updated in. The nonce is used to compare two jig states to determine which is more recent without inspecting the blockchain.

properties—A non-jig object that contains all of the properties, also called fields, member variables, or object state, of the jig. If an instance has a member variable, then it is stored here. If a class has a static property, then it is stored here. These properties may themselves have inner objects and other data structures, including inner jigs. Inner jigs are stored using JigReferences.

class—If this jig is an instance jig, then class is a reference to the class jig that has its behavior. If this jig is a class jig, then this value is NULL.

source—If this jig is a class jig, then source is the source code for the class. It should contain both the instance methods and any static class methods. If this jig is an instance jig, then this value is NULL and not used. The format of the source code can be language-specific.

dependencies—If this jig is a class jig, then the code for the class might depend on other jigs. The dependencies is a map from dependency names to their jig references. This is needed to recreate the class jig from its source code because source code often has requirements on other code. For example, if a class extends from another class, then the parent class can be a dependency. However, if the jig is an instance jig, then this value is NULL.

In addition to being stored in outputs, in some embodiments, the jig output state stored above is also stored in the state cache as described in the executable transaction section. This allows the jig object to be quickly recreated without having to rerun the program in the transaction. Also, there is a capture operation to turn a jig object into a jig output state, and a recreate operation to do the reverse. These are described in the Transformations section below.

Transactions

This section describes how transactions using jigs are structured, using executable transactions as a base. In some embodiments, jig transactions are executable transactions specifically customized for jigs. Jig output states are created as a result of running the program in the executable transaction. The transactions describe atomic updates to jigs. Atomic means that all of the actions happen together as a unit and any in-between state cannot be used outside of the transaction. Jig transactions then are similar then to transactions in traditional databases except that jigs instead of tables are updated. Overall, the structure of a jig transaction is the same as the structure for an executable transaction. this data structure is repeated here:

```
struct Input {
    txid: TransactionHash,
    vout: number,
    proof: Signature
}
struct Reference {
    txid: TransactionHash,
    vout: number
}
struct JigTransaction {
    inputs: [Input],
    references: [Reference],
    program: Program,
    hashes: [OutputHash]
}
```

In some embodiments, the jig transactions can be defined by:

```
struct Command {
    name: string,
    data: Object
}
struct Program {
    commands: [Command],
    owners: [PublicKey]
}
```

In some embodiments, these commands each have a name and some corresponding data that is specific to that command. Commands may be thought of as instructions for the executor to perform on jig objects. For example, creating a new class jig can store a command named deploy in the transaction with data that describes the source code, dependencies, and properties for the new class jig being deployed. The exact format of the Command and the Program is not very important. For example, instead of using names to identify commands, it would be equivalent to identify commands with a number. Each command has data that is specific to that command, and in the Commands sections the disclosure describe several commands and how they are structured.

In some embodiments, the owners field of a program requires some explanation. Executing a command may create new jigs, and these new jigs need to be assigned owners. Although new jigs could and will sometimes be assigned owners at their time of creation, either explicitly by the code or implicitly when inherited from a parent jig, if the code does not set an owner of a new jig then an owner can be assigned by the executor from this owners list at the end of the execution of the program. The length of this owners array is thus the number of new jigs created that were not assigned owners during execution. Alternative approaches might include having a special command named initialOwners that behaves like the owners array, or specifying new jig owners within the commands that create them, or determining initial ownership from the resulting output script. The jig system can use an owners field to keep commands simple so they can be explained and also to show that the Program may contain data other than just the commands and that data is also used to generate the output states.

In some embodiments, note that unlike other tokenization protocols, there is no direct link between jig input states and jig output states. That relationship can only be determined by the program. For example, a user looking at a jig transaction that has jig inputs and jig outputs would be unable to tell which jig inputs map to which jig outputs without running the program. Some actions can create new jigs. Other actions may change jigs. Some jigs can be spent simply for authorization and some jigs may be destroyed as described in an extension. It is possible to include in a jig transaction a mapping between inputs and outputs if it were useful but that would add extra data to the transaction so it is not included in this embodiment.

In some embodiments, the jig blockchain system does not specify whether the transaction described above is for Layer 1 or Layer 2. Both are possible using the process to convert Layer 1 executable transactions into Layer 2 UTXO-based transactions as described in the executable transactions section. The disclosure can assume the jig transaction format described above going forward and make no assumptions on the underlying blockchain.

Commands

This section describes the command data structure stored in transactions that records changes to jigs. The disclosure now describes the data structures for the commands stored in programs. In some embodiments, commands are instructions to the executor to perform actions on jigs. The disclosure will describe four specific commands that may be stored in a program. These four commands are non-exhaustive and they are only meant to show possible actions on and object-oriented interactions between different kinds of jigs. Additional commands may be added as needed to define other actions on jigs, and the disclosure will describe further commands in the Extensions section.

Every command stores its name and some data associated with it. The executor uses the name and data to perform actions on jig objects. The data for a command can be specific to that command, so the disclosure can show the data structures for several possible commands. See the Command data structure in the Transactions section above.

In some embodiments, many commands require references to jigs used in the transaction. For example, to create a new instance jig from a class jig, the class jig may be referenced somehow. This is non-trivial because commands, like outputs, are raw data and cannot store jig objects directly. Instead, the jig system need a way to refer to jig objects from the command. The jig system can not use the JigReference data structure from above either because commands may need to reference jigs that are not yet in a transaction and do not yet have an output.

Figure 28:
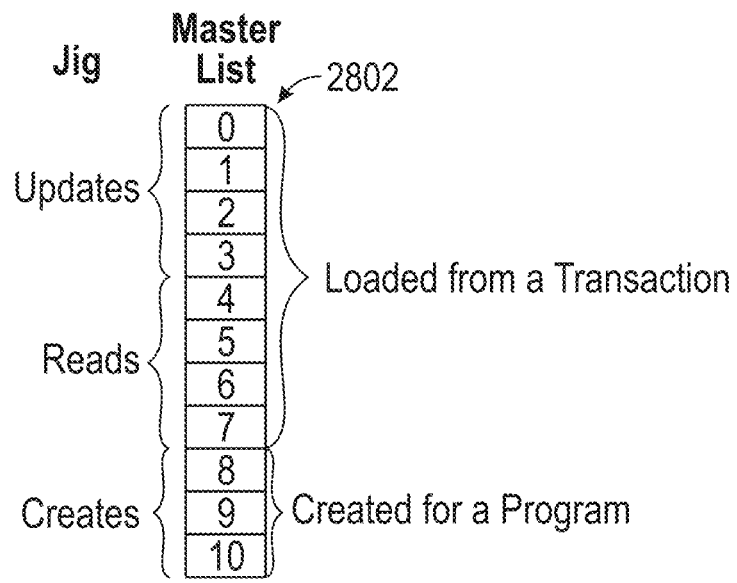
FIG. 28 illustrates an example structure of a master jig list used for local jig references according to some embodiments.

In some embodiments, to solve this, the jig system can define a master list of jigs used in a transaction. This master list of jig objects contains all jigs available for a command to use in a specific order. The master list may be an actual data structure stored in the executor or it may simply be implied to exist for the purpose of identifying jigs. The order of jig objects in the master list is:

1. Jig objects that are inputs in the transaction in their input order
2. Jig objects that are references in the transaction in their reference order
3. New jig objects created in order of their creation order FIG. 28 illustrates a structure of a master jig list 2802 used for local jig references according to some embodiments. When a command needs to reference a jig object in a transaction, it can use an index into this list to refer to the jig and then the executor can find the jig when executing the command. A LocalJigReference is the name the disclosure give to the data structure that stores an index into this master list. Whenever {"$localJigReference": <n>} is seen below in examples, this is a reference into the master list at index n. It can be used in several command data structures.

A master list is not the only way to reference jigs from inside commands. All that is needed is a consistent system to reference jig objects available to the command that allows for new jigs created to be referenced after they are created. It is actually possible to use the JigReference data structure from before to reference jigs but only if the jig transaction outputs are created as jigs are updated or created. The embodiment described here delays the creation of the outputs until the record is being published. However, there are other reasons to prefer the LocalJigReference over the JigReference. The JigReference form complicates delete functionality which is described in the Extensions section. Also, any jigs referenced still require the executor to perform worldview unification with other jigs in the master list before they can be used, so the JigReference form is not as clean as it might first appear. Worldview unification is described more in the Executor section.

Now the disclosure defines four possible commands:

Deploy

This section describes the deploy command, which is one possible command to create a jig class in a transaction. In some embodiments the deploy command creates a new jig class with the specified source code and dependencies. The deploy command records all information needed to recreate the class, including its source code, dependencies, and static properties. Classes often rely on other classes, either through inheritance or code dependencies. For example, classes may extend from other classes, read other classes in their logic, create instances of other classes in their methods, etc. These dependencies are not part of the class source code but they are used by the class. Therefore, they may be provided as part of the deploy command.

In some embodiments the deploy command has the following data structure for its command data:

struct DeployCommandData {
    source: string,
    dependencies: Map<string, LocalJigReference>,
    properties: Object
}

In some embodiments the meanings of these fields are:

source—The source code for the class that may include both methods and static methods dependencies—Other jigs that this new jig class depends on. They are indexed by their name which is used in the source code to refer to the jig.

properties—Static properties of the class

In some embodiments an example deploy command as it may be stored in a program can be:

```
{
    "name": "deploy",
    "data": {
        "source": "class ImagePost extends Post { setImage(text) { this.text = text } }",
        "dependencies": Map {
            "Post": { "$localJigReference": 0 }
        },
        "properties": { }
    }
}
```

Instantiate

This section describes the instantiate command, which is one possible command to create a jig object from an existing jig class in a transaction. In some embodiments the instantiate command creates a new instance jig from an existing class jig. The instantiate command requires a class jig and the arguments to the class's constructor.

In some embodiments, the instantiate command has the following data structure for its command data:

struct InstantiateCommandData {
    class: LocalJigReference,
    args: Object
}

In some embodiments the meanings of these fields can be:

class—The class jig that is instantiated to create a new instance jig args—The arguments passed to the class's constructor used to create the jig In some embodiments an example instantiate command as it may be stored in a program can be:

```
{
    "name": "instantiate",
    "data": {
        "class": {"$localJigReference": 1},
        "args": [ ]
    }
}
```

Call

This section describes the call command, which is one possible command to call a method on a jig instance or jig class to update it in a transaction. In some embodiments the call command calls a method on a jig instance or calls a static method on a jig class. Static methods on classes are just like methods on instances. They can change the state of the object. Therefore, the jigs system can have a single call for both kinds of jigs.

In some embodiments the call command has the following data structure for its command data:

struct CallCommandData {
    target: LocalJigReference,
    method: string,
    args: Object
}

In some embodiments the meanings of these fields can be:

target—The class or instance jig whose method is being called method—The name of the method being called args—The arguments passed to the method In some embodiments an example call command as it may be stored in a program can be:

```
{
    "name": "call",
        "data": {
    "target": {"$localJigReference": 0},
    "method": "f"
        "args": [ ]
    }
}
```

Upgrade

This section describes the upgrade command, which is one possible command to change the behavior for a jig class in a transaction. In some embodiments the upgrade command upgrades a class jig with new code, dependencies, or properties. Upgrading a class jig can completely upgrade the functionality of not just the class but potentially any instance jigs that were created from this class jig depending on the rules for how jigs may be referenced. Its data is similar to a deploy command data except that the command is applied to an existing class jig instead of creating a new class jig.

In some embodiments the upgrade command has the following data structure for its command data:

```
struct UpgradeCommandData {
    target: LocalJigReference,
    source: string,
    dependencies: Map<string, LocalJigReference>,
    properties: Object
}
```

In some embodiments the meanings of these fields can be:
target—the class jig to upgrade
source—The source code for the class
dependencies—Other jigs that the new code depends on
properties—Static properties of the class In some embodiments an example upgrade command as it may be stored in a program can be:

```
{
    "name": "upgrade",
        "data": {
 "jig": { "$localJigReference": 0 },
        "source": "class ImagePost2 extends Post { setImage(text, filter)
{ this.text = text; this.filter = filter } }",
            "dependencies": {
        "Post": { "$localJigReference": 1 }
    },
    "properties": { }
    }
}
```

Before continuing, it may be helpful to see some examples. The Examples section at the end of this document shows various actions performed on jigs and the resulting transactions that are created from those actions. While the disclosure has not explained how actions translate into commands, it may still be useful to see what data is stored in a transaction. These example transactions include their commands and use the data structures described above. This description so far of the jig blockchain system has concerned itself with how jig transactions are structured to describe actions on jigs. Now the disclosure will switch gears and describe the relationship between jig objects and the outputs of these transactions. the disclosure will describe how actions on jigs produce changes to a record and then how changes to a record result in a new transaction. First, the disclosure will relate jig objects to jig outputs in a system that is called tokenization.

Tokenization

Figure 29:
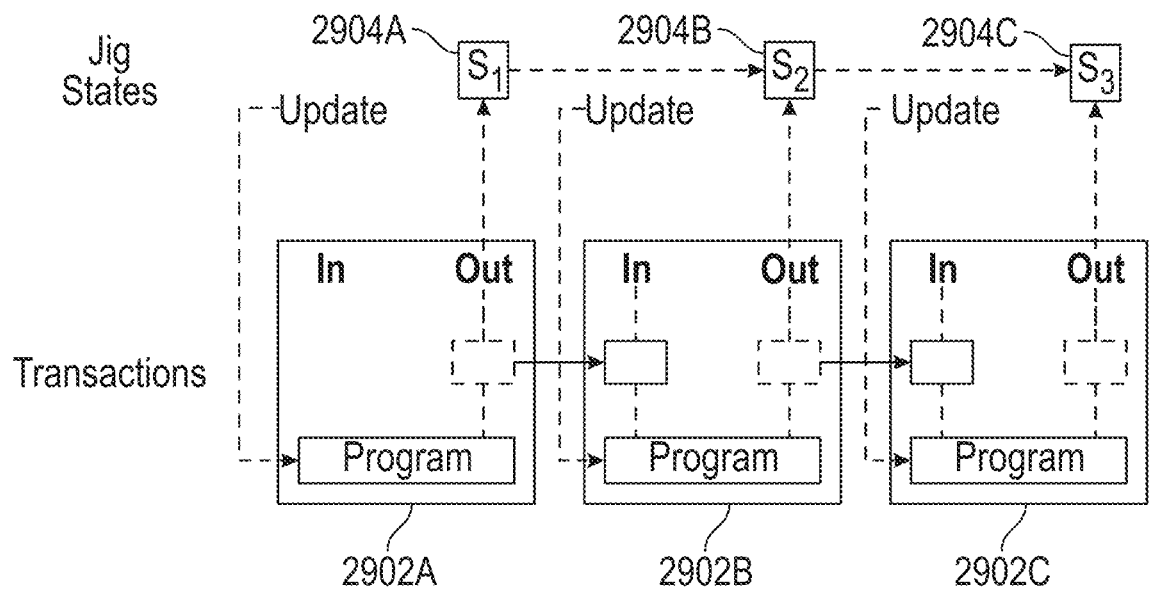
FIG. 29 illustrates an example jig object moving from output to output as its state is updated according to some embodiments.

This section describes how jigs can be identified and tracked using outputs on the blockchain as they change over time. FIG. 29 illustrates a jig object 2902A, 2902B, 2902C moving from output to output as its state 2904A, 2904B, 2904C is updated according to some embodiments. The disclosure will now show how jig objects become tokens. One definition of a token is an individually owned asset stored on a blockchain. A jig object is a token just as a ticket or share of stock might be a token. Token is a user concept. Jig transactions are simply the way that the jig as a token is recorded on the blockchain. Because jig objects change over time, their locations may also change over time. The disclosure already described how jig output states can store the state of a jig at a point in time. Now the disclosure will complete the picture and show how jig objects are fully represented by these outputs as tokens.

In some embodiments, the transaction that first creates a jig contains the jig's first output state and that first output state is special. This first output state is called the origin of the jig object and it can be referenced by its txid and vout. No matter how a jig changes over time, its origin can always uniquely identify the jig in relation to other jigs. This is because jigs are inspired by linear logic and they can never be copied or exist at two different locations on the blockchain. Jigs can only be moved from one location to another. Every jig can be described as a single chain of outputs on the blockchain that represent its past and present states. This property is important because it means that jigs are more like physical objects that exist at a single place and time rather than digital data that can be copied at will. This property is partially enforced by the blockchain system too because jig states are stored in outputs and outputs can only be spent once.

In some embodiments, as a jig is updated, new transactions are created that record its changes. After every transaction the jig can be assigned a new location whose output stores its new state. One should not assume that a jig's location is always an output however. For the sake of explanation, the disclosure can often describe jig locations as outputs, but this is not necessarily the case. In the Extensions section, the disclosure can describe a process to delete jigs. Deleted jigs can exist at a fixed location on the blockchain but they can not have an output and they cannot be updated.

One should also not assume that a jig's current location is unspent. In some embodiments, if a jig output was spent incorrectly, which is possible in an L2 token system, then the last valid output can have the permanent state of the jig. This allows jigs to continue to be used even after their outputs are spent incorrectly. In other token systems, spending a token output incorrectly would destroy the token but jigs need to safely interact with other jigs so by convention the jig system can not allow one jig to invalidate another jig in this way.

In some embodiments, the tokenization process described above is a method where a jig object is represented by a sequence of locations on the blockchain starting at an origin where each location represents a particular state of the jig at a moment in time. See the figure above for an example of a jig being updated three times and having its location changed as a result of performing actions. Other jigs may undergo updates in the same transaction and jigs may interact together to have their locations updated simultaneously. The flow for how actions are performed on jigs, how jigs interact, and how jig transactions are produced can be described in the following sections.

Actions

This section describes how programming language statements that use objects, called actions, relate to an overall system that understands these actions and creates transactions. In some embodiments, it is possible to perform actions on jig objects. Example actions include calling a method on an instance, creating an instance from a class, or reading a property of the object. When the disclosure use the term action, the disclosure is referring to either language-level operations the programmer may perform on a jig object or custom functions defined by the jig blockchain system that may be performed on jig objects. Different languages and different kinds of jigs can support different actions, so the disclosure will not prescribe any fixed set of actions for the jig blockchain system, but the disclosure can describe several possible actions that will be common to most jig blockchain systems.

Figure 30:
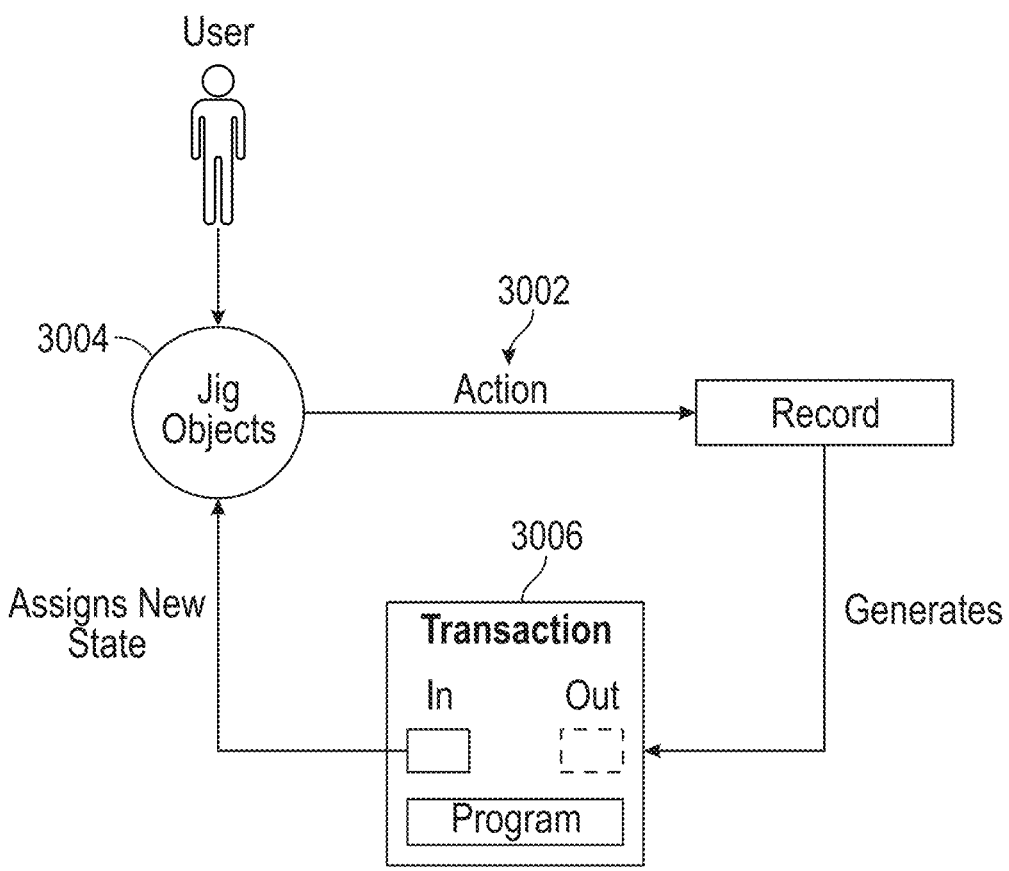
FIG. 30 illustrates an example of how an action on a jig object produces a transaction according to some embodiments.

In some embodiments, when an action is performed on a jig object, an action handler runs. The action handler is a special function that runs every time for that particular action. How this is implemented will be covered more in the Instrumentation section, but it suffices to say that every action can be intercepted. The role of action handlers is to update the record, which is a special data structure to keep track of the actions that were performed and the jigs that were used. This record has a real-time perspective of the effects of jigs as they happen. When all actions are finished, which includes recursive actions, the record is turned into a jig transaction to be published. The resulting transaction is then used to update the locations of the jig objects. FIG. 30 illustrates how an action 3002 on a jig object 3004 produces a transaction 3006 as described above according to some embodiments.

For a simple example, a user's social media post may be a jig object. The user may call a method on the jig object to change its content. This action creates a new entry in the record for this method call. When the method call is finished, the record is converted into a jig transaction that stores a call command in its program. The state of the post jig is captured, hashed, and placed into the transaction's hash list. The post jig's output is spent because the post is updated and a new output can be created for the post jig. The transaction can be published and then the post jig object's location and nonce properties can be updated.

In some embodiments, the table below illustrates the relationship between jig objects and jig output states, and between the local objects and the blockchain data.

|  | Application Code | Blockchain Data |
| --- | --- | --- |
| Jig | Jig object | Jig output |
| How updated | Action | Command |
| How recorded | Record | Program |
| Data structure | Instrumented object | Output state |
| Where stored | Local memory | Blockchain transaction |

Now the disclosure can go into more detail about actions. In some embodiments, not every action performed on a jig can be recordable in a program as a command. For example, simply reading a property of a jig does not trigger a change in any jig state so it would not generate a transaction. Therefore, the disclosure have not defined a command to read a jig property and this read action can also not be recorded in the record, although any jigs read can be stored in the record's read set. Only actions that trigger state changes or further actions need to be recorded in the record for the record to be able to enforce the jig ownership rules. The record itself can have logic to decide whether a transaction needs to be published even after actions have been added.

Next, in some embodiments, some actions that the language supports are not valid in programs at all times and may be disabled by throwing errors in their action handlers. These include:

Unsupported actions—Some actions cause the jig to go into undesirable states and they should be disabled entirely. For example, some languages allow objects to be frozen and never able to be updated again. A particular jig blockchain system might not allow that. This action would be disabled by having the action handler throw an error.

Protected actions—Some actions may only be called by certain jigs or only in certain situations. These are called protected actions. For example, setting a property may only be allowed by the current jig within one of its methods. The set property action handler would need to check whether it is inside one of its jig method calls by inspecting the record state. This is shown in code later. In the Extensions, the disclosure also describes private properties where reading these properties is only allowed by the current jig or a jig of the same class. This is another example of a protected action and these enforce the encapsulation properties of objects for jigs.

In some embodiments, some actions can trigger other actions. For example, a method call might call other methods, set properties, or create new instance jigs. At any point in time, there is an action call stack stored in the record that describes the total set of actions being performed from the outermost action at the bottom of the stack and innermost action at the top of the stack. When actions trigger other actions, the originating action is a special action called the top-level action. It is only necessary to record this top-level action as a command in the program because all other actions can be re-performed when the top-level action is executed since the system is deterministic. The record can keep track not only of the action stack but of the top-level actions that were performed that need to be converted into commands in a program when the transaction is created. There can be more details about this in the Record section.

Now the disclosure will describe several transformations between different jig forms which is a prerequisite before the disclosure describes the Record, the Action Handlers, and the Executor.

Transformations

Figure 31:
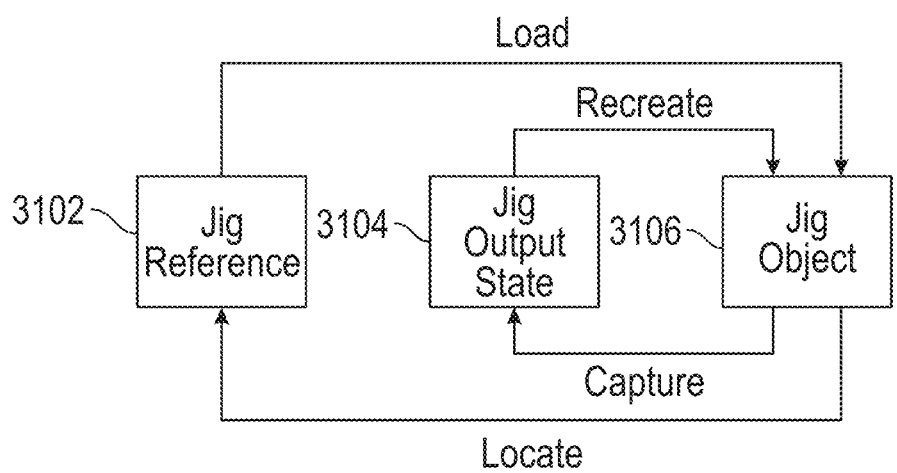
FIG. 31 illustrates an example transformation between jig references, jig output states, and jig objects according to some embodiments.

This section describes the functions that convert between different forms of jigs, as a reference, as an output state, and as a live object. FIG. 31 illustrates an example transformation between jig references 3102, jig output states 3104, and jig objects 3106 according to some embodiments. The jig blockchain system has several functions to convert between jig references, jig output states, and jig objects. These different jig forms are all equivalent in the sense that they describe the same jig but each form has different capabilities and each is used in different places. FIG. 31 shows these different forms and the functions that transform them. Here is a summary of each form:

Jig Reference—A location on the blockchain that can be used as an address for storing jigs in other jigs and for referencing jigs to load. It refers to a jig output state which is a jig object captured at a moment in time. More specifically, a jig reference is a txid and vout pair Jig Output State—A data structure that fully describes a jig object at a particular moment in time. It can be hashed and it is used as outputs of a jig transaction and also stored in the state cache.

Jig Object—An object that applications, users and other jigs may perform actions on. Actions on jig objects update the record which is used to create new transactions.

The disclosure now describes how to convert from one form to another. This code is JavaScript-like pseudocode but the disclosure can assume competence that these functions may be converted to the target programming language for the jig blockchain system.

Capture

In some embodiments, capture converts a jig object into an output state. This is used when the jig system needs to store the state of a jig object in a transaction output or state cache. The following pseudo-code shows the logic for capture. The encode method captures all of the properties of the jig object. In the example code, the jig system implements encode with a deepCopy function that clones an object as JSON, replacing any inner jigs with JigReferences. This encoder also correctly handles circular references. However, this encoder is only an example. Many alternative encoders can work and the specifics of this can depend on the target programming language and the features supported by the jig blockchain system.

```
function capture(jigObject) {
    var outputState = { }
    outputState.kind = getKind(jigObject)
    outputState.owner = getOwner(jigObject)
    outputState.nonce = getNonce(jigObject)
    outputState.origin = getOrigin(jigObject)
    outputState.location = getLocation(jigObject)
    outputState.properties = encode({ ...jigObject })
    if (outputState.kind === 'class') {
        outputState.source = getSourceCode(jigObject)
        outputState.dependencies = getDependencies(jigObject)
        outputState.class = null
    }
    if (outputState.kind === 'instance') {
        outputState.source = null
        outputState.dependencies = null
        outputState.class = locate(getClass(jigObject))
    }
    return outputState
}
function encode(obj) {
    return deepCopy(obj, locate)
}
function deepCopy(obj, jigHandler, seen = new Map( )) {
    var copy = { }
    // Allow circular dependencies
    if (seen.has(obj)) return seen.get(obj)
    seen.set(obj, copy)
    Object.getOwnPropertyNames(obj).forEach(name => {
        var value = obj[name]
        if (isJig(value)) {
            copy[name] = jigHandler(value)
        } else if (isNonJigObject(value)) {
            copy[name] = deepCopy(value)
        } else {
            copy[name] = value
        }
    })
    return copy
}
```

Recreate

In some embodiments, recreate converts a jig output state back into a jig object. This is used when loading jig objects from the state cache or from any other output state. The following pseudo-code shows the logic for recreate:

```
function recreate(outputState) {
    let jigObject=null
    if (outputState.kind==='class') {
        jigObject=createClass(outputState.source,
            outputState.dependencies)
    }
    if (outputState.kind==='instance') {
        var Class=load(outputState.class)
        jigObject={ }
        setClass(jigObject, Class)
    }
    Object.assign(jigObject, decode(outputState.properties))
    setOwner(jigObject, outputState.owner)
    setNonce(jigObject, outputState.nonce)
    setOrigin(jigObject, outputState.origin)
    setLocation(jigObject, outputState.location)
    instrumentJig(jigObject)
    return jigObject
}
function decode(obj) {
    return deepCopy(obj, load)
}
```

Locate

In some embodiments, locate converts a jig object into a JigReference. This is used whenever the disclosure needs to refer to a jig object but cannot store the jig object directly, such as in a jig output state. CURRENT_TRANSACTION is the blockchain transaction that is currently being created or loaded. Here is pseudo-code for locate:

```
function locate(jigObject) {
    var location=getLocation(jigObject)
    if
        (location.txid===CURRENT_TRANSACTION.txid)
    {
        return new JigReference(NULL, location.vout)
    } else {
        return new JigReference(location.txid, location-
            .vout)
    }
}
```

In some embodiments, the locate function may need to be more complex when the CURRENT_TRANSACTION that the jig is in has not yet been created, such as when calculating the hashes of the output states. In this case, a temporary transaction might be created for CURRENT_TRANSACTION and a temporary location assigned to the jigObject being located before locate is called.

Load

In some embodiments, load converts a jig reference into a jig object. Users call this function to load jig objects from the blockchain given their location. Here is pseudo-code for load:

```
function load(jigReference) {
    if (STATE_CACHE.has(jigReference)) {
        var outputState = STATE_CACHE.get(jigReference)
        return recreate(outputState)
    }
    var transaction = fetchTransaction(jigReference.txid)
    var inputJigs = transaction.inputs.map(input => load(new
        JigReference(input.txid, input.vout)))
    var referenceJigs = transaction.references.map(ref =>
        load(new JigReference(ref.txid, ref.vout)))
    var inputStates = inputJigs.map(capture)
    var referenceStates = referenceJigs.map(capture)
    var outputStates = execute(transaction.program,
```

```
        inputStates, referenceStates)
        var outputStateHashes = outputStates.map(generateHash)
        if (!sameHashes(outputStateHashes, transaction.hashes))
            throw new Error( )
        return recreate(outputStates[jigReference.vout])
    }
```

The above code is a very simple version of load. It is possible to modify this version to improve its performance by including some of the functionality of execute within load so as not to have to capture and recreate jigs before and after every execute call.

Instrumentation

This section describes that jig objects must have all of their actions interpreted by some runtime environment so that a transaction can be created. In some embodiments, in order for jigs to update the record, every action performed on jigs may be intercepted and handled. Instrumentation is the process of modifying either existing code or the runtime environment to add new behavior. Each jig object can be instrumented to have its actions intercepted. Jig objects can effectively have a membrane or proxy around them that intercepts all incoming actions, even internal ones. The action handlers, also called hooks or trampolines, are functions that are called whenever an action is performed on the object. These handlers can be described in the Action Handlers section. This section will describe how instrumentation is to be implemented at a high level.

Figure 32:
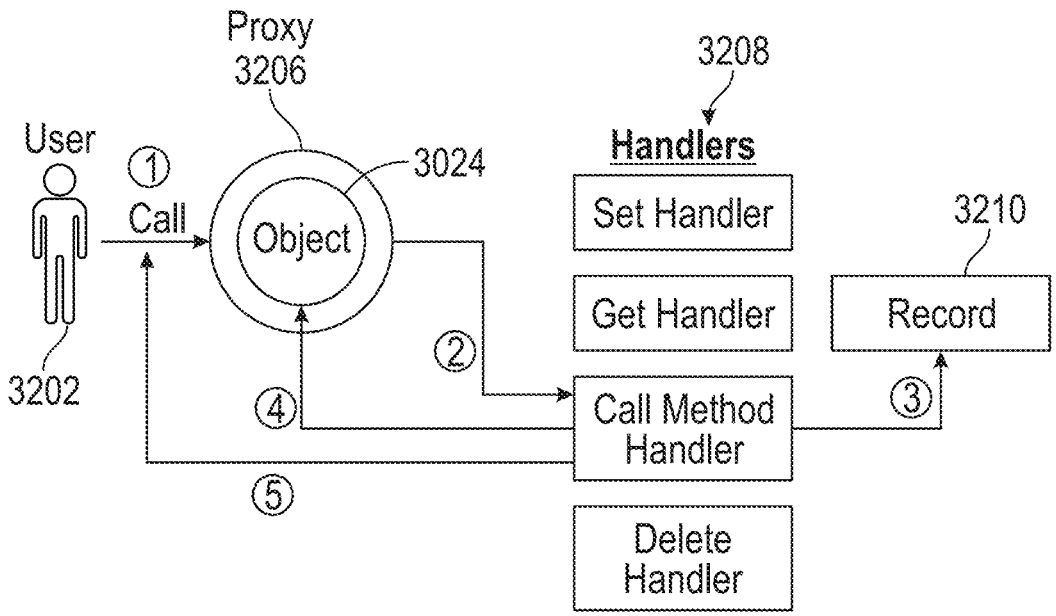
FIG. 32 illustrates an example of calling a method and the relationship between the user, object, proxy, handler, and record according to some embodiments.

In some embodiments, there is an instrumentJig function that turns on the action handlers for a given object, effectively turning the object into a jig object. It may not always be possible to instrument an existing object in the target programming however. Sometimes the object may be created from scratch with the instrumentation. In those languages, a new object instead might be returned that has the same API as the original and code that calls instrumentJig would need to be modified to use this new object instead. In either case, the result of calling instrumentJig is a proxy object and shown below. In JavaScript, this could be implemented using the Proxy class. FIG. 32 illustrates calling a method and the relationship between the user 3202, object 3204, proxy 3206, handler 3208, and record 3210 according to some embodiments.

In some embodiments, the below JavaScript code can be applied to intercept calling a method, setting a property, getting a property, and deleting a property on an object. The return value is the jig version of the object. In practice there would be many more action handlers required since there are more actions possible on objects in JavaScript but this shows the general idea.

```
    function setHandler( ) {/* . . . */}
    function getHandler( ) {/* . . . */}
    function deleteHandler( ) {/* . . . */}
    function callHandler( ) {/* . . . */}
    function instrumentJig(obj) {
        return new Proxy(obj, {
            apply: callHandler,
            set: setHandler,
            get: getHandler,
            deleteProperty: deleteHandler
        })
    }
```

Record

This section describes a data structure called the record that tracks the relevant actions performed on jigs so that they can be turned into a transaction. In some embodiments, the record stores the actions performed on jigs objects as they happen. It is the surveillance system to track jig objects as they are used. When all actions complete, the record is turned into a jig transaction so it is crucial to the system. The record also enables jigs to interact because if every jig attempted to create its own transactions then the jig system would not be able to support the rich interactions between multiple jigs. It is important that the record be outside of any particular jig.

In some embodiments, the record knows what jigs were updated, created, and read, and in what order. This information is used to create the inputs, references, and output hashes of the transaction. It has an actions list, which are the top-level actions performed by jigs. When all actions complete, this stack is empty, and there is at least one action in the actions list, if there are any jigs updated or created then the record creates an executable transaction with actions stored as commands in the program. Finally, it has an action call stack that stores the active actions that are running. This is used by action handlers to know the context of their action. This is the high-level idea behind the record.

Figure 33:
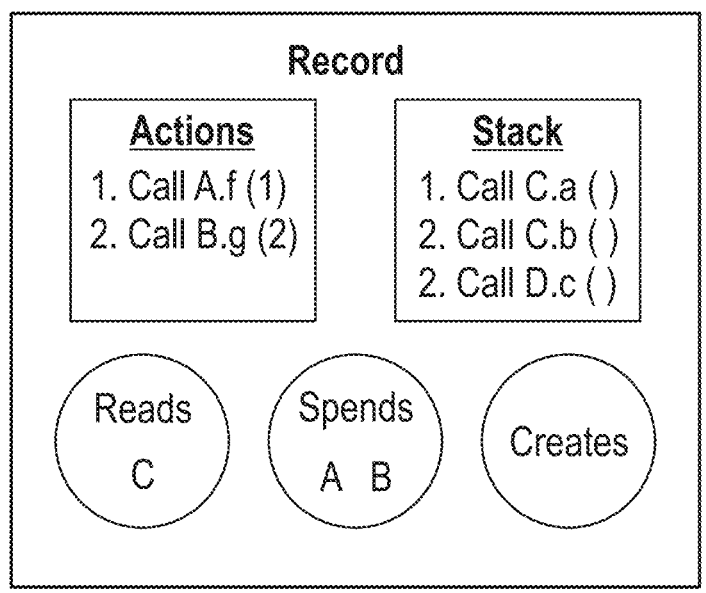
FIG. 33 illustrates example data structures in the record according to some embodiments.

In some embodiments, there is one record updated at a time in the system and the disclosure refer to it below as CURRENT_RECORD, or simply the record. The CURRENT_RECORD is the record instance being appended to with new actions, stack changes, spends, creates, and deletes. When an action is complete, the CURRENT_RECORD is published and reset. The system supports having other records too, for batching purposes and delayed publishing, but the CURRENT_RECORD is the only one actively being updated by jigs. FIG. 33 illustrates data structures in the record according to some embodiments.

In some embodiments, the data structure for the Record can be:

```
    struct RecordedAction {
        name: string,
        jig: JigObject or NULL,
        data: Object
    }
    struct Record {
        actions: [RecordedAction],
        stack: [RecordedAction],
        reads: [Jig],
        spends: [Jig],
        creates: [Jig]
    }
```

In some embodiments, the RecordedAction is the equivalent to a command in the record. It stores an action that occurred. It also stores a target JigObject if it exists. This action is converted into a command later, but unlike commands, RecordedAction instances store live jig objects in their data rather than local jig references. This is important so that action handlers can use these data structures to understand their context.

In some embodiments, descriptions of the Record's entries can include:

actions—A list of top-level actions performed on jigs with any options or parameters used with them. Only top-level actions are recorded because all inner actions can be regenerated from them.

stack—The current action call stack for jigs. When a user performs an action, that action may trigger inner actions. When an action starts, it is added to the stack. When it finishes, it is removed from the stack. When an action is the last action on the stack, it is added to the actions array because it is a top-level action.

reads—The ordered set of jigs whose state was read in this transaction. Reading means accessing any mutable properties of the jig as part of the action. Their outputs can be stored as reference outputs in the executable transaction.

spends—The ordered set of jigs changed in this transaction. Their outputs can be spent as inputs and they can receive new token outputs in the transaction.

creates—The ordered set of jigs created in this transaction. They can be assigned new token outputs.

Publish

In some embodiments, there is a function to publish a record when it is complete. This converts the record into an executable transaction and broadcasts the transaction to the blockchain network. Then, the jig output states are updated for the jig objects. Here is pseudo-code for publish:

```
function publish(record) {
  var inputhg s=record.spends
  var outputJigs=record.spends+record.creates
  var referenceJigs=record.reads−record.spends−record.creates
  outputJigs.forEach(jig=>setNonce(jig, getNonce(jig)+1))
  var owners=[ ]
  outputJigs.forEach(jig=>{
    if (!getOwner(jig)) {
      owners.push(nextOwner( )
      setOwner(jig, owners[owners.length−1])
    }
  })
  var jigOutputStates=outputJigs.map(capture)
  var hashes=jigOutputStates.map(generateHash)
  var commands=record.actions.map(createCommand)
  var program={commands, owners}
  var transaction=new Transaction( )
  transaction.inputs=inputJigs.map(locate)
  transaction.program=program
  transaction.hashes=hashes
  transaction.references=referenceJigs.map(locate)
  addFees(transaction)
  signInputs (trans action)
  broadcast(transaction)
  record.reset( )
  for (let vout=0; vout<outputJigs.length; vout++) {
    /// Note: vout will start with 1 if this is an L2 transaction
    var location=new JigReference(transaction.txid, vout)
    setLocation(jig, location)
    if (!getOrigin(jig)) setOrigin(jig, location)
    STATE_CACHE.set(location, jigOutputStates[vout])
  }
}
```

In some embodiments, nextOwner is a special method that returns a new owner to assign to a jig. This is used if a new jig does not already have an owner assigned by a parent.

Combine

In some embodiments, two records may be combined together, creating a single record that contains both of their actions. The user would not typically perform this themselves. Instead, they would wrap calls to jigs between a begin and end calls that would automatically combine the records together. For example:

```
begin( ) // begins a combined record
a.f(1) // creates a record with an action for the a.f call
b.g(2) // creates a record with an action for the b.g call
end( ) // combines the two records together
```

In some embodiments, the begin and end functionality are trivial to implement once the combine method is written. When a transaction is published in between a begin and end call, instead of being published, its state is copied into a pending list and the CURRENT_RECORD is reset. When end is called, all records in the pending list are combined in pairs until there is one record and then the combined record is published.

In some embodiments, not all two records may be combined though. A record that updates a jig requires a spend, but if that jig was created in another record and assigned to another user in that transaction, the two records cannot be combined because there would be no input to the transaction that the new owner could sign. This complexity is part of implementing the ownership rules. The disclosure now describes the combine method below in pseudo-code that combines b into a:

```
function combine(a, b) {
  if (b.spends.some(jig=>wasOwnerReassigned(jig))) {
    throw new Error('Owner reassigned. Cannot combine')
  }
  a.spends=a.spends+b.spends−a.creates
  a.creates=a.creates+b.creates
  a.reads=a.reads+b.reads−a.spends−a.creates
  a.actions=a.actions+b.actions
}
```

In some embodiments, the wasOwnerReassigned function can depend on the jig metadata implementation, but it should compare the owner for changes from its previous state before any unpublished actions. This may require tracking additional information about the jig.

The disclosure described what is stored in the record, how the record is published, and how multiple records may be combined. The disclosure will now show the action handlers that add actions to the record.

Action Handlers

In some embodiments, the action handlers are central to implementing the jig blockchain system. These handlers intercept every action performed on jigs. Not only do they update the record, which is used to create transactions, but they also enforce many of the ownership rules of the jig blockchain system. The action handlers are a large part of the consensus mechanism for jigs.

In some embodiments, the disclosure includes 7 actions that can be performed on jig objects and their action handlers. These 7 actions are not exhaustive and not all are required to implement a jig blockchain system. However, they are representative of the kinds of actions that might be supported. The disclosure will define additional action handlers in the Extensions section.

The disclosure will show examples for how the user performs these actions and how these actions are stored in the record. When stored in a record, actions are stored as RecordedAction data structures. These are comparable to the Command data structures but whereas Commands store only data, the RecordedAction data structures store live objects. Each RecordedAction data structure that is stored in the record is designed to store a copy of the properties that were used to trigger the action.

Deploy a Class

This section describes how deploying a class changes the record data structure. In some embodiments, the data structure for the deploy action data that is stored in the record can be:

struct DeployActionData {
    source: string
    dependencies: Map<string, JigObject>,
    properties: Object
}

In some embodiments, users might perform this action by:
var dependencies={Post}
deploy(ImagePost, dependencies)

In some embodiments, when the deploy method is called, the class that is passed in should be converted into a jig. This process is specific to the programming language and environment, but it involves instrumentation to intercept all actions on the jig class. The dependencies in the example above are explicitly specified, but if the language supports reflection and querying these dependencies, passing them in can be optional.

In some embodiments, the logic for a basic deploy function can be:

```
function deploy(ClassToDeploy, dependencies) {
  begin( )
  // Deploy the parent
  var ParentJig = getParent(ClassToDeploy)
  if (ParentJig) deploy(ParentJig)
  // Deploy all dependencies
  var properties = { ...ClassToDeploy }
  deepCopy(properties, deploy)
  // Turn the class into a jig
  instrumentJig(ClassToDeploy)
  // Set an initial owner to the parent if it exists
  if (CURRENT_RECORD.stack.length) {
    var parent = CURRENT_RECORD.stack[CURRENT_RECORD.stack.length - 1].jig
    setOwner(ClassToDeploy, parent.owner)
  }
  // Create the action
  var data = new Deploy ActionData({
    source: getSourceCode(ClassToDeploy),
    dependencies: deepCopy(dependencies, jig => jig),
    properties: deepCopy(properties, jig => jig)
  })
  var action = new RecordedAction('deploy', ClassToDeploy, data)
  // Spend the parent
  if (ParentJig) CURRENT_RECORD.spends.add(ParentJig)
  // Add all dependencies as references
  deepCopy(properties, CURRENT_RECORD.reads.add)
  deepCopy(dependencies, CURRENT_RECORD.reads.add)
  // Add the action
  CURRENT_RECORD.actions.add(action)
  // End and publish the record
  end( )
}
```

In some embodiments, parents and dependencies are deployed before the class is deployed in the above example. This means that circular dependencies cannot be supported. To support circular dependencies, the jig system would modify the deploy action in order to deploy multiple classes together at once. This is not difficult, but it would make this explanation more complex and is not required to describe the embodiment as a whole. A programmer capable of implementing the jig blockchain system could extend it to support circular class references.

In some embodiments, the jig system can also use the deepCopy method from earlier to visit all jigs in the dependencies and properties. Also note that the jig system spend the parent class jig. This is not a requirement for all jig blockchain systems, but it enforces that only owners of classes can extend those classes. This allows logic to rely on the fact that if a class has a parent, the parent's owner approved of that class and it is unlikely to be dangerous.

Call a Method

This section describes how calling a method on a jig instance or class changes the record data structure. In some embodiments, the data structure for the call action data that is stored in the record can be:

struct CallActionData {
    jig: JigObject,
    method: string,
    args: Object
}

In some embodiments, users or jig code might perform this action by:
someInstanceJig.methodName(arg1, arg2)
or
SomeClassJig.staticMethodName(arg1, arg2)

In some embodiments, when the jig method is called, a special handler function is called that allows the jig system to intercept the method. Here is pseudo-code for that handler.

```
function callHandler(jig, name, args) {
  // Calling a method requires reading one of the methods
     from the class
  if (getKind(jig)==='class')  CURRENT_RECORD.read(jig)
  if (getKind(jig)==='instance') CURRENT_RECORD.read(getClassForMethod(jig, name))
  // Unify the worldview of the args with this jig
  var unifiedArgs=unifyWorldview(args, this)
  // Add a call action to the stack and record
  var data=new CallActionData({
    jig,
    method: name,
    args: deepCopy(args, jig=>jig)
  })
  var action=new RecordedAction('call', jig, data)
  CURRENT_RECORD.actions.add(action)
  CURRENT_RECORD.stack.push(action)
  // Disable the next call handler so the jig system can
     perform the method without recursing
  disableNextCallHandler( )
  // Call the method
  var ret=jig[name](unifiedArgs)
  // Pop the stack
  CURRENT_RECORD.stack.pop( )
  // Unify the worldview with the parent jig, if it exists
  if (CURRENT_RECORD.stack.length) {
    var jigReturningTo=
      CURRENT_RECORD.stack[CURRENT_RECORD.stack.length-1].jig
    var unifiedRet=unifyWorldview(ret, jigReturningTo)
    // Return a copy of the return value to prevent changes
       to it
    return deepCopy(unifiedRet, jig=>jig)
  } else {
    publish(CURRENT_RECORD)
    // Return a copy of the return value to prevent changes
       to it
    return deepCopy(ret, jig=>jig)
  }
}
```

In some embodiments, the unifyWorldview function needs some explanation. When a jig is passed arguments or a method returns a value back to another jig, there may be two jig objects that both refer to the same jig output state. One of those duplicate jig objects should be replaced by the other so that from the perspective of the jig code they are the same. The jig system unifies the jigs coming in as arguments and the jig system also unifies the jigs going out as return values. The jig system also uses this to detect if there are two jigs with the same origin but at different locations on the blockchain and different states. This is also not allowed because it leads to inconsistent logic. The unifyWorldview method works as follows:

```
function unify Worldview(...objects) {
    var jigs = new Map( ) // Origin -> Jig
    deepReplace(objects, jig => {
        var existing = jigs.get(getOrigin(jig))
        if (!existing) {
            jigs.set(getOrigin(jig), jig)
            return jig
        }
        if (existing && getLocation(jig) !== getLocation(existing)) {
            throw new Error('Inconsistent worldview')
        }
        return existing
    })
}
```

In some embodiments, deepReplace is like deepCopy except it replaces objects in-place rather than returning a copy. The disclosure assumes that the callHandler is called during instantiations when the constructor is called.

Instantiate a Class

This section describes how calling a creating a jig instance from a jig class changes the record data structure. In some embodiments, the data structure for the instantiate action that is stored in the record can be:

struct InstantiateActionData {
   class: JigObject,
   args: Object,
   jig: JigObject
}

In some embodiments, users or jig code might perform this action by:
   var instanceJig=new SomeJigClass(arg1, arg2)

In some embodiments, when the new operation is called, a special handler function is called on the class that allows the jig system to intercept its construction. Here is pseudo-code for that handler.

```
function instantiateHandler(ClassJig, args) {
    // Unify the worldview of the args with this jig
    var unifiedArgs=unify Worldview(args)
    var instanceJig={ }
    setClas s(instanceJig, ClassJig)
    instrumentJig(instanceJig)
    // Add an instantiate action to the stack and record
    var data=new InstantiateActionData(1
        class: ClassJig,
        args: deepCopy(args, jig=>jig)
        jig: instanceJig
    })
    var action=new RecordedAction('instantiate', jig, data)
    CURRENT_RECORD.actions.add(action)
    CURRENT_RECORD.stack.push(action)
    // Add the jig to creates and all jigs in the stack because
    // ownership is required to enact actions on other jigs
    // This is ownership rule #2.
    CURRENT_RECORD.stack.forEach
        (jig=>CURRENT_RECORD.spends(jig))
    CURRENT_RECORD.creates.add(instanceJig)
    callConstructor(instanceJig)
    if (CURRENT_RECORD.stack.length>1)}
        var parent=CURRENT_RECORD.stack[CURRENT_RECORD.stacklength −1].jig
        setOwner(instanceJig, parent.owner)
    }
    // Pop the stack
    CURRENT_RECORD.stack.pop( )
    if (!CURRENT_RECORD.stack.length) publish(CURRENT_RECORD)
    // Return the instance
    return instanceJig
}
```

Read a Property

This section describes how reading a property of a jig object changes the record data structure. In some embodiments, the read action does not change state so it does not have a data structure to be stored in a record.

In some embodiments, users or jig code might perform this action by:
   console.log(someJig.someVariable)

In some embodiments, whenever a read is performed, a special handler function is called on the class that allows the jig system to intercept its read and store a read reference in the record. Here is pseudo-code for that handler.

```
function getHandler(jig, name) {
    // Don't allow location, origin, or nonce, or owner to be
        read inside a jig. publish( ) can set these.
    if    (CURRENT_RECORD.stack.length   &&
        (name==='location'   II    name==='origin'   ||
        name==='nonce')) {
        throw new Error('This binding must not be read
            directly')
    }
    // Don't allow owner to be read inside a jig after it is
        reassigned
    if (name==='owner' && wasOwnerReassigned(jig)) {
        throw new Error('Owner was reassigned. Cannot
            read.')
    }
    // Disable the next handler so the jig system can
        perform the method without recursing into the handler again
    disableNextGetHandler( )
    // Read the value
    var value=jig[name]
    // If we're reading a non-jig object from outside, return
        a copy of that object that can't be changed
    if    (CURRENT_RECORD.stack[CURRENT_RECORD.stack.length-1]   !==jig   &&   isNonJigObject(value)) {
        return deepCopy(value, jig=>jig)
    }
    return value
}
```

In some embodiments, when an object is retrieved from outside the jig, a copy is returned. This is admittedly a simple approach but it suffices to explain the basic embodiment. Copying the result prevents the outer jig or user from modifying the object directly. However if the get handler is called by a method of the same jig, the object can be safely returned and modified directly. Also, the jig system doesn't allow code to access the owner after it has changed because owners may approve of all changes via a signature and they cannot sign until the next transaction when the owner has an output. Finally, for simplicity, the jig system doesn't allow reading the location, origin, or nonce, but it may be useful to allow their previous value to be read and used.

Set a Property

This section describes how changing a property of a jig object changes the record data structure. In some embodiments, the set action is not a top-level action so it does not have a data structure to be stored in a record.

In some embodiments, jig code might perform this action inside of a method can include:

this.x='newValue'

In some embodiments, when a property is set on a jig, a special handler function is called on the jig that allows the jig system to intercept its assignment. Here is pseudo-code for that handler.

```
function setHandler(jig, name, value) {
    // Only the current jig can set properties on itself
    if (CURRENT_RECORD.stack[CURREN-
        T_RECORD.stack.length-1].jig !==jig)
    {
        throw new Error('Cannot set property directly')
    }
    // Don't allow location, origin, or nonce to be read
        while they are unbound. publish( ) can set these.
    if (name==='location' || name==='origin' ||
        name==='nonce') {
        throw new Error('This binding must not be changed
            directly')
    }
    // Disable the next handler so the jig system can
        perform the method without recursing into the han-
        dler again
    disableNextSetHandler( )
    // Add this jig as an updated jig and all jigs in the stack
    // because ownership is required to enact actions on
        other jigs
    // This is ownership rule #3.
    CURRENT_RECORD.spends.add(jig)
    CURRENT_RECORD.stack.forEach
        (jig2=>CURRENT_RECORD.spends(jig2))
    // Set the property
    jig[name]=value
}
```

Delete a Property

This section describes how deleting a property of a jig object changes the record data structure. In some embodiments, the delete action is not a top-level action so it does not have a data structure to be stored in a record. It is very similar to the set action.

In some embodiments, the jig code might perform this action inside of a method by:

delete this.x

In some embodiments, when a property is deleted on a jig, a special handler function is called on the jig that allows the jig system to intercept its deletion. Here is pseudo-code for that handler.

```
function deleteHandler(jig, name) {
    // Only the current jig can delete properties from itself
    if (CURRENT_RECORD.stack[CURREN-
        T_RECORD.stack.length-1].jig !==jig)
    {
        throw new Error('Cannot delete property directly')
    }
    // Don't allow location, origin, or nonce to be deleted
    if (name==='location' || name==='origin' ||
        name==='nonce') {
        throw new Error('This binding must not be deleted
            directly')
    }
    // Disable the next handler so the jig system can
        perform the method without recursing into the han-
        dler again
    disableNextDeleteHandler( )
    // Add this jig as an updated jig and all jigs in the stack
    // because ownership is required to enact actions on
        other jigs
    CURRENT_RECORD.spends.add(jig)
    CURRENT_RECORD.stack.forEach
        (jig2=>CURRENT_RECORD.spends(jig2))
    // Delete the property
    delete jig[name]
}
```

Upgrade a Class

This section describes how upgrading the behavior of a jig class changes the record data structure. In some embodiments, the data structure for the upgrade action that is stored in the record can be:

```
struct UpgradeActionData {
    class: JigObject,
    source: string
    dependencies: Map<string, JigObject>,
    properties: Object
}
```

In some embodiments, the jig code might perform this action by:

var dependencies={ } upgrade(ImagePost, ImagePostWithFilter, dependencies)

In some embodiments, when the upgrade method is called, the class that is passed in should replace the code in the existing jig. This process is specific to the programming language and environment and may not even be possible in some languages. The dependencies in the example above are explicitly specified, but if the language supports reflection and querying these dependencies, passing them in can be optional.

In some embodiments, the logic for a basic upgrade function can include:

```
function upgrade(ClassJigToUpgrade, NewClass, dependencies) {
    // Deploy the parent
    var ParentJig = getParent(NewClass)
    if (ParentJig) deploy(ParentJig)
    // Deploy all dependencies
    deepCopy({ ...NewClass }, deploy)
    // Replace the class
    replaceClass(ClassJigToUpgrade, NewClass)
    // Create the action
    var data = new UpgradeActionData({
        source: getSourceCode(NewClass),
        dependencies: deepCopy(dependencies, jig => jig)
        properties: deepCopy({ ...NewClass }, jig => jig),
        class: ClassToUpgrade
    })
    var action = new RecordedAction('upgrade', jig, data)
    // Spend the parent
    if (ParentJig) CURRENT_RECORD.spends.add(ParentJig)
    // Add all dependencies as references
    deepCopy({ ...ClassToUpgrade }, CURRENT_RECORD.reads.add)
    deepCopy(dependencies, CURRENT_RECORD.reads.add)
    // Add the action
    CURRENT_RECORD.actions.add(action)
```

```
// Add the jig to creates
CURRENT_RECORD.creates.add(ClassToUpgrade)
// Publish the action
publish(CURRENT_RECORD)
    i.      }
```

In some embodiments, the replaceClass implementation is very implementation specific and can depend on the target programming language and runtime environment.

createCommand

In some embodiments, there is a createCommand function that is used by the record to convert RecordedAction data structures in the record's action list to commands in a program. Each top-level action has a corresponding command data structure. The createCommand function encodes the values from the action into the command, replacing all jigs with LocalJigReference their numbers in the master list. Here is pseudoCode for the createCommand for a single action.

```
function createCommand(action) {
    if (action.name === 'call') {
        return new Command({
            name: 'call',
            data: new CallCommandData({
                jig: getLocalJigReference(action.jig),
                method: action.data.method,
                args: encode(action.data.args)
```

```
            })
        })
    }
    // ... Create the rest of the commands from their actions ...
}
function encode(obj) {
    return deepCopy(obj, getLocalJigReference)
}
function getLocalJigReference(jig) {
    var masterList = CURRENT_RECORD.spends +
        CURRENT_RECORD.reads + CURRENT_RECORD.creates
    return { "$localJigReference": masterList.indexOf(jig) }
}
```

The disclosure has now finished describing 7 action handlers. When the user performs actions, these handlers are called and the record is updated. The record is then converted into a transaction and published on the blockchain. The last missing piece is how the programs stored in existing transactions may be replayed in order to regenerate the jigs. The next section describes that.

Executor

In some embodiments, the executor for a jig blockchain system is an implementation of the executor for executable transactions that processes programs in jig transactions. The following execute method works for a layer 1 system. It can be modified for a layer 2 system as described in the Layer 2 section under executable transactions. This code below uses a JavaScript-like language, but in order to be deterministic, this code would have to run in a sandbox. The disclosure can assume there is some sandboxing method that makes the programming language deterministic.

Here is pseudo-code for the executor:

```
function execute(program, inputStates, referenceStates) {
    // Recreate the jigs
    var inputs = inputStates.map(state => recreate(state))
    var references = referenceStates.map(state => recreate(state))
    // Update the inner refs of all inner jigs
    var all = inputs + references
    all.forEach(jig => updateInnerJigs(jig, all))
    // Add the jigs to the record
    inputs.forEach(jig => CURRENT_RECORD.spends.add(jig))
    references.forEach(jig => CURRENT_RECORD.reads.add(jig))
    // Helper method to get a jig from the master list
    var getJig = i => (CURRENT_RECORD.spends + CURRENT_RECORD.reads + CURRENT_RECORD.creates)[i]
    // Hook nextOwner to return the program.owners
    hookNextOwner(program.owners)
    // Run each command
    for (var command of program.commands) {
        switch(command.name) {
            case 'deploy': {
                var dependencies = deepReplaceLocalRefs(command.data.dependencies, getJig)
                var SomeClass = evaluate(command.data.source, dependencies)
                var properties = deepReplaceLocalRefs(command.data.properties, getJig)
                Object.assign(SomeClass, properties)
                deploy(SomeClass, dependencies)
            } break
            case 'instantiate': {
                var JigClass = getJig(command.data.class)
                var args = deepReplaceLocalRefs(command.data.args, getJig)
                new JigClass(...args)
            } break
            case 'call': {
                var jig = getJig(command.data.jig)
                var args = deepReplaceLocalRefs(command.data.args, getJig)
                jig[command.data.method](...args)
```

```
            } break
            case 'upgrade': {
                var jig = getJig(command.data.jig)
                var dependencies = deepReplaceLocalRefs(command.data.dependencies,
getJig)
                var SomeClass = evaluate(command.data.source, dependencies)
                var properties = deepReplaceLocalRefs(command.data.properties, getJig)
                Object.assign(SomeClass, properties)
                upgrade(jig, SomeClass, dependencies)
            } break
            default:
                throw new Error('Unknown command')
        }
    }
    // Return the output states
    var outputs = CURRENT_RECORD.spends + CURRENT_RECORD.creates
    // Reset the current record
    CURRENT_RECORD.reset( )
    return outputs.map(jig => capture)
}
function updateInnerJigs(target, otherObjects) {
    deepReplace(target, jig => {
        otherObjects.forEach(jig2 => {
            if (target === jig2) return jig
            if (jig.origin === jig2.origin && jig.nonce < jig2.nonce) {
                return jig2
            } else {
                return jig
            }
        })
    })
}
```

Language

This section describes the requirements of the programming language and runtime environment for jig objects so that they can be safely used in a blockchain system. Jig objects as described above were conceptual but to use them as part of a blockchain system the disclosure first needs a concrete programming language to define and update jigs. This language may or may not be the same language that implements the functions in the jig blockchain system. In some embodiments, jigs are not simply objects because they have ownership, location, and special type information, so there are two options: either extend an existing programming language to support jigs, or create a new programming language that enables jigs. Both are valid approaches.

In some embodiments, the requirements for a programming language to support jigs are:

1. Is class-based and supports classes as objects
2. Has the ability to store and read jig metadata like location and owner
3. Has the ability to intercept every action performed on jig objects that the language supports
4. Can be made deterministic for jig code In some embodiments, it is helpful to have the ability to access source code for classes as well as be able to create new classes from source code at runtime, but this is not required since jig code can be loaded at compile time as long as there is a unique way to identify it on the blockchain such as a hash. #1 is common in many existing programming languages. #2 is possible in most programming languages by designating specific properties on an object as special. #3 and #4 however are complicated. The disclosure does not prescribe a particular programming language, but the disclosure can assume that there is some deterministic class-based programming language used to represent jig objects and intercept every action performed on jigs that the language supports.

In some embodiments, to intercept every action performed on jigs in an existing language, there are two approaches. First, the jig system may wrap a standard object in the language with some kind of proxy that lets the jig system intercept every action performed on it at runtime. JavaScript for example supports proxies that do this. Second, runtime environments may support a debug mode that allows a host to step through instructions allowing interception when objects are used. This general approach of intercepting behavior in a program is called runtime instrumentation and it is very language specific.

In some embodiments, to make code deterministic, it is usually easier when using an existing language to disable all aspects of non-determinism. This includes network calls, disk reads, accessing global state, sometimes floating point calculations, etc. Sometimes it is possible to isolate code in a sandbox, like WebAssembly, to make code deterministic. CPU and memory can differ across environments, so there needs to be some way to handle errors that are due to non-deterministic environments by alerting the user. Sometimes it is preferable to just create a new programming and virtual machine from scratch that is deterministic like Solidity for Ethereum.

In some embodiments, there should be a way to differentiate jig objects from non-jig objects. Non-jig regular objects may be stored inside jig objects, and the jig system needs some way to detect jigs as jigs and non-jigs as non-jigs.

Here are three examples showing class and instance jigs being created and used in a JavaScript-like environment where Jig is a base class whose extensions distinguish jigs from non-jigs. The metadata properties like location and owner are properties of the jigs themselves in these examples. deploy is a function that publishes a jig to the blockchain. Other programming languages may specify classes and instances slightly differently. The specific language syntax is not important to the embodiment compared to the architecture of the system, but these examples help frame the embodiment.

In some embodiments, define a jig class by extending from the Jig base class and deploy it can include:

```
class Post extends Jig {
    setText(text) {
        this.text=text
    }
}
deploy(Post)
console.log(Post.location)
console.log(Post.owner)
```

In some embodiments, instantiate a jig class with the new operator and call a method by:

```
var post=new Post( )
post. setText('Hello, world')
console.log(post.location)
```

In some embodiments, upgrading a jig class with new code by:

```
class PostWithImages extends Jig {
    setText(text) {this.text=text}
    setImage(image) {this.image=image}
}
Post.upgrade(PostWithImages)
```

Summary

In some embodiments, one definition of object-oriented programming is building computer programs by creating objects that interact. The key benefit of the jig blockchain system, compared to prior blockchain systems, is that it enables rich interactions between objects that are tokens on the blockchain. All of the ways that objects interact in an object oriented programming language are possible jig interactions. Jigs also should behave like objects in object-oriented programming, so encapsulation, inheritance, composition, message passing, and polymorphism are all capabilities of a jig system. Specially, the possible interactions include:

reading the properties of one jig from another jig:
jig classes creating jig instances
jig instances creating other jig instances
jig instances storing jig classes
passing jigs into methods on other jigs
extending one jig class from another
checking if a jig is an instance of another jig The disclosure described all of the key components necessary to build a jig blockchain system. The disclosure described that jig objects are written in a deterministic class-based programming language. Jig objects are instrumented to track their actions. There are two kinds of jig objects implemented above: classes and instances. Each has actions that may be performed on them. These actions enable rich interactions between jigs. When an action is performed on a jig, it is intercepted and turned into RecordedAction objects to be stored in the CURRENT_RECORD. When the action finishes or the record is complete, the CURRENT_RECORD is converted to an executable transaction and published to the blockchain. The owners of those jigs may approve of any changes to the jig. Jig reads are turned into executable transaction references. Jig objects are updated to refer to their new jig output states. Finally, jig objects can be recreated by replaying the executable transactions using the jig executor and then recreating the jig objects from the resulting output state. The jig blockchain system may be supported in existing programming languages as described above and implemented on existing UTXO-based blockchains using the Layer 2 executable transactions.

This jig blockchain system concept as well as its data structures and relationships are novel and non-obvious. To date, there are no other systems that are similar in its support for interactions between programmable general-purpose tokens and the system to implement them is complex. This system uniquely enables object graphics that are similar to object graphics in object-oriented programs. To compare to traditional systems:

Smart contracts do not have the same interactivity such as the class/instance relationship There exists blockchain system that are not as programmable as jigs There exists a blockchain system for tokenizing objects on a UTXO-based blockchain but that system tokenizes memory cells not objects and by its definition requires two spends to update an object instead of one.

There exists a blockchain system that tokenizes objects on a UTXO-based blockchain but it does not have the class and instance relationships and other interactions described above. Objects in this system may be composed only in tree-shaped data structures, and it does not support inheritance, encapsulation or polymorphism. Finally, it cannot not have the same ownership model as jigs because transactions do not have references or hashes.

The disclosure also describes the following variations to the jig blockchain system:

A system where classes are not deployed as jigs but as data. They would still be referenceable as unique tokens and usable to create jig instances. This approach is a simpler version of jig classes.

A system where multiple commands are not allowed in a program and every transaction stores a single action on jigs.

Instead of storing creates, reads, and spends, store a before and after state of jigs and use that to compute the inputs and outputs Modify JigLocalReference or JigReference to refer to the same objects in different ways, such as by their input or output positions in the transaction Example Technical Advantages Functionality: Separating classes and instances allows for more advanced logic based on their types. As noted herein, in some embodiments, objects have identity information about their class and this information may be used in logic when objects interact together." For example, a luxury purse company creates digital tokens for each of their physical items. They create a class hierarchy of purses for their different sub-brands and products. They later create a special coupon that allows for the owner of any purse, regardless of the specific subclass now or in the future, to get a discount. To do this, the coupon code checks if a token is an instance of their base LuxuryPurse class from which all other classes extend.

Storing original source code and higher-level actions makes transactions easier to understand, both for developers and developer tooling: Because the Jig Blockchain System stores the original higher-level source code on the blockchain rather than compiled bytecode, and developers and developer tooling can more easily detect intent when analyzing transactions. This is a similar advantage to how web browsers receive uncompiled JavaScript and HTML from websites, enabling anyone to inspect a webpage and easily see what it is doing, part of why the web is such a popular platform to develop for.

In some embodiments, any first-class object in a programming language, including functions, templates, or data blobs, can be owned on a blockchain. Objects are not restricted to instances and classes. "Everything is an object" is the model for jigs. For Example, a patented algorithm is written as a function jig. The owner of that function gets paid every time the function is used on the blockchain.

Classes and instances can be owned separately, so that a class can be be updated by an app and affect all user instance functionality. As noted herein, in some embodiments, classes may have their own state that evolves over time. They can also be upgraded with new behavior that affects all their instances, enabling new relationships between developers and users. For example, a media company creates a class for a collectable token for news stories they've printed over the years, and then creates and sells instances of that class to the public. Initially, they didn't know whether they wanted to allow users to trade these tokens. At a later date, they upgrade the class to add a "send" function, and all token instances acquire that new behavior.

Scalability: Transactions that update individual objects, rather than shared smart contracts, enable more processing to happen in parallel. As noted herein, in some embodiments, it also allows transaction parallelization at the object level rather than at the account level, which will scale better as the number of assets owned by users grows. In comparison, the Ethereum blockchain does not process transactions in parallel at all. The Solana blockchain, which is similar to Ethereum, does process transactions in parallel, but only at the account-level, meaning that two transactions attempting to different objects owned by the same account cannot be executed at the same time. Compared to Ethereum, jigs on UTXO-based blockchains allow for individual apps to store their own transactions. The jigs system scales better than Ethereum, Solana, because individual app can keep the full record of every asset in their concern, with proof of their evolution. It makes them less reliant on network nodes.

Efficiency: Lower fees with Layer 2 implementations of jigs. The Internet doesn't require every network router to run Facebook code, but in blockchain there is currently an assumption that blockchain nodes should run all of the logic. This creates a scalability bottleneck, and costs money. Instead, a Layer 2 implementation of jigs would allow the blockchain to be used to record actions, but not execute code. Instead, applications that care about the jigs would execute the code.

Allows for code reuse, making smaller transactions to instantiate a class compared to Ethereum In contrast, in Ethereum, when you create a new smart contract, which is comparable to a class and instance combined, you always publish the complete code for that contract. With jigs, you can reference an existing class when you create an instance, leading to smaller classes. As noted herein, in some embodiments, this encourages more lighter-weight objects with more interactivity."

In addition to reusing entire classes, parts of the code for a class can be re-used from other functions and classes that are already deployed. Rather than store jig/output states in transactions, they are generated by running a program, leading to smaller transactions than other UTXO-based smart contract solutions. As noted herein, in some embodiments, because output states are not stored in the transaction itself but instead generated by running a program using prior input and reference states, transaction sizes can be much smaller, especially when output states grow large with complex data structures. For example, a social media site allows users to own comments that they post as jigs on the blockchain. A user that edits a single sentence of a comment jig doesn't store the full common in the transaction update, but just the changes they made. In comparison, in Cardano, the full output state data is contained in the EUTXO data. Other Bitcoin Script solutions are the same.

Security: Jigs are more secure by default compared to smart contracts, because they always have owners, and only those owners can update the jig. Ethereum bugs have happened because developers forgot to write code to guard against unauthorized access. Jigs don't have that problem. As noted herein, in some embodiments, no code bug can cause an object to change without the owner's approval, and Ownership creates stewardship—There will be fewer tragedies from the commons and as well as hacks.

Example Use Cases

Game Items: A game owns the class for a game item, and users own instances. A game creates a hierarchy of weapon and armor types as classes. A developer creates a "mod" of a game stored on-chain by referencing, reusing, and extending its code and assets Digital Pets: A digital pet object is created from a digital egg object. Two digital pets are combined together to create a child pet.

Social Media: Posts on a social media site are owned as jigs and updatable only by users. Sticker packs are bought and sold as individual jigs, and can be used in multiple apps that support them. The sticker packs pay the artist every time they are traded with a receipt sent to the artist also as a jig.

Token Marketplace: A marketplace allows many different kinds of tokens to be listed so long as they extend a base token class that is known to have certain features Coupons: A ride-sharing company creates coupons as jigs that can be owned by users and traded outside of the app. The company updates the deals on the coupons by upgrading the classes.

Votes: A community project organizes a vote using jigs on the blockchain. Every vote is an individual jig, and users have proof that they voted and their vote was counted.

The section following this is called Jig Library and it describes a software library that implements this jig blockchain system in a package that is intended to be used as a layer 2 colored coin system.

Example Jig Library

Figure 34:
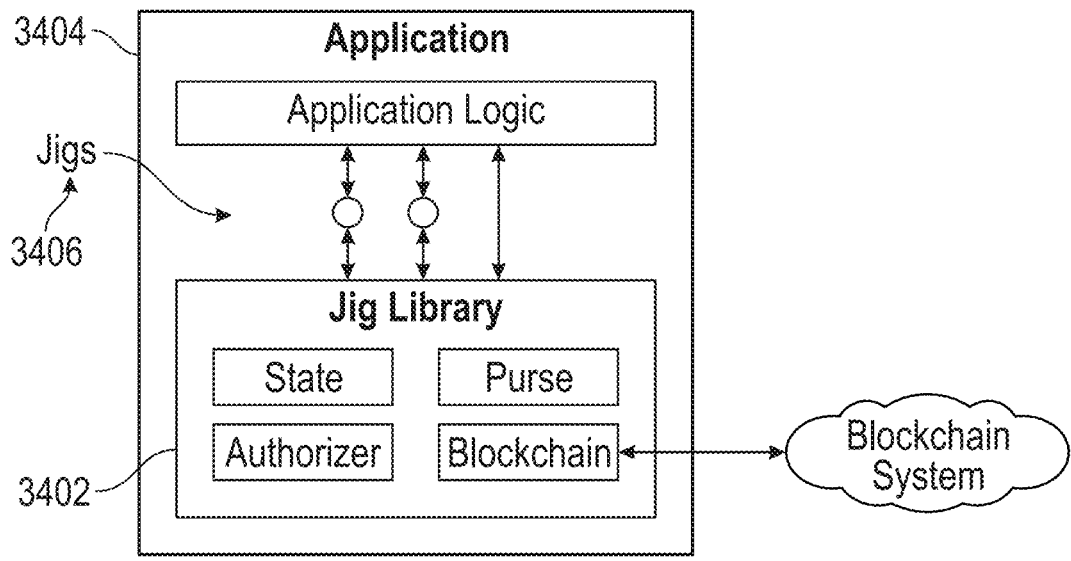
FIG. 34 illustrates an example jig library used by applications to create and use jigs according to some embodiments.

FIG. 34 illustrates an example jig library 3402 used by applications 3404 to create and use jigs 3406 according to some embodiments. This software library is an implementation of the jig blockchain system in a generic library that can be plugged into many applications. It enables applications to not have to implement the jig system themselves but instead use a shared software component. This has a secondary benefit that other applications that use this same library and protocol can load each other's jigs, enabling application interoperability. This jig library described here uses layer 2 colored coins to represent jig output states and uses proxies for jig objects. It supports existing general-purpose languages and existing UTXO-based blockchains.

In some embodiments, the application can interact with the jig library and the jigs loaded or created with the library rather than the blockchain itself. The library can communicate with a UTXO-based blockchain network to fetch and broadcast transactions in response to the application using jigs. It is designed to be flexible for many use cases, including mobile apps, websites, servers, databases, blockchain analysis tools, and more.

In some embodiments, compared to the jig blockchain system, the jig library is a practical application of the jig blockchain system. The jig blockchain system did not have the concept of a signer, a purse, a state cache, or a blockchain, all of which are APIs, but in a library these are required because different applications will configure these components differently. Also the jig system can include a sandbox that allows jigs to be used safely. The modifications can turn the jig blockchain system into a library are described in the Modifications section below.

In some embodiments, the jig library has several functions that the user may call:
load
deploy
sync In some embodiments, the jig library also has several components that it uses and that may be configured:
BLOCKCHAIN
SIGNER
PURSE
STATE_CACHE
REPOSITORY
SANDBOX
CURRENT_RECORD In some embodiments, some of the components are abstract components, or interfaces, from the perspective of the library. For example, the BLOCKCHAIN component is an object that talks to an actual blockchain, and there may be many options for how this is completed. The BLOCKCHAIN component may connect to a node on the blockchain, or to the blockchain's network directly, or to a server that does. This is the same as how a kitchen appliance may be plugged into many sockets, so long as they match the plug's shape and electricity specifications. The same is true for SIGNER, PURSE, and STATE_CACHE. Some of the components may be provided by the user to configure the library. Others may be built-in.

In some embodiments, the jig system can use the jig library in the following few examples:
Create the jig library:
  var library=new JigLibrary({
    blockchain: new BlockchainConnectionO,
    signer: new PrivateKeySigner(<somePrivateKey>),
    purse: new PrivateKeyPurse(<somePrivateKey>),
    stateCache: new Map( )
  })
Load and instantiate a jig class:
  var JigClass=library load('<some-jig-class-location>')
  var jigInstance=new JigClass(arg)
Deploy a jig class:
  class MyPet { }
  library.deploy(MyPet)
Load a jig instance and sync it to its latest state:
  var instance=library.load(<some-old-jig-location>)
  instance. sync( )

Figure 35:
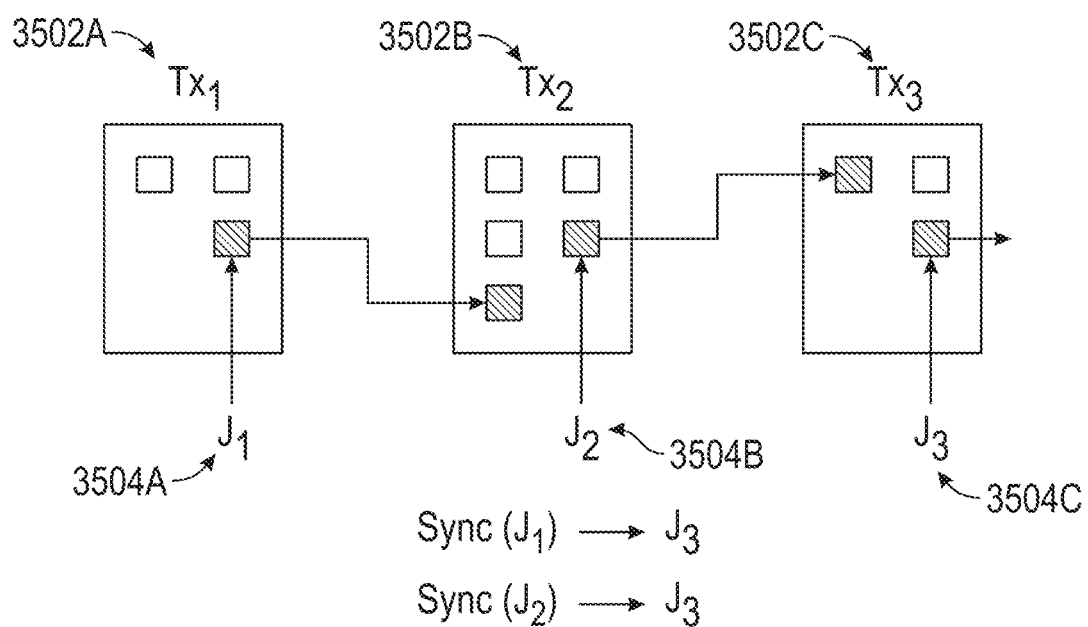
FIG. 35 illustrates an example of the application of a sync function to update the jig to the latest state on the blockchain according to some embodiments.

In some embodiments, the following functions are provided as the public API of the jig library. Other functions from the jig blockchain system described above are available internally in the library, but they are not repeated here.
Load In some embodiments, the load function is used by the application to get both jig classes and jig instances from known locations. It is implemented the same as the load function in the jig blockchain system for layer 2 colored coins. Applications would store locations and load their jigs as they need them like they would load data from a database.
Deploy In some embodiments, the deploy function is used by the application to install and deploy code to the blockchain. It is implemented very similar to the jig blockchain system's deploy function above. However, the disclosure extends it to use the REPOSITORY to first check if the local class was already deployed, and if so, return it. The jig system can also store the jig class in the repository keyed by its local class. The return value of deploy is a new class jig. The class jig can be instantiated to create instance jigs.
Sync FIG. 35 illustrates an example of the application of a sync function to update the jig to the latest state on the blockchain according to some embodiments. The jig library provides a sync function that takes a jig object and updates it to the latest state on the blockchain. In FIG. 35, there are three transactions 3502A, 3502B, 3502C, corresponding to three updates to a jig J 3504A, 3504B, 3504C. The first transaction creates J, and the following transactions are changes to J. J has locations for every output in the above transaction graph, each of which represent different states of J, and the jig system can load the jig in any of these states. When sync is called on J at state J1, the jig at a state from the first transaction, J is updated to the state as if the user called load on the location for J3.

In some embodiments, the jig system can apply the following pseudo-code for sync:
  function sync(jig, depth=0, synced=new Set( )) {
    if (synced.has(jig.origin)) return
    var location=getLocation(jig)
    var spendTxid=getSpend(location.txid, location.vout)
    // If unspent, nothing to update
    if (!spendTxid) return
    var transaction=fetchTransaction(spendTxid)
    var inputJigs=transaction.inputs.map(input=>load(new
        JigReference(input.txid, input.out)))
    var     referenceJigs=transaction.references.map
        (ref=>load(new JigReference(ref.txid, ref.vout)))
    var inputStates=inputJigs.map(capture)
    var referenceStates=referenceJigs.map(capture)
    var outputStates=execute(transaction.program, input-
        States, referenceStates)
    // Find the output state corresponding to this jig
    var                   outputState=outputStates.find
        (state=>state.origin===jig.origin)
    // Apply the output state to the jig. This is similar to
      recreate.
    applyOutputState(jig, outputState)
    // Sync recursively
    sync(jig, depth+1, synced)
    // Call sync on all inner jigs recursively, only syncing
      jigs we haven't synced.
    if (!depth) {
      synced.add(jig.origin)
      deepVisit(jig, sync)
    }
  }

Example Components

BLOCKCHAIN

In some embodiments, the BLOCKCHAIN is the component in the jig library that communicates with the actual blockchain network. It is through this component that the library is able to broadcast and fetch jig transactions. The BLOCKCHAIN component is an API whose implementations may be provided by the user. In this way, the library may work on multiple blockchains, such as mainnet or testnet variants, or UTXO-based blockchains with entirely different protocols, with the system jig library.

In some embodiments, the blockchain has five methods:

broadcast—broadcast that is passed a transaction and submits it to the corresponding blockchain.

fetch—fetch is passed a transaction hash and returns the associated transaction if it exists.

spends—that is passed a transaction hash and output index and returns the transaction hash of the transaction that spends the output specified.

(optional) utxos—Returns the UTXOs for a particular owner in the form of an address, public key, locking script, or locking script hash. This method is optional for the library described here but is used in the extensions.

(optional) time—Returns the time that a transaction was received by the blockchain network. It is passed a transaction hash and returns a date. This method is optional for the library described here but is used in the extensions.

In some embodiments, the BLOCKCHAIN implementation may be a remote connection or it may be an entirely local or in-memory blockchain for testing.

SIGNER

In some embodiments, the SIGNER represents the current owner of JIGS created and updated in the system. The component is an implementation of an API which has the same methods described here. The application that uses the jig library would typically setup the SIGNER to have a private key associated with the user of the application. They may also "plug in" a third-party wallet that implements the SIGNER API. The SIGNER has two methods associated with it: sign and owner:

sign—The sign method accepts a partially-signed transaction and returns an updated transaction with signatures added for the jig inputs it can sign. A very simple implementation of sign using a private key would generate and add signatures for every input it can sign.

owner—The owner method returns the next owner that can be assigned to new jigs. This is called by the nextOwner function whenever an owner is needed for a new jig. A simple implementation might return a public key hex string.

PURSE

The purse as an API is different than traditional systems in blockchain. It allows third-party applications to pay for transactions while also keeping a separation between payment outputs and jig outputs which is safer. In some embodiments, the PURSE represents the account (for example, a private key) that pays for transaction fees. It is an implementation of an API which has the same methods described here. Blockchain transactions typically require a mining fee associated with them. The reason the PURSE and the SIGNER are separate accounts is because the UTXO-based nature of JIGS means that they might be mixed together and a jig accidentally destroyed while paying for a transaction.

Figure 36:
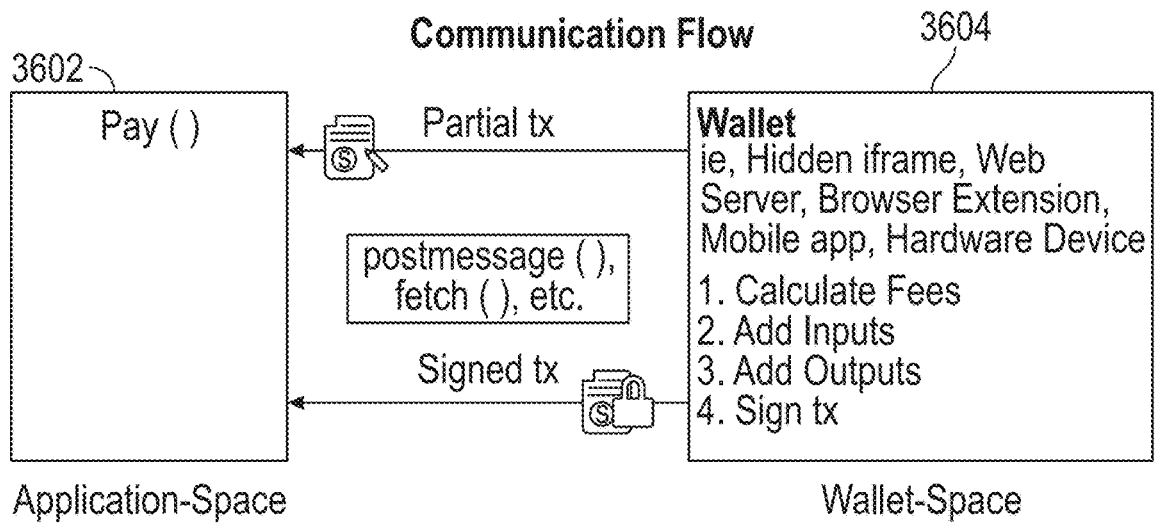
FIG. 36 illustrates an example of the interplay between the jig system and an external third-party wallet according to some embodiments.

In some embodiments, the PURSE has a single method called pay that adds the necessary inputs and outputs to make an existing transaction acceptable to the blockchain network nodes. This functionality is common in Bitcoin wallets today, and the general strategy for paying for a transaction is:

1. Add enough UTXOs to more than cover the transaction
2. Calculate the expected miner fees
3. Add a change output, returning all but the fee back to the purse
4. Sign the new inputs added FIG. 36 illustrates an example of the interplay between the jig system (and a pay function 3602) and an external third-party wallet 3604 according to some embodiments. In some embodiments, if the purse is a third party wallet, the keys for that third-party wallet may be stored in a separate process or even a separate device. This securely separates the application from the user's secrets. The PURSE would then need to communicate asynchronous with this third party wallet in a way similar to this diagram:

STATE_CACHE

In some embodiments, the STATE_CACHE stores and retrieves the output states of jig objects so that the same state does not need to be recomputed every time. The STATE_CACHE component is an implementation of an API which has the same methods described here. It has two methods that the jig library calls: get, and set:

get—get is pass a location and it returns the output state of the jig at that location, or null if it does not exist. It may check the local machine's cache, a remote machine's cache, or even multiple sources.

set—set is passed a location and an output state that should be saved in the cache. Set should store the state somewhere, perhaps on the local machine, a remote machine, or even in multiple sources.

In some embodiments, these methods may be asynchronous so that they can work on a remote state cache server.

REPOSITORY

Figure 37:
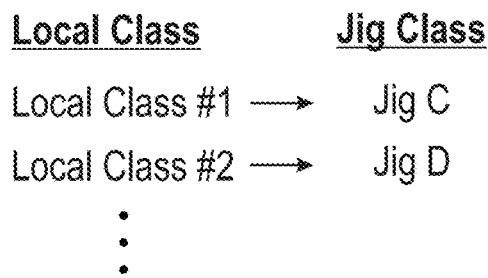
FIG. 37 illustrates an example repository of a local store of jig classes according to some embodiments.

FIG. 37 illustrates a repository of a local store of jig classes according to some embodiments. The REPOSITORY is a local store of jig classes that have been installed in the currently running version of the jig library. The REPOSITORY has ways of looking up a class jig from its local class. It may be implemented using one or more dictionary data structures. Its purpose is to prevent the same local classes from being deployed more than once. When a jig class is upgraded, its previous local class is removed from the REPOSITORY and the new class used to upgrade is assigned the local class for this jig class.

SANDBOX

Figure 38:
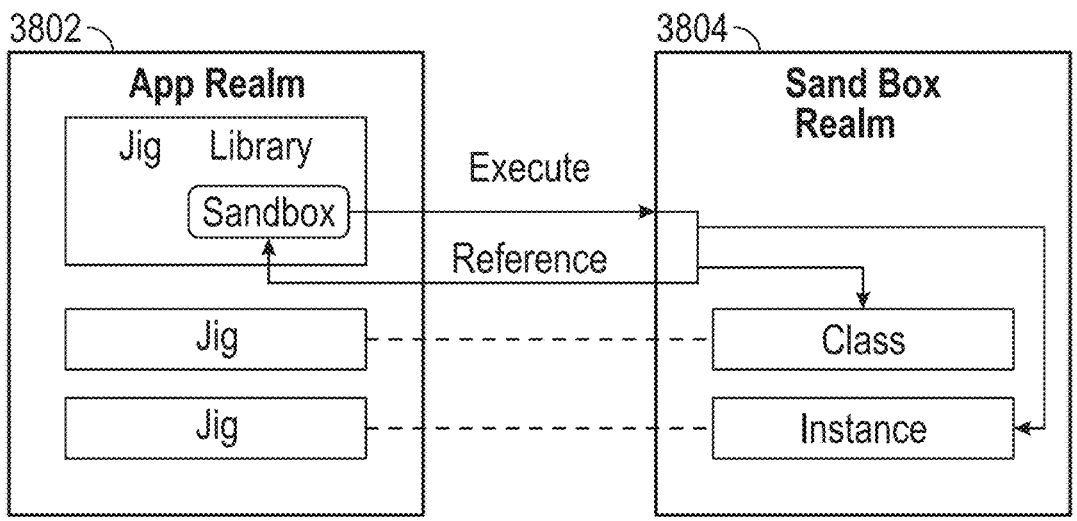
FIG. 38 illustrates an example of an application realm and a sandbox realm according to some embodiments.

FIG. 38 illustrates an example of an application realm 3802 and a sandbox realm 3804 according to some embodiments. In some embodiments, the SANDBOX is the component inside the jig library that is responsible for safely executing arbitrary code. Because the jig library may load code of unknown safety from the blockchain, it needs a way to run that code such that it does not affect the application in a negative way. The disclosure distinguishes between the application realm and the sandbox realm.

In some embodiments, the application realm is the overall environment, also called a container or a runtime, that the application code and library exists in. The application trusts code and objects in this realm, and the application itself is part of this realm. The sandbox realm is either created by the SANDBOX component or exists in a way where the SANDBOX component may communicate with it. It has an entirely different runtime environment that does not interact with the app's realm at all. This may be implemented with the Realm proposal in JavaScript, or a WebAssembly module in the web browser, or an entirely separate executable that the jig library communicates with.

In some embodiments, the SANDBOX has a method evaluate that is capable of running arbitrary code in the sandbox environment and returning a sandbox reference of the result back to the host. The references returned to the jig library may or may not be usable directly, but there should be a way to interact with the referenced objects in the sandbox for all actions that the jig library supports, such as calling a method, setting a property, or changing some metadata that is language-specific. Each sandbox reference is stored inside the jig proxy that the user interacts with.

In some embodiments, the code that the sandbox realm executes may be deterministic for jigs to work correctly. Deterministic means code that executes in the environment gets the same result every time. To do this, the SANDBOX can disable language features that are non-deterministic such as getting the time, getting a random value, and performing certain math calculations. The jig library that calls the SANDBOX may also ensure that any calls are deterministic. And users of the library may ensure the jig code they write is deterministic.

In some embodiments, the SANDBOX may impose time and memory constraints on code that runs in the sandbox, constraints that are not present in the application's realm. For example, if a function takes more than half a second to run, the SANDBOX may throw an error. This enables the application realm to continue working despite loading malicious code. Additionally, if using the SANDBOX involves a foreign call to the network or another executable, then errors may be thrown if there is a communication issue. When an error occurs, the jig library is responsible for communicating that error to the user.

CURRENT_RECORD

In some embodiments, the CURRENT_RECORD is the record that is currently being updated with actions on jig objects. When the record is complete, it is published, and the record is reset. Alternatively, a new record may be created and assigned to CURRENT_RECORD.

Modifications

In some embodiments, the following modifications may to be made to the jig blockchain system's functionality to be used in the jig library:

1. The instrumentJig function should evaluate the class code or create the instance, depending on the object type, in the SANDBOX, and then create a new proxy object that communicates with the sandbox reference. This is used both in the deploy function as well as the instantiate handler.
2. The publish function's addFees call should call the PURSE's pay method with the transaction.
3. The publish function's signInputs call should call the SIGNER's sign method with the transaction.
4. The publish function's broadcast call should call blockchain's broadcast.
5. The load function's fetchTransaction call should call the blockchain's fetch method.
6. The nextOwner function should call the signer's owner function when a new owner is needed.
7. The deploy function should check if the class was already deployed by checking the repository and not deploy again.
8. The execute function should be modified for the Layer 2 colored coin rules in the executable transactions section Summary The disclosure described a practical implementation of the jig blockchain system as a layer 2 colored coin in the jig library. In some embodiments, this system enables jigs to be deployed, loaded, synced, and sandboxed securely. The disclosure created the signer and the purse that are used to manage ownership and payment respectively. The disclosure described the state cache and the blockchain as APIs that may have various implementations. This system is practical for use today.

In some embodiments, the benefits of the jig library are:
Applications don't need to implement the jig blockchain system. They can use the library.
Jigs in one application are compatible with jigs in other applications
Sandboxing ensures that loading arbitrary code is safe
Some of the advantages are:
The jig blockchain system it implements is different than traditional systems
This is the first practical and useful description of an implementation for the jig blockchain system
The purse and owner are different than different than traditional systems and not seen in other UTXO-based token systems
The blockchain API and cache APIs are both abstract component where as other token libraries we've looked at are built for specific blockchains and caching solutions In some embodiments, the library has broad applications in games, social media, finance, voting, healthcare, and many other use cases where owning data is important.

Extensions

Given the base architecture described above, the disclosure describe now several possible extensions, each individual embodiments themselves.

Access Modifiers

Many object oriented languages and smart contracts support private properties and private methods on objects. In some embodiments, private properties are properties that may be read only by the object and sometimes by objects of the same class. This is one kind of access modifier. An access modifier is a keyword that restricts access to some part of an object and it is one for supporting encapsulation. For languages that don't support access modifiers, like EcmaScript 2015, the jig system can extend the action handlers to implement access modifiers at runtime for jig objects.

In some embodiments, the first step is to decide how access modifiers are to be specified in the target language for jigs. One may decide that properties beginning with _ are private. Another option is to have a special function that makes a property private. Here is an example of a jig with private variables using the underscore approach:

class Counter extends Jig {
    constructor( ) {this._value=0}
    inc( ) {this._value=this._value+1}
}
var counter=new Counter( )
counter.inc( )
console.log(counter._value)// throws error due to_value being private In some embodiments, to implement access modifiers, the jig system may restrict all actions that use this property. This includes get, set, delete, call, etc. Here is an example action handler for set that is modified to support private properties. The other action handlers may be similarly modified.

```
function setHandler(jig, name, value) {
    // Jigs can only access properties from the same class
    var privateAccess=CURRENT_RECORD.stack.length
        &&
    CURRENT_RECORD.stack[CURRENT_
        RECORD.stack.length−1].jig===jig
    if (!privateAccess && name.startsWith('_')) {
    throw new Error('Cannot get ${prop} because it is private')
    }
    // . . . The rest of setHandler is the same as before . . .
}
```

In some embodiments, other forms of access modifiers may be implemented similarly. For example, protected methods are methods that are overridable in child classes, but the jig system may desire a concept that a method cannot be overridden in a child class. This is sometimes called sealing and it could be implemented at runtime using the above process of adding new behavior to the action handlers.

This embodiment is useful because it allows existing programming languages that do not support access modifiers, a popular feature in smart contracts, to be used for jigs.

This embodiment is different from traditional systems because it requires runtime instrumentation to enforce and most smart contracts are written to enforce access modifiers at compile time. To date, no smart contract-like system has implemented private properties this way. Most smart contracting systems also have a domain-specific language whereas this approach works in existing programming languages.

Backed Jigs

In traditional UTXO blockchains, each transaction output has an amount and an owner. When the disclosure described how executable transactions are used as layer 2 colored coins, the disclosure mentioned that the amount values in outputs should be dust. However, it is possible to have jigs that set this amount to a non-dust value. The benefit to doing this is the jig system can then have layer 2 jigs that contain layer 1 coins inside them. The disclosure calls these jigs with non-dust amounts backed jigs, because they are jigs backed by some number of layer 1 coins.

In some embodiments, backed jigs can be melted for their native coin value. If the user spends the jig output in an invalid jig transaction, the jig's state becomes its final state and the native coins may be used for any other purpose. The applications for this include making payments with jigs, giving jigs an initial monetary value, indicating the importance of a jig, and more. However, it is important to note that backed jigs are not a secure way to control the behavior of layer 1 coins like smart contracts are.

In some embodiments, to implement backed jigs, the jig system can reserve a property of the jig object and jig output state for the native coin amount just like how the owner property of a jig object and jig output state relates to the owner of its output. Jig code may change this value to increase or decrease the backing amount. The PURSE component of the jig library should be prepared to pay for the transaction when a jig's backing amount is increased in a transaction, and receive the change when a jig's backing amount is decreased in a transaction.

In some embodiments, there is an example of backing a jig when the jig is first created. Creating this jig requires 10 k coins to back it. A similar process may be used to pay for tickets for example.

```
class Sword extends Jig {
    init( ) {
        // Back the sword with 10 k satoshis coins, using
            Bitcoin for L1 this.satoshis=10000
    }
}
```

In some embodiments, the action handlers for the jig and the record need to be modified to treat the amount property the same as the owner property of jigs. If the amount is changed in a transaction, it should not be readable until the next transaction.

The embodiment here that is different from traditional systems is the relationship with the PURSE and the rule for how the amount can not be readable in jig code after being changed until the transaction is published. The PURSE as a third-party wallet may be used to back jigs and receive change from jigs that are unbacked. This is non-obvious because third-party wallets have never been pluggable into UTXO-based blockchain token systems in this way.

Destroy Action

In some embodiments, it may be useful to have a destroy action for jigs that spends the output for the jig and does not create a new one, effectively preventing any further updates to the jig. This is useful when a class author wants to prove to others that the class is final, or when interactions between jigs need to destroy one jig to create a new one. It is possible to simulate this without a specific destroy action, but a destroy action would prevent needing to send to a burn address when attempting to destroy a jig from inside jig code.

Implementing a destroy action is tricky because the jig system wants the jig to still be referenceable after the destroy but it can no longer have an output. The jig may have gone through a final update, and this final update might still be useful to others. Therefore, the disclosure proposes that destroyed jigs are assigned a special JigReference that is not a txid and vout but a txid and vdes. The vdes is the index of the jig into an array of output states for jigs destroyed in the record.

In some embodiments, the record can keep an ordered set of destroyed jigs just like reads and creates. The outputs for a transaction would exclude any destroyed jigs, and when combining records, any destroyed jigs used after they are destroyed would throw an error. Finally, the master list of jigs used to look up LocalJigReferences would now include the destroyed jigs appended to the end of the list.

In some embodiments, an example of destroying a jig includes:

```
var post=jigLibrary.load(<jig-reference>)
destroy(post)
console.log(post.location) // prints {txid: <txid>, vdes: 0}
```

This embodiment is different from traditional systems because (1) it has not been implemented in any UTXO-based token systems to date, and (2) it requires a new special location for destroyed jigs.

Social Synchronization

The jig blockchain system embodiment in layer 2 colored tokens above allows jigs to reference other jigs in any other state, even old states. For example, a jig might be created using an older version of its class after it has already been updated. Of course, one could write the constructor code in the class to spend the class when an instance is created, effectively enforcing it to be latest, but this requires the owner of the class to approve every instance created. It may be desirable that jigs referenced in other jigs, either as a property or as a jig class, be upgraded to their latest states over time but not during any one transaction. In layer 1 systems, the blockchain nodes can enforce that references be up-to-date but in layer 2 systems this cannot be guaranteed.

The disclosure proposes a solution called social synchronization. The key idea is that owners of jigs can have a choice for whether they upgrade their references in a jig. However, if they don't upgrade their references, then their jigs can not be able to interact with other jigs that have upgraded those same jigs to a later state. Over time, most jigs can upgrade because interactions are useful. Updating a jig reference in the jig library is as simple as calling sync(jig), so the user would also have to go out of their way to not sync their inner references.

This embodiment is a useful way to keep jig references updating in layer 2. It is novel because no other UTXO-based system supports referenced objects today. It is different than traditional systems because this model for synchronization has not been seen in any other blockchain system. It gives users the freedom to upgrade their references or not. If a jig wants to live in the past so to speak, it is allowed to, but it cannot then interact with other jigs that are more up-to-date.

Fungible Jigs

In some embodiments, Jigs by default are non-fungible tokens meaning that they cannot be combined with other jigs like native coins can. However, many use cases require fungibility to be practical, like currency, reward points, shares of stock, etc. There are non-programmable token systems that enable fungible tokens, like Simple Ledger Protocol (SLP) described above, and there are programmable UTXO-based token systems that do not have fungibility, but there is no traditional system that is both generally programmable and fungible, and certainly not one for jigs.

In some embodiments, the jig system can make jigs fungible by describing how fungible jigs interact. For example, in the case of a reward point, you might own a jig that represents 5 points, and another jig that represents 10 points. If those are instance jigs of the same reward point class, you might want to combine them together into a single jig with 15 points. Combining jigs is one functionality. This can be implemented with a method that destroys the jigs being combined and produces a new jig that has their combined amount.

In some embodiments, fungibility also requires splitting off parts of a jig. For example, if a user owns 15 points and wants to send another user 5 points, they first need to split the points jig into two jigs, one with 10 points and one with 5 points. Then I would send my friend the one with 5. This too can be described as an interaction. Split can be implemented by reducing the amount of one jig, and creating another jig that has the split off amount.

In some embodiments, code for a fungible token jig can include:

```
class Fungible extends Jig {
  init (amount, tokenToDecrease, tokensToCombine) {
    if (this.constructor===Fungible) throw new Error( )
    // Case: Creating a change token
    if (typeof tokenToDecrease !=='undefined') {
      if (typeof tokenToDecrease !=='object') throw new
        Error( )
      if (tokenToDecrease.constructor !==this.constructor)
        throw new Error( )
      this.checkAmount(amount)
      tokenToDecrease.decreaseAmount(amount)
      this.amount=amount
      return
    }
    // Case: Combining tokens
    if (typeof tokensToCombine !=='undefined') {
      if (!Array.isArray(tokensToCombine)) throw new
        Error( )
      if (tokensToCombine.length<2) throw new Error( )
      if        (tokensToCombine.some
        (token=>token.constructor   !==this.constructor))
        throw new Error( )
      var     countOf=token=>tokensToCombine.reduce
        ((count, next)=>next===token ? count+1: count,
        0)
      if (tokensToCombine.some(token=>countOf(token)
        >1)) throw new Error( )
      this.amount=0
      tokensToCombine.forEach(token=>{
        this.amount+=token.amount
        token. destroy( )
      })
      this.checkAmount(this.amount)
      return
    }
    // Case: Minting, where only the owner may mint
    this.checkAmount(amount)
    if (this.owner !==this.constructor.owner) throw new
      Error( )
    this.amount=amount
  }
  send (to, amount) {
    amount=typeof amount==='undefined' ? this.amount:
      amount
    this.checkAmount(amount)
    if (amount>this.amount) throw new Error( )
    if (this.amount===amount) {
      this.owner=to
      return null
    }
    var change=new this.constructor(this.amount-amount,
      this)
    this.owner=to
    return change
  }
  static combine ( . . . tokens) {
    return new this(undefined, undefined, tokens)
  }
  decreaseAmount (amount) {
    this.amount -=amount
  }
  checkAmount (amount) {
    if (amount !=='number') throw new Error( )
    if (!Number.isInteger(amount)) throw new Error( )
    if (amount<=0) throw new Error( )
    if (amount>Number.MAX SAFE INTEGER) throw
      new Error( )
  }
}
```

This embodiment is different than traditional systems because fungible tokens have never been implemented this way, where a base class for an non-fungible token implements the functionality for fungibility that other developers reuse. Existing solutions either work in smart contracts, require special logic outside of the token, or do not implement both combine and split functionality.

Spam Protection

There is a problem with jigs when they are used to share data between applications or for when applications receive jigs from users outside of the application. Jigs require running code, and if that code is untrusted, then it might be a source of attack. For example, if a wallet wanted to show all of a user's jigs in a user interface, these jigs would have to be loaded to get their state. This would involve running arbitrary code, and that arbitrary code might spin a user's CPU or create a large amount of memory until the jig library crashed. It is possible to mitigate this problem technically by running unknown jigs in a secure sandbox, but there is an asymmetry between the cost of the attacker to attack and the cost of the service to go down. Therefore, the disclosure propose several economic solutions.

In some embodiments, solutions include:
- Create a slow path and a fast path for loading jigs. Fast path loads run in a sandbox that is less resilient to attacks but faster. Slow path loads in a separate execution environment first to know that the jigs are safe. Unknown jigs would take longer to be received.
- Require deploying new code to cost more than performing other actions, since new code is where the attack starts
- Sort jigs to be loaded in order of trust, so that trusted jigs are loaded first, followed by untrusted code from a trusted party, followed by untrusted code from an untrusted party. Unknown jigs would take longer to load.
- Attach proof-of-work hashing or money to the jig to raise the cost to the attacker and sort jigs according to this cost as in #1. Unknown jigs would cost more to send.
- Introduce a gas model similar to Ethereum where gas. Gas may be paid in L1 or L2 tokens. Unknown jigs would cost more to send.

These solutions are different than traditional system in their application to jigs and the sharing of data between applications using generally-programmable UTXO-based tokens. They are different from traditional systems because to-date we have not seen programmable token systems take these approaches to the best of our knowledge.

Partial Loads

In some embodiments, loading a jig from the state cache may involve loading many other jigs as references if that jig is well-connected. It may be desirable to only partially load a jig from the state cache, meaning that itself is loaded but its inner jigs are not loaded. To do this, the recreate method may be modified to take an optional parameter called partial where if true, the jig being recreated is the only one loaded.

```
function recreate(outputState, partial = false) {
    let jigObject = null
    if (outputState.kind === 'class') {
        jigObject = createClass(outputState.source,
            outputState.dependencies)
    }
    if (outputState.kind === 'instance') {
        var Class = load(outputState.class)
        jigObject = { }
        setClass(jigObject, Class)
    }
    Object.assign(jigObject,
    deepCopy(outputState.properties,
        location => partial ? new
            UnloadedJig(location) : load(location)))
    setOwner(jigObject, outputState.owner)
    setNonce(jigObject, outputState.nonce)
    setOrigin(jigObject, outputState.origin)
    instrumentJig(jigObject)
    return jigObject
}
```

In some embodiments, UnloadedJig is a class that stores the location that was not loaded. The jig system can later load these partial jigs by modifying the sync method to deeply replace UnloadedJigs with actual jigs. The get action handlers should be modified so that if an UnloadedJig is returned or accessed, either an error is thrown or the jig is loaded at that point.

Jump Syncing

One of the problems with syncing a jig from an old state in the Syncing section is that it loads every intermediate state along the way to the latest state. This is a performance problem and potential attack. When applications use state caches on their servers to index every jig, clients should be able to quickly jump from the current state to the latest state. The jig system can support this via a process called jump syncing.

In some embodiments, to implement jump syncing, the jig library needs to introduce a new cache called the JUMP_CACHE. The JUMP_CACHE would store a map from jig origins to the latest location and nonce of that jig. Whenever a jig is synced, the jig system would first look up this latest location from its origin and see if an entry exists in the STATE_CACHE. If it does, the jig system would recreate and return that state directly rather than loading each transaction one-by-one. Whenever jigs are loaded, just as the STATE_CACHE stores the known output states, the JUMP_CACHE would be updated to include the new location if the nonce is greater than the existing nonce in the JUMP_CACHE or if no entry is present.

In some embodiments, the JUMP_CACHE object would also have the following methods:
- get—get is passed an origin and it returns the latest location and nonce at that origin, or null if it does not exist. It may check the local machine's cache, a remote machine's cache, or even multiple sources.
- set—set is passed an origin, a location, and a nonce. Set should store the state somewhere, perhaps on the local machine, a remote machine, or even in multiple sources.

This is different than traditional systems because no token system has implemented this scalable synchronization method on any UTXO-based token system that supports syncing individual tokens.

Bootstrapping

In some embodiments, since jigs store arbitrary code on-chain, it is possible to store the code to load the jigs on-chain too. This includes the code for the record, the action handlers, and the executor. In fact, most of the jig library can be stored on-chain. A small bootstrapper software could be kept off-chain and used by applications to load the rest of the jig library from just a few simple pieces. This would enable a smaller jig library but the benefit is that by moving the jig library consensus code on-chain, including the evaluator and action handlers, there is less reliance on outside code that might change over time. The jig system can also use this to upgrade the jig library too because old versions of its components and functions can be loaded for old jigs and newer versions of components and functions could be loaded for newer jigs. This is different than traditional systems because no token system has implemented such a bootstrapping method to-date.

Unlinked Transfers

In some embodiments, it is sometimes useful to transfer a jig object from one output to another output without spending the first output into the second output. One use case for this is to work around the chained transaction ancestor limit which is a restrictive property of many nodes. This limit effectively caps the number of jig updates between blocks because jig updates require spends. If there was a way to transfer a jig without a spend, applications and the jig library could work around this limit. This technique may also be used to transfer assets from one blockchain to another different blockchain and that has larger applications for usability and scalability of blockchains.

Figure 39:
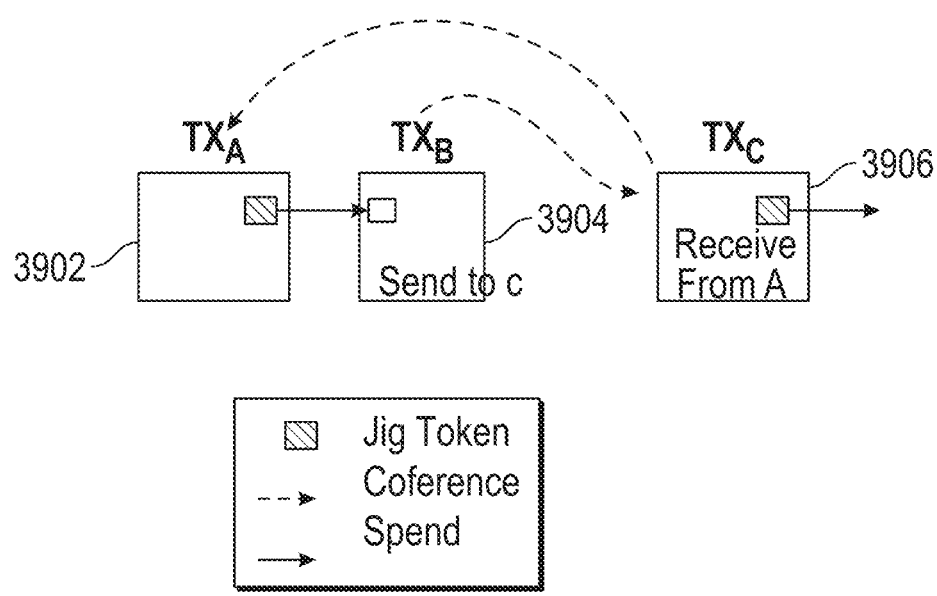
FIG. 39 illustrates example unlinked transfers according to some embodiments.

To support unlinked transfers, the disclosure will define two new actions: send and receive. This receive action essentially creates a copy of a jig in a new transaction but that jig is not immediately usable. In order for that jig to be valid and usable, there can also be a corresponding send action performed on the original jig that actually does spend the jig and links the jig to the new jig. This preserves the linearity of jigs. Specifically, here is the relationship between the three transactions:

FIG. 39 illustrates unlinked transfers according to some embodiments. Transaction A 3902 would contain the original jig J. Transaction B 3904 would spend J with a special send action that indicates the jig is to be transferred to transaction C 3906. Transaction C has a receive command and outputs the jig J at that location. The reason that C references A and not B is because B's send action has a reference to one of C outputs, and C's txid cannot be known if it also references B. By having C reference A instead, it removes this circular dependency.

In some embodiments, users might perform this transfer by:

```
var jigBefore=load('<some-jig-location>')
// Creates TX C referencing TX A
    var jigAfter=receive(jigBefore)
// Creates TX B referencing TX C
    send(jigBefore, jigAfter)
```

In some embodiments, the data structure for the send action that is stored in the record can include:

```
struct SendActionData {
    jig: JigObject,
    receiveJig: JigObject
}
```

In some embodiments, the data structure for the receive action that is stored in the record can include:

```
struct ReceiveActionData {
    jig: JigObject
}
```

In some embodiments, the data structure for the send command that is stored in the program can include:

```
struct SendCommandData {
    jig: LocalJigReference,
    receiveLocation: LocalJigReference
}
```

In some embodiments, the data structure for the receive command that is stored in the program can include:

```
struct ReceiveCommandData {
    jigLocation: LocalJigReference
}
```

In some embodiments, the logic for the send function can include:

```
function send(jigBefore, jigAfter) {
    var data=new SendActionData({
        jig: jigBefore,
        receiveJig: jigAfter
    })
    var action=new RecordedAction('send', jigBefore, data)
    CURRENT_RECORD.actions.add(action)
    CURRENT_RECORD.destroys.add(jigBefore)
    CURRENT_RECORD.spends.add(jigBefore)
    CURRENT_RECORD.reads.add(jigAfter)
    publish(CURRENT_RECORD)
}
```

In some embodiments, the logic for the receive function can include:

```
function receive(jig) {
    var data=new ReceiveActionData({jig})
    var action=new RecordedAction('receive', jig, data)
    CURRENT_RECORD.actions.add(action)
    CURRENT_RECORD.reads.add(jigAfter)
    var newJig=cloneJig(jig)
    CURRENT_RECORD.creates.add(newhg)
    if (runningDuringLoad( )) {
        // 1. Get the spend transaction of jig
        // 2. Check that the jig was sent to the current
            transaction
        // 3. Check that there were no other actions in the
            spend tx
    }
    publish(CURRENT_RECORD)
    return newJig
}
```

Additionally, in some embodiments, the sync function needs to be updated to update jigs with their receive transactions and not just update using their spend transactions. This approach to unlinked transfers has not been seen on any UTXO-based blockchain and therefore is novel and non-obvious.

Import and Export

In some embodiments, it may be useful to not immediately broadcast a transaction to the blockchain once it is created, but instead to export it from the jig library to be later imported and perhaps completed. For example, when multiple users need to cosign on updates to jigs in a transaction, one user could create the transaction with the updates, sign their part, export it, and share it with the other user. Then the other user would import the transaction, finish signing it, and broadcast it to the network. The disclosure proposes the following new functions for the jig library:

import—This function is passed a transaction and it loads it using the functionality of load. However, after loading the transaction, at the end of execute, the CURRENT_RECORD is not reset but instead used for further actions, and also no jig is returned.

export—This function turns the CURRENT_RECORD into a jig transaction using the functionality of publish. export pays for and signs for as many inputs as possible. The main difference between export and publish is that the transaction is not broadcast to the blockchain for publish but instead returned to the user.

In some embodiments, this is different than traditional systems for token systems because to-date no generally programmable token solution that has allowed importing and exporting of partially-signed transactions like this for co-signing updates to tokens. This feature is needed when a token protocol supports different tokens owned by different users interacting in the same transactions, and to-date very few token protocols were designed for this purpose.

Atomic Swaps

In some embodiments, one particularly interesting use case for import and export is permissionless atomic swaps. Any two jigs that have a send function to transfer the jig to a different owner may be exchanged if each party agrees. This embodiment describes how to exchange jigs without a third party escrow.

In some embodiments, first, one user A proposes the swap by creating a partially signed transaction that sends their jig to user B and also sends user B's jig to themselves. However, because this involves changes to both jigs, user A cannot sign the whole transaction. Therefore, user A exports the transaction partially signed for their jig input. Once exported, they send user B the exported transaction in an offer jig that contains the exported transaction with the offer. User B can accept the offer to swap jigs by importing the transaction, signing, and broadcasting it. User A can revoke the offer at any time by spending their jig into a different transaction, effectively invalidating the offer.

Figure 40:
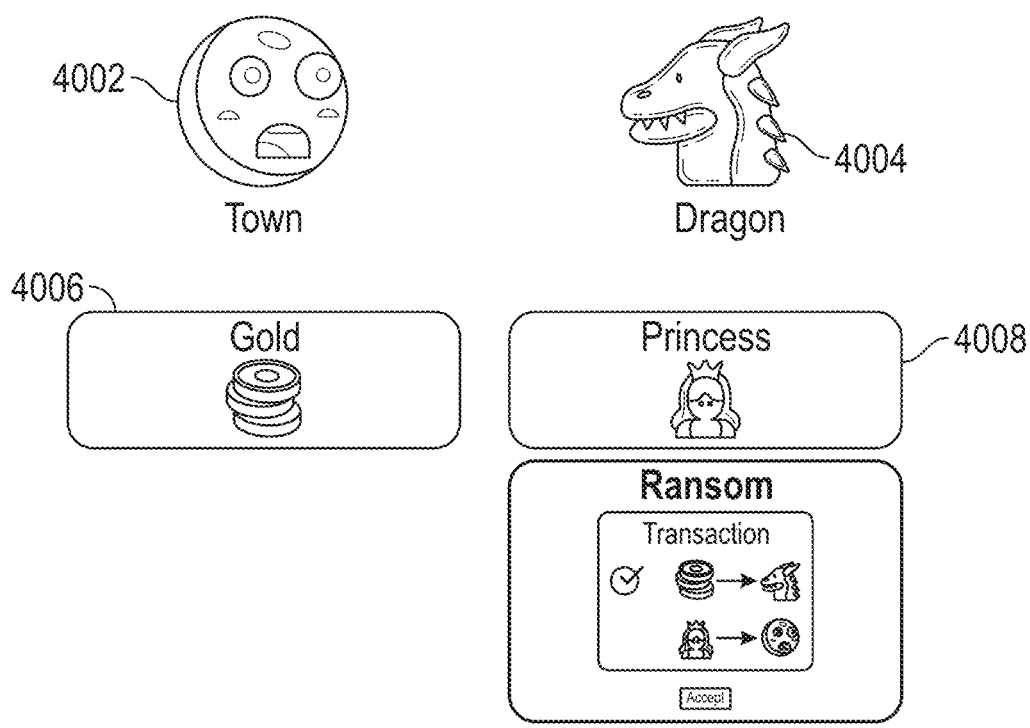
FIG. 40 illustrates an example picture of the jigs—one owned by each user and desired by the other, and a proposal jig to swap them according to some embodiments.

FIG. 40 illustrates a picture of the jigs 4002, 4004, 4006, 4008—one owned by each user and desired by the other, and a proposal jig to swap them according to some embodiments. In some embodiments, example code to swap the jigs can include:

```
class SwapProposal extends Jig {
    init (tx, owner) {
        this.tx=tx
        this.owner=owner
    }
}
var a=jigLibrary.load('<a-jig-location>')
var b=jigLibrary.load('<b-jig-location>')
jigLibrary.begin( )
a.send(b.owner)
b.send(a.owner)
var proposalTx=jigLibrary.export( )
var proposalJig=new SwapProposal(proposalTx, b.owner)
// On a separate machine, user B load the proposal jig and then tx
var proposalJig=jigLibrary.load('<proposal-location>')
jigLibrary.import(proposallig.tx)
jigLibrary.signAndBroadcast( )
```

In some embodiments, this can be extended for any number of swaps. This is different from traditional systems because it has not been implemented using any existing UTXO based token system to-date and relies on complex interactions between multiple jigs. The benefit of permissionless exchange is that two users do not need to trust nor pay for an escrow service to exchange their jigs.

Example Private Jigs

Background

In some embodiments, the first extension is an embodiment to create private jigs. The jigs described in the previous embodiments were always public meaning that every action performed on the jigs would be viewable to anyone that desired to look. In fact, this was by-design property of jigs that any jig may read any other jig. And while this has many use cases and may be excellent for information intended to be public, many applications and users also have a desire for privacy.

In some embodiments, a private jig is a jig that is only loadable by a user that has the jig's special decryption key. An application may use private jigs to store sensitive user information or to hide assets that are not yet intended to be public such as a rare game item. Private jigs are just as secure as public jigs, and a user may share their decryption keys with third parties in order for them to view their jigs. Third parties however cannot update the user's jig using only the decryption key unless the decryption key is the same as the owner key which is not recommended. In this way, users can selectively reveal their jigs to others.

In some embodiments, without the decryption key, some metadata about the jig is still visible on the blockchain. The public can see that a jig exists and which transactions it was involved in. However, they cannot determine the contents or type of the jig. Private jigs may still interact with other private jigs as long as the decryption keys are swapped between both parties. It is best if private jigs only interact with other private jigs from the same user, because if one user deletes the decryption keys for a jig owned by another user, they may invalidate their own jigs that interacted with that other user's jigs.

In some embodiments, jig decryption keys are intended to be stored in a user wallet, or to be stored in a secure third-party application database, or to be generated on-demand from a root key. If a user requests that their decryption keys be deleted from a third-party service, such as for a GDPR request to delete a user's data, deleting a user's decryption keys suffices to delete their data because the third-party service can no longer have access to that user's jigs. To ensure this, the cached jig output states are also encrypted using the user's decryption keys.

In some embodiments, to implement private jigs, the jig system requires an encryption scheme so first the disclosure will describe those requirements. The jig system can next extend the jig object to store an encryption key. The jig system can use that encryption key to encrypt jig output states, and then the disclosure will show how entire transactions change when there are private jigs and how the publish function is modified. Finally, the jig system can make modifications to the execute and load functions to support private jigs. All of these changes can first be applied to the jig token system, but the disclosure will end this section with a modification to the jig library to make using encryption keys easier. That is the plan at a high level.

Encryption

To use private jigs, the disclosure needs to define an algorithm for data encryption and decryption. Private jigs can use asymmetric encryption and decryption meaning that there is both a private key and a public key. Encrypting data uses the public key. Decrypting data uses the private key. There are many algorithms for encrypting data using asymmetric keys and the disclosure will not prescribe any particular one. However, one very useful encryption method is ECIES because it uses elliptic curves that are often also used for owning assets on a blockchain.

In some embodiments, the disclosure will assume that DecryptionPrivateKey and EncryptionPublicKey are available classes and that the public key may be derived from the private key. The disclosure will also assume that encrypt and decrypt functions are available. However the disclosure will not prescribe a particular implementation. The way these are used is as follows:

```
var privkey=new DecryptionPrivateKey( )
var pubkey=privkey.getEncryptionPublicKey( )
var data='<some data>'
var encryptedData=encrypt(data, pubkey)
var decryptedData=decrypt(encryptedData, privkey)
assertEqual(data, decryptedData)
```

In some embodiments, as part of the jig token system, there is also a DECRYPTION_KEYS table that stores a mapping from all known public keys to their corresponding private keys. This can be used whenever the jig system needs to decrypt data. Users or applications may add keys to this table that they know about, even from other users, in order to decrypt jigs.

Jig Object

In some embodiments, to enable private jigs, the disclosure first needs to extend the jig object with a new property: encryption. This property may be assigned in a jig's method like any other property and only the current jig may change this property. It stores whether the jig is encrypted or not and if so then with which key. Possible values include:

undefined, or false—The jig is not encrypted. This is the default mode.

true—The jig is encrypted and it can be assigned a decryption key when the transaction is published EncryptionPublicKey instance—Public key used to encrypt the jig In some embodiments, the reason the jig system allows the jig object's encryption parameter to be set to true is so that the user may enable and disable encryption easily without worrying about generating a new encryption key each time. Generating a new encryption key can be handled in the publish function by calling the nextEncryptionKey function. The nextEncryptionKey function should return a new encryption key but how this is determined is left up to the implementation.

In some embodiments, when a jig's encryption property is not undefined or false, then encryption is enabled for that jig. When encryption is enabled, its output states are encrypted using the public key assigned to the jig. Also, any jig transactions that use this jig can have their programs encrypted using a shared encryption key derived partly from that jig's encryption key as well as other encrypted jigs used in the transaction. Because the commands in the program can be encrypted and those commands can regenerate the output states of a jig, the jig can not be able to be loaded by anyone that does not know the jig's DecryptionPrivateKey.

In some embodiments, several examples for setting the encryption property from inside a jig method can include:
// Enable encryption and generate a new encryption key
this.encryption=true
// Enable encryption using a specific encryption key
this.encryption=<someEncryptionPublicKey>
// Disable encryption
this.encryption=false Output State The jig system can now modify the JigOutputState data structure to be encrypted for private jigs. Because output states are cached, the jig system can encrypt the output states for private jigs so that accessing the state of a jig always requires the decryption key. The disclosure adds two new fields to the output state:
encryption—The encryption property of the jig. This may be set to an EncryptionPublicKey or NULL. When this value is not NULL, all other fields except for the encryptedData field are NULL.
encryptedData—When encryption is not NULL, then this value contains an encrypted version of the output state as it would normally be stored without encryption. It is encrypted with the EncryptionPublicKey from the encryption property. When encryption is NULL, this value is also NULL.

In some embodiments, the new JigOutputState data structure then is:
struct JigOutputState {
  kind: JigKind,
  owner: PublicKey,
  location: JigReference,
  origin: JigReference,
  nonce: number,
  properties: Object,
  class: JigReference or NULL,
  source: string or NULL,
  dependencies: Map<string to JigReference> or NULL,
  encryption: EncryptionPublicKey or NULL,
  encryptedData: EncryptedBuffer or NULL
}

In some embodiments, the following changes to the capture function to create output states can include:
Check if the jig is public (non-private) by checking if the encryption property is undefined or false
Set the encryption property of the output state to the encryption property of the jig
If the jig is public, then capture the output using the current capture logic. Then set encryptedData to NULL.
If the jig is private, then capture its output state into a new variable using the current capture logic. Then encrypt the captured output state using the encrypt function and the encryption key. Finally set the encrypted output state to the encryptedData field of the output state.

In some embodiments, the following changes to the recreate function to produce jigs from the output state can include:
If the encryption property is undefined or false, then recreate and return the jig using the current logic.
If the encryption property is not undefined or false, then decrypt the data in encryptedData using the private key from DECRYPTION_KEYS. If the private key does not exist, then throw an error. Otherwise, use the decrypted output state to perform the rest of recreate using the current logic.

Transactions

In some embodiments, transactions can change when they contain private jigs. Mostly, the programmable transaction format remains the same. However, when there are any encrypted jigs in the outputs or references, the program can change to store encrypted commands and owners. When the program is encrypted, instead of storing properties for the commands and owners, the program can store two new properties: encryptedData and encryptionKeys. All other properties can be NULL. The encryptedData property stores the encrypted program. The encryptionKeys property stores the public keys used to encrypt the encryptedData. Once decrypted, the decrypted program can be the same as in the unencrypted case. The new program data structure then is:
struct Program {
  commands: [Command] or NULL,
  owners: [PublicKey] or NULL,
  encryptedData: EncryptedBuffer or NULL,
  encryptionKeys: [EncryptionPublicKey] or NULL
}

Figure 41:
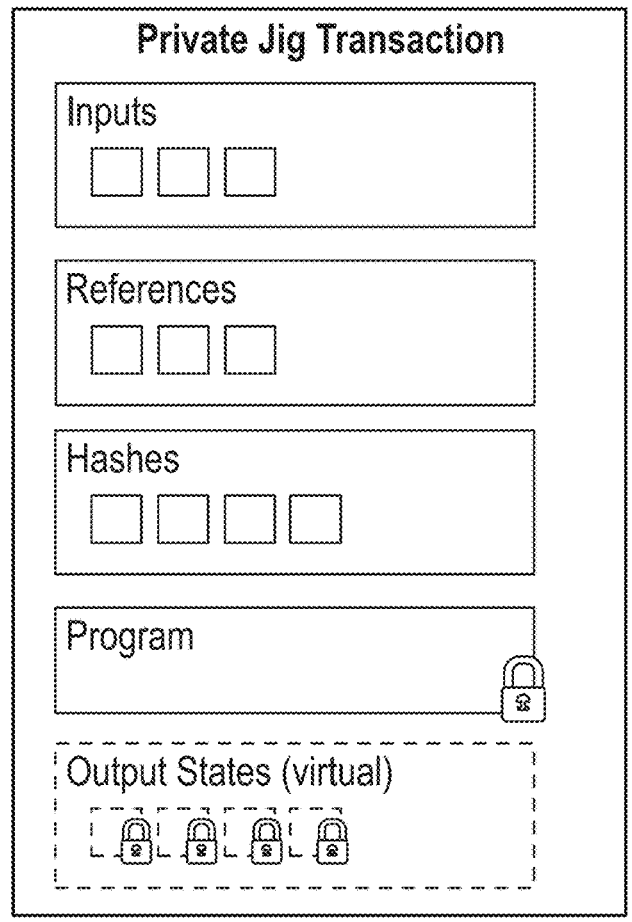
FIG. 41 illustrates an example private jig transaction showing which parts of the transaction are encrypted according to some embodiments.

FIG. 41 illustrates a private jig transaction showing which parts of the transaction are encrypted according to some embodiments. The private-public keypair used to encrypt and decrypt the program is a special shared key. The shared key's PrivateDecryptionKey is generated from each individual PrivateDecryptionKey assigned to private jigs in the references and outputs of the transaction. Thus, to encrypt or decrypt a transaction, every individual private jig's decryption key is required. The PublicEncryptionKey is derived from that calculated PrivateDecryptionKey. Here is the calculation for generating the shared private key:

In some embodiments, given $D_1, D_2, \ldots D_n$ decryption private keys stored as big numbers:
SD=
  $D_1$ when n is 1
  $(D_1 * D_2 * \ldots * D_n * G).x$ when n>1
Where
  SD is the shared decryption private key for the transaction
  G is the generator point of the curve In some embodiments, the shared decryption key is generated by multiplying each private key together and then multiplying that result by the curve generator. This is a one-way operation. The x point of the curve is used as the shared private key. Revealing this shared private key does not reveal any of the individual private keys used to generate the shared key. This is of course not the only way to generate a shared private key but the disclosure presents it as an example of a simple approach. When there is only one private key, then the shared decryption key can be set to that private key, because otherwise the shared decryption key would just be the public key's x coordinate which is not secure.

In some embodiments, the reason that private jigs from the references and outputs, but not the inputs, are used to encrypt the transaction is because it is the jig states at the end of a transaction that determine whether to encrypt or not. Outputs are end states but inputs are not. References are output end states of another transaction so they are always used.

One may wonder why a single key is used to encrypt the program rather than encrypting the program in copies for every output jig's encryption key. Besides the fact that this would make transactions larger, the main reason for encrypting the program with a single key is that there is a single source of truth for what happened in the transaction. If there were multiple encrypted programs stored, then there might be discrepancies between those programs that are not easily detectable.

In some embodiments, if there are mixtures of both private and public jigs updated or created in a jig transaction, then the entire transaction's program can be encrypted to protect the private jigs.

The disclosure now describes changes to the publish function in some embodiments:

Right after the outputJigs and referenceJigs are calculated, check if any of them are private. If none have encryption, then perform the current logic for the remainder of the function and return.

If there are any private jigs in outputJigs that have encryption property set to true, then set their encryption property to the value returned from calling nextEncryptionKey.

Generate a shared decryption private key per above.

Use the shared decryption private key to generate a shared encryption public key.

Create the transaction as normal. Before adding fees, signing inputs, and broadcast, encrypt the program and store the encrypted program as {encryptedData, encryptionKeys} in the transaction.program field, replacing the existing value.

In some embodiments, the new logic can include:

```
function publish(record) {
    var inputJigs = record.spends
    var outputJigs = record.spends + record.creates
    var referenceJigs = record.reads -
    record.spends - record.creates
    var encrypted = (outputJigs + referenceJigs).
    some(jig => jig.encrypted)
    if (encrypted) {
        outputJigs.forEach(jig => {
            if (jig.encrypted === true) {
                disableNextActionHandler( )
                jig.encrypted = nextEncryptionKey( )
            }
        })
    }
    outputJigs.forEach(jig => {
        setNonce(jig, getNonce(jig) + 1))
```

```
        var owners = [ ]
        outputJigs.forEach(jig => {
            if (!getOwner(jig)) {
                owners.push(nextOwner( ))
                setOwner(jig, owners[owners.length - 1])
            }
        })
        var jigOutputStates = outputJigs.map(capture)
        var hashes = jigOutputStates.map(generateHash)
        var commands = record.actions.map(createCommand)
        var program = { commands, owners }
        var transaction = new Transaction( )
        transaction.inputs = inputJigs.map(locate)
        transaction.program = program
        transaction.hashes = hashes
        transaction.references = referenceJigs.map(locate)
        if (encrypted) {
            var encryptionKeys = (outputJigs + referenceJigs)
                .filter(jig => jig.encryption)
                .map(jig => jig.encryption)
            var privkeys = encryptionKeys.map
                (DECRYPTION_KEYS.get)
            var SD = generateSharedKey(privkeys)
            var SE = SD.getEnryptionPublicKey( )
            var encryptedData = encrypt
                (transaction.program, SE)
            transaction.program =
                { encryptedData, encryptionKeys }
        }
        addFees(transaction)
        signInputs(transaction)
        broadcast(transaction)
        record.reset( )
        for (let vout = 0; vout < outputJigs.length; vout++) {
            /// Note: vout can start with 1
            if this is an L2 transaction
            var location = new JigReference
                (transaction.txid, vout)
            setLocation(jig, location)
            if (!getOrigin(jig)) setOrigin(jig, location)
            STATE_CACHE.set(location,
                jigOutputStates[vout])
        }
    }
```

In some embodiments, the hashes can be generated from the encrypted output states when the jigs are encrypted ensuring that no information leaks about the state of the jig from their hashes. Now the disclosure will describe how the executor function is modified to read these encrypted transactions.

Executor

In some embodiments, the execute function takes input states, reference states, and a program to execute and returns the new output states. The input and reference states may be encrypted, but the jig system already implemented the code to decrypt them in the recreate function. Similarly, the output states returned are generated from jig objects and we've already updated the capture function for that. Therefore, the only code that needs to be modified is in the code to process the commands and owners. The jig system can make the following change to execute:

Before the program is accessed, check if it has an encryptedData property that is not NULL. If so, decrypt the encryptedData property using the encryptionKeys and assign its value to the program.

In some embodiments, decrypting the encryptedData property requires a decryption private key. This can be generated using the generateSharedKey, in a way similar to in publish by using the encryptionKeys in the program to lookup the private decryption keys in the DECRYPTION_KEYS table. The load method does not need to be modified to use execute. The encrypted output states can automatically be stored in the state cache using existing code.

Encryptor

The above description was a modification of the jig token system. The disclosure now shows a modification to it for the jig library embodiment. Instead of a DECRYPTION_KEYS table, the disclosure proposes an ENCRYPTOR API. This would be a component like the BLOCKCHAIN or STATE_CACHE in the jig library. The user would configure the ENCRYPTOR API for their use cases.

In some embodiments, it has two methods:
nextEncryptionKey—Gets a new decryption key for newly encrypted jigs
getDecryptionKey—Returns the decryption private key for the provided public key In some embodiments, in all places where the DECRYPTION_KEYS table was used before, the jig system may call getDecryptionKey on the ENCRYPTOR instead. Similarly, wherever the nextEncryptionKey function was called before, the jig system may call the ENCRYPTOR's nextEncryptoinKey method.

In some embodiments, this ENCRYPTOR API allows many third-parties to plug into the jig library to provide encryption and decryption keys. A third-party wallet might store these keys or they may be persisted to disk upon creation. It allows flexibility for many different applications.

Summary

The above embodiment for private jigs suffices to allow users to own their data and also control its access. The disclosure described the encryption algorithms required and the modifications to the jig object to support encryption. The disclosure showed how the output states and transaction programs are encrypted. The disclosure also described modifications to the execute function to support encrypted transactions. Finally, the disclosure showed a modification to the jig library to make private jigs easier to use.

The disclosure also described the following variations to the above embodiment:
- A variation where when jigs interact, their decryption private keys are all encrypted using the shared decryption key and stored in the transaction. This would allow interacting private jigs to have access to each other's histories in perpetuity. The shared decryption key would be generated through a diffie hellman process where the public encryption keys of all private jigs in the references and outputs would be combined together and a single decryption private key from one jig combined with all the other encryption public keys from other jigs would be able to reproduce the shared decryption key.
- A variation where encrypt and decrypt functions are provided on the jig object to enable and disable encryption respectively.
- A variation where private jigs are differentiated by their type, such as by extending from a PrivateJig base class.
- A variation where all of the public encryption keys are not stored in the program's encryptionKeys field and can be saved by the users.
- A variation where individual commands are encrypted instead of the entire program.
- A variation where decrypting a key reveals the decryption private key in the transaction for all users to see in the future.

In some embodiments, the benefits of private jigs include:
Store sensitive information owned by individuals in objects on-chain
Hide assets from other users until the right time when they can be decrypted
Allow implementations that respect privacy laws on-chain
Encrypt data using the existing jig token system rather than create a new system
Encrypt rich interactions that jigs allow The private jig embodiment described above allows for a complete system of interactive tokens that may also be private with little changes to the user. To date, there are no other token systems that support privacy in the manner described above using jigs. An encrypted object system has been described before but it did not support jig objects or programmable transactions and also it did not support references or encoding the output states. Therefore, the disclosure considers the embodiment above different than traditional systems.

Locks

Some blockchains support owners defined by scripts. On these blockchains, there is a programming language used to write small programs called scripts to specify ownership. In some embodiments, a locking script in an output is like the public key and an unlocking script provided in an input is like the private key. The locking and unlocking scripts are combined together to create a predicate script to test ownership and it resolves to either true or false. If the script resolves to true, ownership is verified and the asset is unlocked for use. Many blockchains support script ownership including Bitcoin and Litecoin.

In some embodiments, the advantage of script ownership is that advanced forms of ownership become possible such as requiring 2 of 3 parties to agree before an asset is unlocked. The disadvantage to script ownership, in comparison to simple public/private key ownership, is that owner scripts can be both difficult to write and difficult to spend. If jigs are to support ownership scripts, there should be an easy way to use them.

The disclosure therefore proposes a system that enables a jig ownership to be defined by a higher-level object that can be converted into a raw locking script in some embodiments. This higher level object can acquire behavior from a class jig on the blockchain to perform this conversion. Using these higher level objects called lock objects, a jig's owner can be transformed into an ownership script when the lower-level scripts are required. Other users may load the lock classes as jigs in order to reuse ownership script generators.

Lock Object

In some embodiments, a lock object is an object written in the same language as jig objects and may be assigned to the owner property of jig objects. In previous descriptions, the jig owner would be specified with a public key. However, using only public keys is a limited form of ownership compared to ownership scripts. Lock objects are non-jig objects whose properties, along with a script function, can be used to generate a locking script. All lock objects have a script method inherited from their jig class that converts those object properties into the low-level script code for the blockchain.

In some embodiments, the definition for the script method can include:
script—A method that returns the raw script code used to assign as the output's owner script. This method should convert the object properties into this script deterministically. It should not change any state of either the object or the jig and it should not take any parameters.

In some embodiments, the code for the script method can come from an existing on-chain class. The lock object would be a non-jig instance of that class if the language supports non-jig objects because that enables natural type checking.

In some embodiments, in addition, lock objects may optionally have a domain method. The domain method returns the estimated size of the unlocking script. This may be used by the PURSE in the jib library to estimate the fees required for a jig transaction before all inputs have been signed.

In some embodiments, an example of assigning a lock object as a jig owner can include:

```
class MathLock {
  constructor(part, sum) {
    this.part=part
    this.sum=sum
  }
  script( ) {
    return 'OP_$[this.part] OP_ADD OP_${this.sum}
      OP_EQUAL'
  }
}
deploy(MathLock)
class Test extends Jig {
  assignToMathLock( ) {
    this.owner=new MathLock(1, 2)
  }
}
var test=new Test( )
test. assignToMathLock( )
```

Transaction

In some embodiments, when a jig is captured into an output state, if the owner is a lock object, the owner property of the JigOutputState should be set to an output script by calling the script method on the jig and storing the value returned. If the jig's owner is a PublicKey, then the PublicKey should be converted into a script too.

In some embodiments, the owner property of the output state should no longer be the jig's actual owner. This is because the owner property on the output state is the owner used for the blockchain transaction and the blockchain has no understanding of jig objects. However, the output state can still preserve the lock object as a property so that the jig can be recreated. Therefore, the disclosure defines a new property called the jigOwner that can be assigned the encoded owner object of the jig. The new JigOutputState data structure is as follows:

```
struct JigOutputState {
  kind: JigKind,
  owner: Script,
  jigOwner: LockObject,
  location: JigReference,
  origin: JigReference,
  nonce: number,
  properties: Object,
  class: JigReference or NULL,
  source: string or NULL,
  dependencies: Map<string to JigReference> or NULL
}
```

In some embodiments, the following changes to the capture method can include:
  outputState.owner=getOwner(jigObject).script( )
  outputState.jigOwner=encode(getOwner(jigObject))

In some embodiments, the following changes to the recreate method can include:
  setOwner(jigObject, decode(outputState.jigOwner))

In some embodiments, any jigs that have lock object owners should have their lock object's jig class added as a read in the record since it is used to produce the output state. The disclosure can add the following code to the publish method at the top:

```
outputJigs.forEach(jig => {
  If (isLockObject(getOwner(jig))
    record.reads.add(getClass(getOwner(jig)))
  }
})
```

Signer

In some embodiments, the SIGNER component's sign method of the jig library would produce the solution to unlock the lock object. It may do this by inspecting the higher level object or by recognizing certain scripts as scripts it may sign. The sign method may be passed an array of lock objects or jigs for the jig inputs in addition to the transaction to sign.

Summary

This embodiment describes a way to use high-level objects for jig ownership. The disclosure described how these objects are represented, how they are converted into output states, and how they are signed.

In some embodiments, the benefits to this approach are:
  Ability to define complex and custom ownership scripts for jigs
  Easier than writing custom ownership scripts using low-level code
  Allows different users to discover and reuse each other's ownership types
  Reusing class jigs to generate ownership saves space and fees on the blockchain In some embodiments, the following variations to this idea can include:
  A variation where instead of jig classes, jig functions are used to define how the lock objects are converted into lower level scripts.
  A variation where the script method is outside of the owner property itself, perhaps as a special ownerTransformer property.
  A variation where both lock objects and public keys may be assigned as owners to jigs This is different than traditional systems because it has not been implemented on any token system. The solution calls for classes to be stored in a reusable way on-chain. This idea is unique to jigs so the idea of using it for ownership types is therefore also novel.

Caller

In some embodiments, the caller variable is a special global variable available to jigs in their methods. It would be made available in the runtime environment for the jig code either through the sandbox or via a code dependency. It changes with every action and it returns the jig second to the top of the current record's stack or NULL if the stack is not at least 2 deep. Here is the code to calculate its value:

```
if (CURRRENT_RECORD.stack.length<2) {
  return null
} else{
  return     CURRENT_RECORD.stack[CURREN-
    T_RECORD.stack.length−2].jig
}
```

In some embodiments, the purpose of the caller property is to allow jigs to know which jig called them. Jig code can not have access to the CURRENT_RECORD directly. This caller variable may be used instead. Use cases include restricting the creation of jigs to only certain jigs or ensuring that methods on jigs may only be called by certain owners. Here is an example of how it might be used:

```
class Lair extends Jig {
  createDragon( ) {
    return new Dragon( )
  }
}
class Dragon extends Jig {
  init( ) {
    if (!(caller instanceof Lair)) throw new Error( )
  }
}
new Dragon( ) // error!
new Lair( ).createDragon( ) // success!
```

Figure 42:
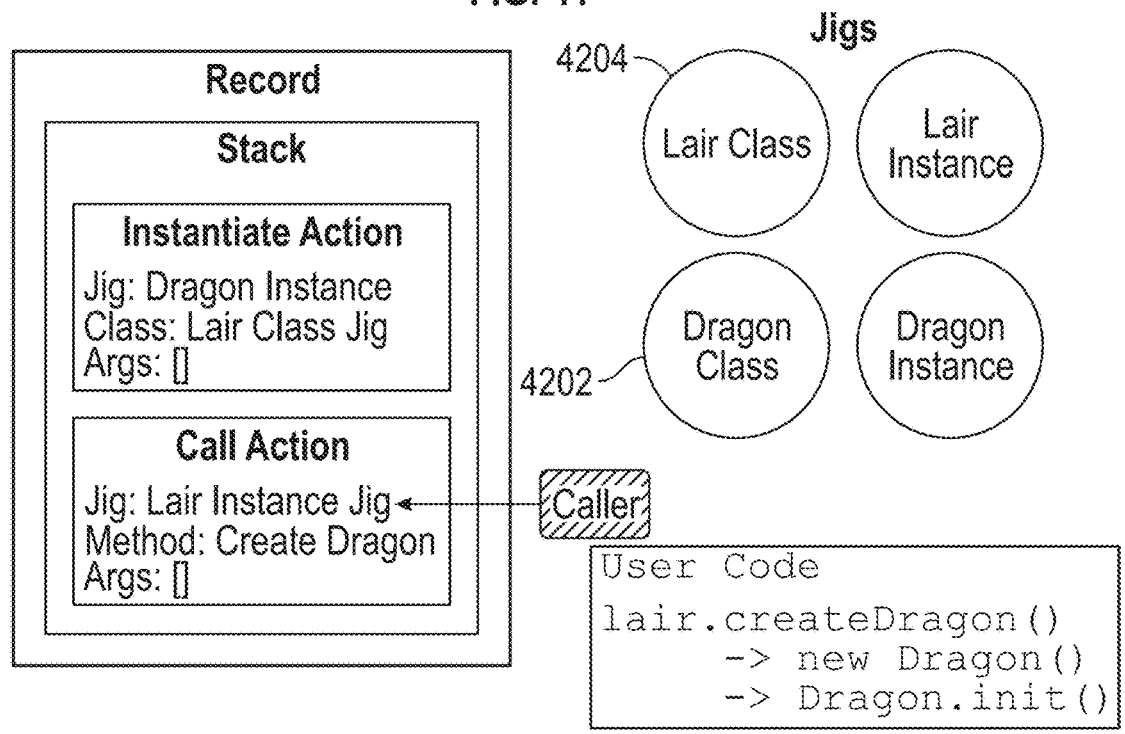
FIG. 42 illustrates an example of how the caller variable relates to the record's stack according to some embodiments.

FIG. 42 illustrates an example of how the caller variable relates to the record's stack according to some embodiments. In some embodiments, instances of the Dragon class jig 4202 can only be created from instances of the Lair class jig 4204. The method above is a constructor that is always called when an instance is created and this is where the property is enforced. FIG. 42 show the relationship between the caller property and the record stack using the above code as a reference.

In some embodiments, the caller property may be a global variable or a global method that returns the value above. It may return the jig or it may return the function that the jig came from, but both should be higher-level objects and not addresses or locations. This idea is different than traditional systems because it has never been implemented in a token or smart contract system to date, and having a caller property has been described as unsafe in the context of other platforms. This embodiment should not be understood to be limited to jigs. Any smart contract system where one contract may call another smart contract may have a caller property that references the parent smart contract in its object form using an approach similar to the one described above.

Readability

The disclosure previously described how the jig token system would support jig references. Referenced jigs are not spent so the disclosure described how the jig system might restrict which references are valid or not according to various time requirements. The disclosure said that these jig references might be allowed to be in any historical state, a recent state, or required to be in the latest unspent state. This was a choice left to the jig token system implementation. The disclosure also described a social synchronization process in the Extensions that would enforce that referenced jigs could only be updated to a newer state and never downgraded to a past state. These were all ways to control the readability of jigs within other jigs. The problem however is that these settings were global for all jigs in the jig token system. The disclosure now describe an embodiment to selectively control the readability of particular jigs in other jigs, and calls this the jig readability mode.

In some embodiments, the jig system extends the jig object and the jig output state with a new property: readability. The readability property is the mode that the jig may be read in. The disclosure describes two modes: historical and recent. When in historical mode, the jig may be read by other jigs in any past state. When in recent mode, the jig may only be read by other jigs when there is not a newer state of the jig within some time window from the time the transaction was created or is being created. This property, like owner and encryption, may be set by the jig itself inside its methods.

In some embodiments, to enforce this property, when a jig is added to the read set in the record, the jig system check its readability property and then enforce its setting at that time. For historical readability, there is nothing to do because read references from any state are allowed. For recent readability however, the jig system checks the following:

```
checkRecent(jig, now) {
  if (jig.readability !=='recent') return
  var loc=jig.location
  var spendTxid=blockchain.spend(loc.txid, loc.vout)
  if (!spendTxid) return
  var b=blockchain.time(spendTxid)
  if (b<now—TIME_WINDOW) throw new Error( )
}
```

Figure 43:
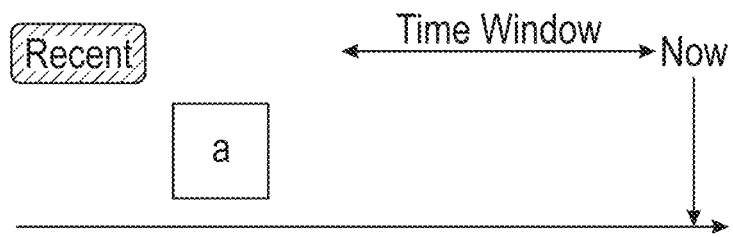
FIG. 43 illustrates an example of recent vs stale according to some embodiments.
Figure 43:
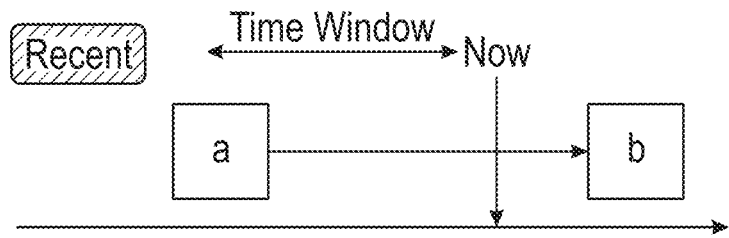
Figure 43:
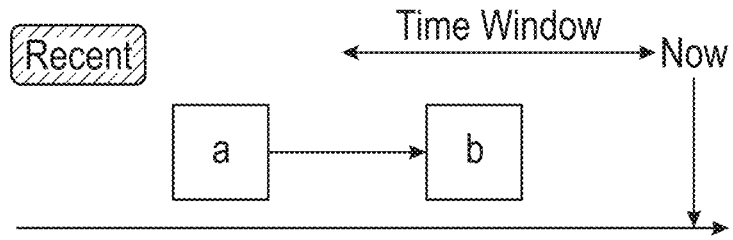
Figure 43:
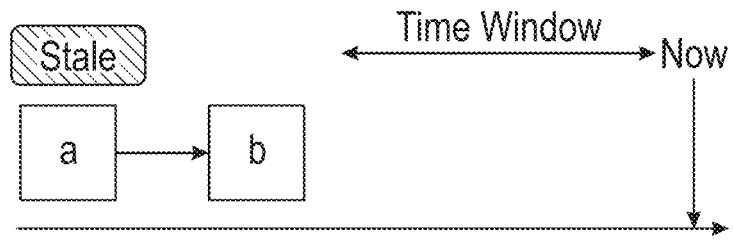

Checking for recency requires some explanation. FIG. 43 illustrates the recent vs stale according to some embodiments. Stale can throw an error. When replaying a historical transaction in the execute method, the now value should be set to the time of the transaction being loaded, which should be either its block time or mempool acceptance time. The TIME_WINDOW constant should be set to a value large enough to allow for block reorganizations without invalidating jigs. This can depend on the blockchain and can likely be hours or days.

In some embodiments, the trade-off with recent readability mode is that it is dependent on the spend and time functions of the BLOCKCHAIN API and if this API returns the wrong value for any reason, intentionally or unintentionally, before the transaction is published, then the jig may be invalidated. To resolve this potential issue, the disclosure proposes a blockchain guarantee service below, but it should be understood to be a risk. The disclosure also proposes that the TIME_WINDOW be large enough to be safe even when the BLOCKCHAIN API is working correctly.

This embodiment is different from traditional systems first because the jig token system's read references are novel and this is an extension of those read references. The recent mode in particular is different from traditional systems because UTXO-based tokens have never had a recency requirement before and the edge cases are complex when considering the time window.

In some embodiments, the benefits for having different read modes are that it allows developers to define how individual jigs are able to be used. There doesn't need to be a single global setting. For example, a developer that creates a whitelist may desire its readability to always be recent so that it can be trusted, but other jigs may be fine with being read in a historical state. The jig token system allows multiple read modes to coexist at the same time.

In some embodiments, the following variations can include:

A variation where there is a latest readability mode that checks whether the jig was unspent at the time it was referenced A variation where if the readability check fails for a jig, then the jig is not invalidated but the current action is instead cancelled. This may require creating additional backup outputs in case of a cancellation.

A variation where the jigs doing the reading enforces the readability requirements by calling a special function like mustBeRecent or mustBeLatest on the jig that puts the jig into a temporary readability mode just for that action.

Guarantee Service

In the previous readability embodiment, the disclosure described a problem where the recent read mode was dependent on accurate results from a blockchain API. The disclosure now describes an embodiment where a blockchain API network service may provide guarantees that recency is safe to use. These guarantees are both technically and economically secured.

In some embodiments, the two methods in the blockchain API that risk invalidating a jig in recent mode are the spend and time methods. These may both be de-risked by checking multiple sources. For example, if there are three possible remote APIs available, the jig library's BLOCKCHAIN API may call all three and if the results don't match, throw an error. However, this is only a part of the solution. The disclosure proposes another option: broadcast to a network service that guarantees the transaction can be valid when it is included in a block.

In some embodiments, when a transaction is broadcast that has jig references with recent readability to a network service that guarantees its validity, the first step for the network service is to check that all of the recent jig references are still valid from the perspective of the service. This may be done by querying multiple sources to gain a high level of assurance of recency. Once initial validity is checked, the next part is to make sure that the transaction gets included in a block quickly so that it stays valid.

In some embodiments, to get a transaction into a block quickly, first the blockchain API should check that the fee is high enough to be likely to be included in a block soon. This can depend on the blockchain network and its current fee levels. If the fee is not high enough, the service should return an error. Assuming the fee is high enough, the service then should submit the transaction to multiple nodes on the network. Next it should monitor blocks to check that the transaction is included in a block. If the transaction is not included, it should resubmit the transaction to nodes periodically.

In some embodiments, the guarantee service should also raise the fee of the transaction over time to motivate nodes to include the transaction. This can be negotiated on a per-miner basis, such as by making a payment outside of the transaction or by raising the fee of the transaction. The latter option requires either asking the user to raise the fee by creating a new transaction or by creating a child-pays-for-payment transaction with a higher fee. The fee should continue to be raised until the transaction is in a block. If the service is unable to guarantee validity and a jig is invalidated, the service should notify the user and potentially pay the user for this lost jig like an insurance system.

Figure 44:
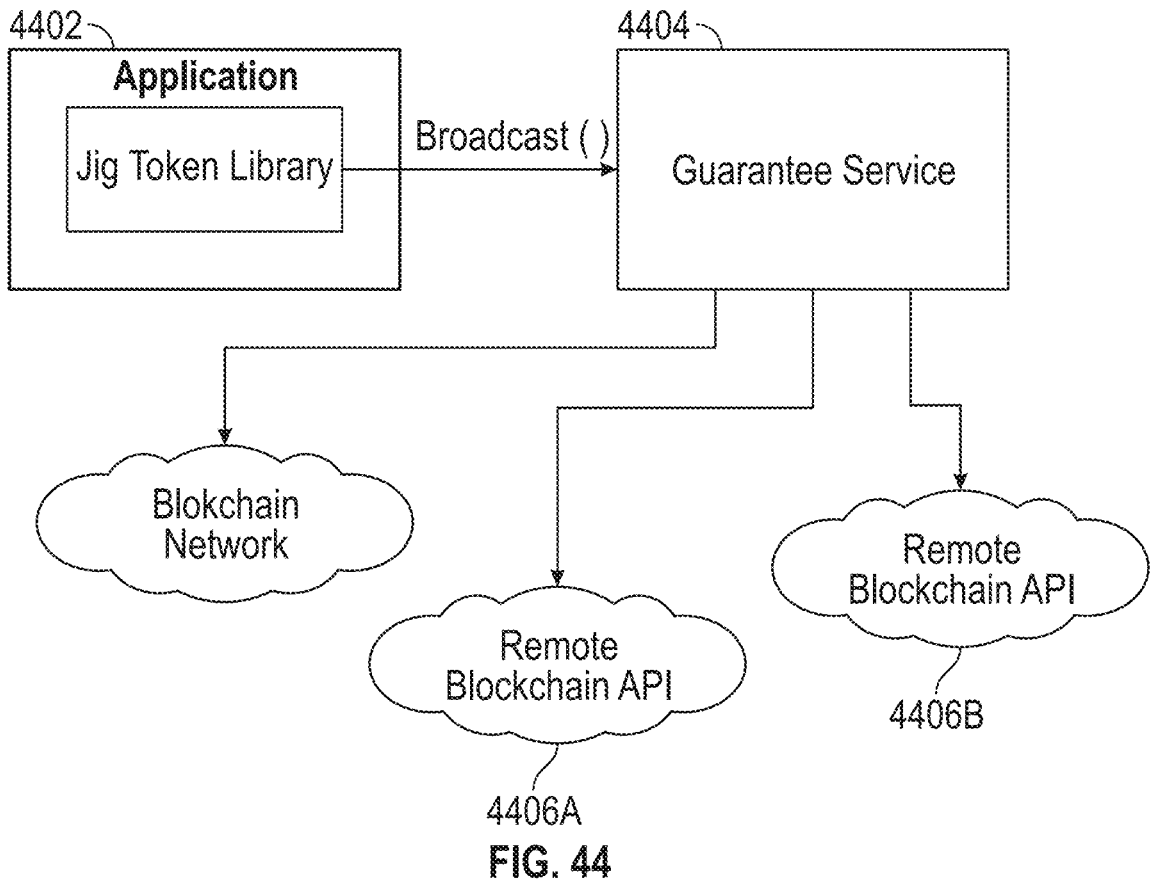
FIG. 44 illustrates an example representation of the guarantee service architecture according to some embodiments.

FIG. 44 illustrates a representation of the guarantee service architecture according to some embodiments. This guarantee service should be a paid service available to users of a particular jig token system. Applications 4402 would subscribe to this service 4404 and configure their BLOCKCHAIN API 4406A, 4406B to use it to ensure that their user's transactions can be included quickly in a block and that they can remain valid. The service should keep logs about when a transaction was received and what different remote APIs returned to prove to the user in case of an invalidation. This data can even be stored and time-stamped on the blockchain.

This embodiment has importance outside of jigs. Any protocol that requires recent references would benefit from such a service. However, the dig system finds this especially useful for jigs because of the common use of read references. Such a service is novel because recent reference requirements are novel to jigs.

Oracles

In some embodiments, in games and other applications, getting a random number is very important. For example, if two users own two digital pets and they wish to combine them, having a secure source of randomness to generate the merging of the two pets ensures users cannot collude. Generating randomness on the blockchain is surprisingly difficult. Although block hashes are effectively random to users, they don't come frequently enough to be useful in many applications. Transaction hashes are not a secure source of randomness for users since transactions are created by users and can be changed until the desired random value is generated. Therefore, the disclosure shows an embodiment for providing randomness and other oracle data for jigs using a jig communication mechanism.

In some embodiments, assume there is a jig that requires some oracle data as well as a service that can respond and provide that oracle data. The jig that requires the oracle data would create a new oracle value jig that they store as a local property. The act of creating the oracle value jig would automatically set its owner to the oracle service provider's address. This oracle service would listen for new jigs and upon receiving one would set a new value on the jig it received. When the oracle value jig is synced on the original jig, that value can be available for use. Values should only be able to be set once. A getter would provide this value to the user or throw if the value is not yet available.

In some embodiments, the OracleValue jig would be customized for the specific data. Example code for the jigs can include:

```
class JigThatNeedsOracleValue {
    init( ) {
        this.oracleValue = new OracleValue( )
    }
}
class OracleValue {
    init(source) {
        this.owner = OracleRequest.PROVIDER
    }
    set Value(value) {
        if ('value' in this) throw new Error('Already set value')
        this.value = value
    }
    getValue( ) {
        if (!('value' in this)) throw new Error('No value set')
    }
}
OracleValue.PROVIDER = '<provider-address>'
```

Figure 45:
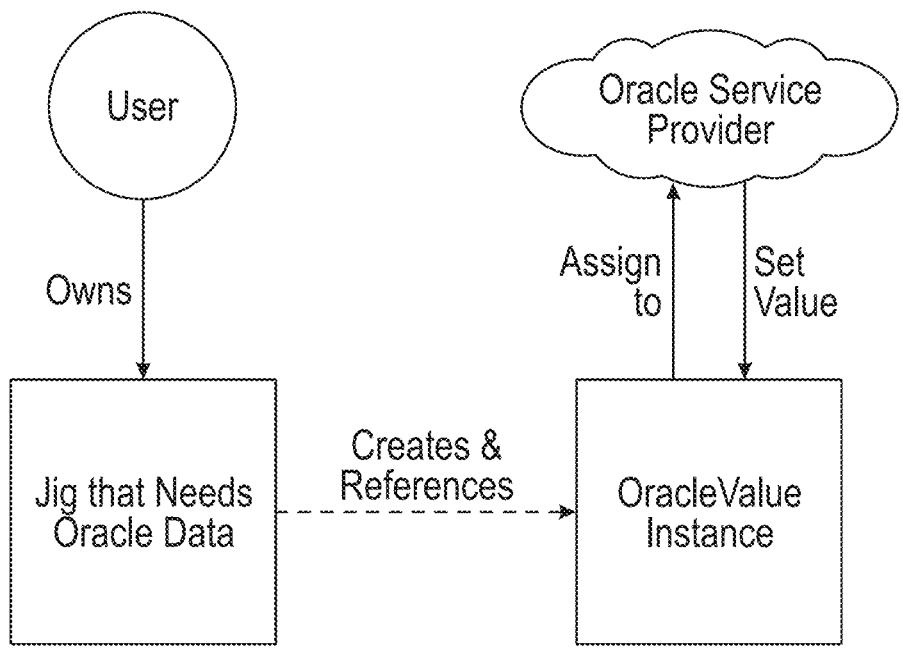
FIG. 45 illustrates an example visual representation of ownership and usage of an Oracle value jig and oracle service provider according to some embodiments.

FIG. 45 illustrates an example visual representation of ownership and usage of an Oracle value jig and oracle service provider according to some embodiments. For randomness in particular, here is a process to provide randomness trustlessly. BLS signatures are effectively random numbers but they are also deterministic values for a given private key and data to sign. If a service signs the location or origin of the oracle value jig, that signature may be used as the source of randomness. Both the user requesting randomness and the service provider would have no influence over the choice of the random value without changing the private key used to sign without colluding. That private key, while not shared with users, can be guaranteed not to change by exposing its public key. Users can also verify the signature is correct using this public key.

The disclosure describes the following variations of this embodiment:
- A variation where date and time information is provided via oracles
- A variation where any external information outside the blockchain is provided
- A variation where the oracle request jig contains an amount of native coin to motivate the oracle service to respond.
- A variation where multiple services race to provide the oracle value. The first to provide the value is the first to be used. There is a lock-in mechanism once the first value is read to ensure it remains the value used in the future.
- A variation where when multiple services provide the oracle value, the first service to provide the value receives a payment for this service using a jig.
- A variation where the oracle's private key is updated periodically using block hashes to determine their next value deterministically without exposing this process to users.

This embodiment is beneficial because it allows jigs to access external data using a fully on-chain communication mechanism that also works in jigs. While oracle services are not new, their use in on-chain objects such as jigs is novel. It is non-obvious because jigs are non-obvious and this extension has not been implemented yet.

Protocol Jigs

In some embodiments, while jigs are useful as tokens, there can be uses for other protocols on the blockchain too, some tokens and some not. The data created by these other protocols may be useful to use within jigs. This embodiment describes protocol jigs which are objects like jigs that are deterministically loaded from other data on a blockchain that was stored using other protocols. Protocol jigs objects have a location like jigs that uniquely identifies them but instead of being updatable, protocol jigs are immutable. Their location and origins therefore are always the same. However, they are still interactive with other jigs. To load a protocol jig, a protocol jig class can first be defined and deployed.

In some embodiments, a protocol jig class is a special jig class with a single static method, load. Protocol jig classes are deployed on-chain like any other jig code. However, a protocol jig class is differentiated from a standard jig class in some way as a protocol jig class. For example, it may extend from a Protocol base class or have a protocol property on it set to true. The role of the load method is to deterministically return a typed instance of the protocol jig class given two parameters: location and fetch. The location parameter is a location on the blockchain for some information to load. The location may be a transaction id for example. The fetch parameter is a function that returns a transaction from a txid. The load method should use the fetch method to find the data and then parse it.

In some embodiments, an example protocol jig class can include:

```
class SampleProtocol extends Protocol {
  static async load(location, fetch) {
    var tx=await fetch(location)
    var data= . . . II parse data from tx
    return new SampleProtocol(data)
  }
}
```

In some embodiments, the jig token library has a loadProtocolJig method that calls the load method. The user calls this method and passes in a location to load. This method should load the protocol jig class and then call the load method on its class. Then, it should set the location of the returned protocol jig instance to the location passed to loadProtocolJig and make the protocol jig immutable. The function should then make the protocol jig immutable, possibly by setting action handlers that prevent any changes. Finally, the loadProtocolJig function should cache the protocol jig state so that future loads are quick. This is possible because protocol jigs are deterministically loadable from their locations like jigs. Here is sample code for the loadProtocolJig method:

```
async function loadProtocolJig(location) {
  if (STATE_CACHE.has(location)) {
    return recreateProtocollig(STATE_CACHE.get(location))
  }
  var ProtocolJigClass=await load(location.txid, location.vout)
  var protocolJig=await ProtocolligClassload(location.protocolligLocation, blockchain.fetch)
  if (!(protocolJig instanceof ProtocolJigClass)) throw new Error('B ad protocol jig instance')
  protocolJig.origin=protocolJig.location=location
  makeImmutable(protocolJig)
  STATE_CACHE.set(location, captureProtocolJig(protocolJig))
  return protocolJig
}
```

Figure 46:
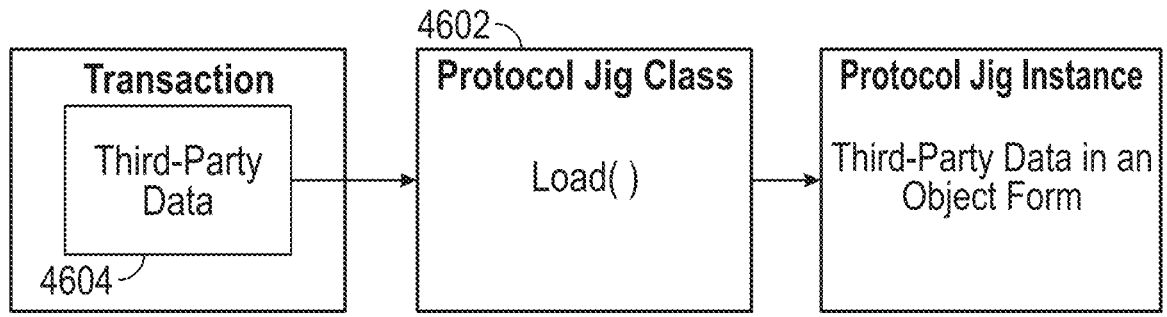
FIG. 46 illustrates an example of loading third-party data into a protocol jig using a protocol jig class according to some embodiments.

FIG. 46 illustrates loading third-party data 4604 into a protocol jig using a protocol jig class 4602 according to some embodiments. The captureProtocolJig and recreateProtocolJig should work similar to the capture and recreate functions for standard jigs. A programmer capable of implementing those would be able to implement the version for protocol jigs too.

Protocol jig instances may be referenced and stored in jigs like any other jig. When a protocol jig is referenced, its location is stored in the record references. Because it is immutable, a jig can never be in the inputs or outputs of a transaction.

The benefits of this embodiment can include:
- It allows third-party protocol data to be used in jigs
- It is a deterministic way to load any data from the blockchain
- It lets applications easily load data if there is already a protocol jig class for it The disclosure also describe the following variations to this embodiment:
- A variation where a protocol jig class's load method is passed a third parameter, loadProtocolJig, which allows it to load other protocol jigs from inside itself.
- A variation where the function used to load the protocol jig is not in the same class as the instance of the protocol jig created.
- A variation where the load method on the jig token library can load both jigs and protocol jigs.

This embodiment is different from traditional systems because to date no on-chain code has been used to deterministically create typed objects from third-party data. This is also different from traditional systems because these typed objects are usable in jigs. There exists a library that uses functions to transform data from on-chain into other forms but it does not interact with tokens.

Contract Jigs

Jigs were described as tokens or individual property. In some embodiments, in order to update a jig, an owner's permission was always required in the form of a cryptographic signature or other unlocking script. This is very useful in many scenarios, but the smart contract model also has advantages. The smart contract model allows different users to interact together to update a shared source without requiring each other user's approval. While the token use case is better for jigs, good use cases for smart contracts include virtual vending contract jigs for tokens, public bulletin boards, and other shared resources. Existing solutions on UTXO-based blockchains all require non-standard programming languages and do not interact with jigs. Also, the code for existing solutions requires the network to run the smart contract. The disclosure describes a method where users run the shared smart contract safely. The disclosure now describes how to create an object in a higher-level language that anyone may call on a UTXO-based blockchain. These objects can be called contract jigs.

In some embodiments, an example of a vending machine with 100 sodas available for purchase can include:

```
class VendingMachine extends Contract {
    init( ) {
        this.sodas=100
    }
    buy( ) {
        if (!this.sodas) throw new Error('no more drinks')
        this.sodas=this.sodas-1
        return new Soda(caller)
    }
}
class Soda extends Jig {
    init(owner) {
        this.owner=owner
    }
}
deploy(VendingMachine)
var contractJig=new VendingMachine( )
var soda=contractJig.buy( )
```

In some embodiments, contract jig objects have the following properties:
State
Behavior
Location
Type In some embodiments, they do not have individual ownership. Their behavior comes from a jig class. The VendingMachine above is a jig class that would have its own location separate from the contract jig instance. The vending machine instance's type is the jig class that it was created from. There is a way to distinguish between jig classes that are from contract jigs from those that are standard jig classes, just like there was a way to distinguish protocol jig classes from standard jig classes. The above example uses a Contract base class but other approaches are possible.

In some embodiments, contract jigs are intended to be called by many different users. Therefore, they cannot perform behavior that may cause other users problems using the shared jig. The disclosure will assume that the original contract jig definition was safe or nobody would use it. However, the jig system cannot allow users to change this jig ro negatively affect one another. Therefore, contract jigs can not be allowed to receive jigs as parameters unless they are somehow known to be safe. The same is true for storing jigs in contract jigs.

In some embodiments, contract jigs are stored differently on the blockchain than jigs. Like jigs, they have an origin and a location. They move from output to output as their state changes. However unlike jigs, their output is a special output called a covenant. Covenants are outputs in a UTXO-based blockchain with restrictions on their spending transactions. There are various ways to implement covenants including techniques like OP PUSH TX and opcodes like OP_DATASIGVERIFY. The disclosure will not prescribe a particular technique except to say that the covenant should restrict the contract jig's output so that its spend can never destroy the contract jig. This means there can always be an output for the contract jig regardless of what else is in the transaction. When there are multiple contract jig inputs, there can be multiple contract jig outputs. One way to do this is to uniquely identify every contract jig with a unique identifier and require that the identifier be present in an output every time along with the covenant code.

In some embodiments, every covenant spend requires a public key and signature from the caller. This caller is the user performing the action on the contract jig. The signature for this caller can sign the transaction like any other signature and the covenants script code should check that the signature is valid. The caller also is available as a global variable in the contract jig's high-level code. like the caller variable above. The caller variable can either be the public key for the user that called a contract jig or another contract jig instance that called the contract jig.

In some embodiments, users publish updates to contract jigs using programmable transactions just like jigs. The method calls and arguments are stored in the program just like jigs. The program describes actions on contract jigs. However unlike jigs, contract jigs cannot be destroyed with a bad method call. If a method call throws an error, then that particular action is simply cancelled. This allows many users to interact with the contract jig without destroying it. This method works on both layer 1 and layer 2 using the transformation method described in the Layer 2 section of Programmable Transactions. Additionally, contract jig output states are cached just like jig states.

Figure 47:
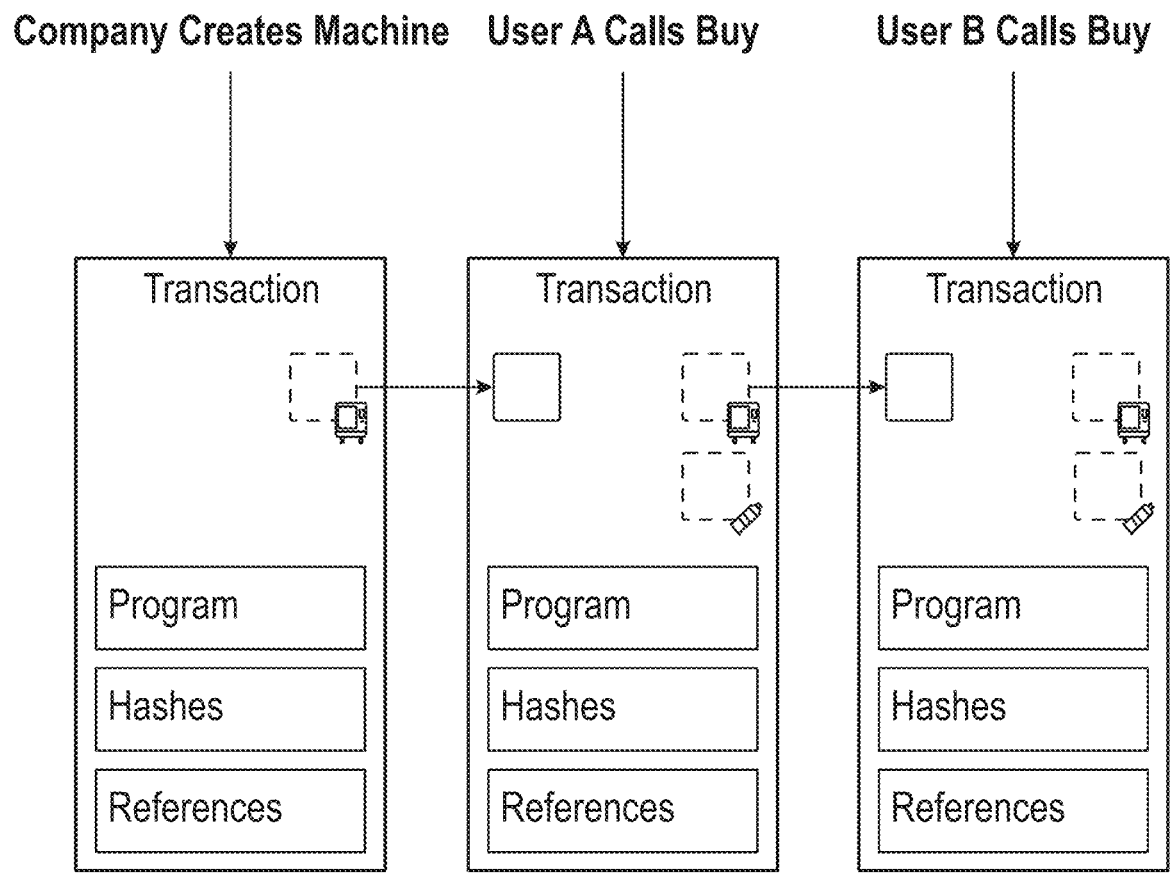
FIG. 47 illustrates an example vending machine being called by two different users to receive drinks according to some embodiments.

We also describe the following variations to this embodiment:
A variant where a normal jig may become a contract jig by setting a special property
A variant where a normal jig may become a contract jig by setting its owner to a special value
A variant where a normal jig will have the non-destroyability property of contract jigs FIG. 47 illustrates a vending machine being called by two different users to receive drinks according to some embodiments. This embodiment is different than traditional systems because it combines jig classes with the smart contract model on a UTXO-based blockchain. It allows users to run smart contracts rather than miners. It works interactively with jigs too which is also novel. Finally, nobody has proposed such a system before.

Example Applications

App Architecture

In some embodiments, there is a standard way that applications would use the jig library. The application would have a client and a server like many other applications.

In some embodiments, the client would be a website, mobile app, desktop application, etc. The client would allow the user to perform actions in the application. The user would log into the application and once logged in have access to their OWNER used to sign jigs. The user may log in using a third-party wallet in the same way that users log into sites with Google and Facebook. The jig library on the client would be configured to use the user's OWNER and it would use a STATE_CACHE that is running remotely on the application's server. The client would load and update jigs as needed. When a jig is updated, instead of broadcasting and fetching transactions from the network directly, the client would send and receive transactions through the application's server. This allows the application to know about every user action but the user's still sign and create the transactions.

Figure 48:
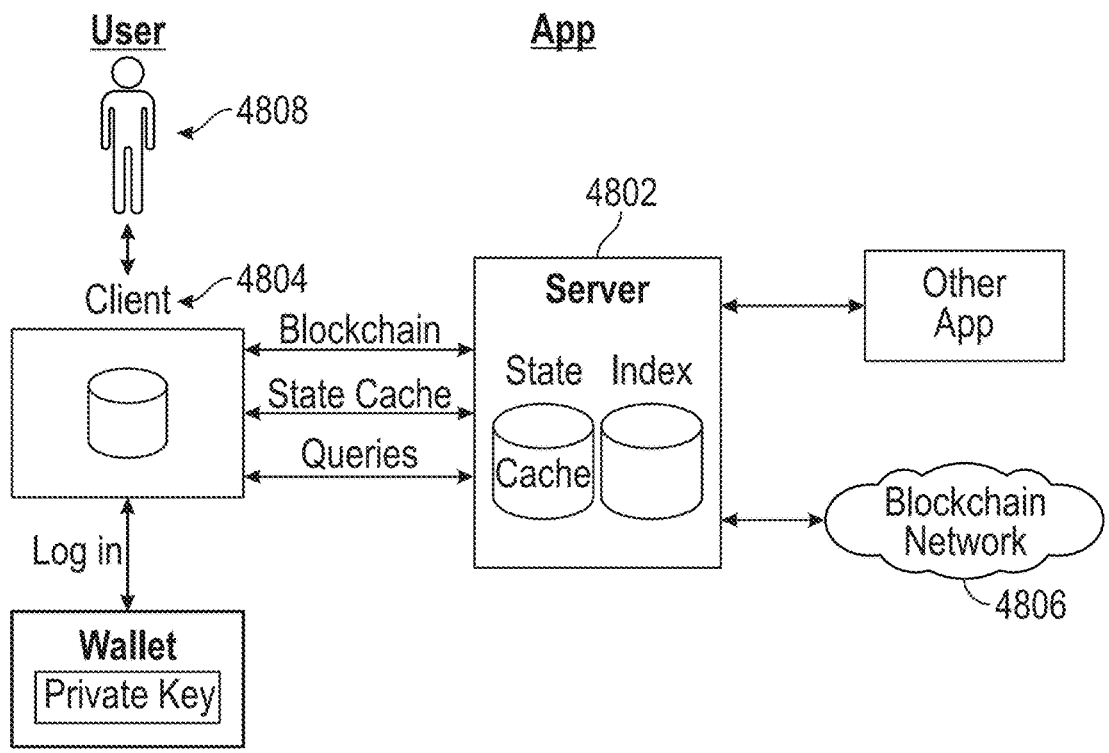
FIG. 48 illustrates an example of an overall application architecture that uses a state cache according to some embodiments.

FIG. 48 illustrates an example of an overall application architecture that uses a state cache according to some embodiments. In some embodiments, the application's server 4802 would run a state cache and load every transaction received by users. The server would authenticate clients 4804 perhaps even by having client connections sign a message using their private key. The server would broadcast transactions received from the clients to the real blockchain network 4806. The server would also index jigs so that they can be queried or searched quickly by clients with query APIs. Finally, the server may be connected to other applications that notify each other about relevant data, and upon being notified about some data relevant to the user, such as a send from one app to another, can forward that jig to the user 4808.

In some embodiments, the main benefit of this architecture is that it scales and allows users to own their data. The similarities with the traditional client-server model is intentional. The server however changes roles from being a data updater to being a data host. For many applications, this can allow the server to be hosted by a third-party and this is a potential business model for the jig library's developers. App developers may configure a server even with custom handlers when jigs are received using a web user interface and never need to host an actual server themselves. This greatly simplifies app development too.

We also describe the following variations to this embodiment:
- A variation where a third-party service is used to broadcast transactions and cache states for the application, and clients connect to that service instead of the application's server
- A variation where the client's STATE_CACHE also stores states locally and only queries the server when needed data is missing.

This embodiment is different from traditional systems because to date no applications have implemented this model. It allows individual applications to store, index, and archive their own transactions, which is not done with applications built on smart contracts.

Jig Explorer

Figure 49:
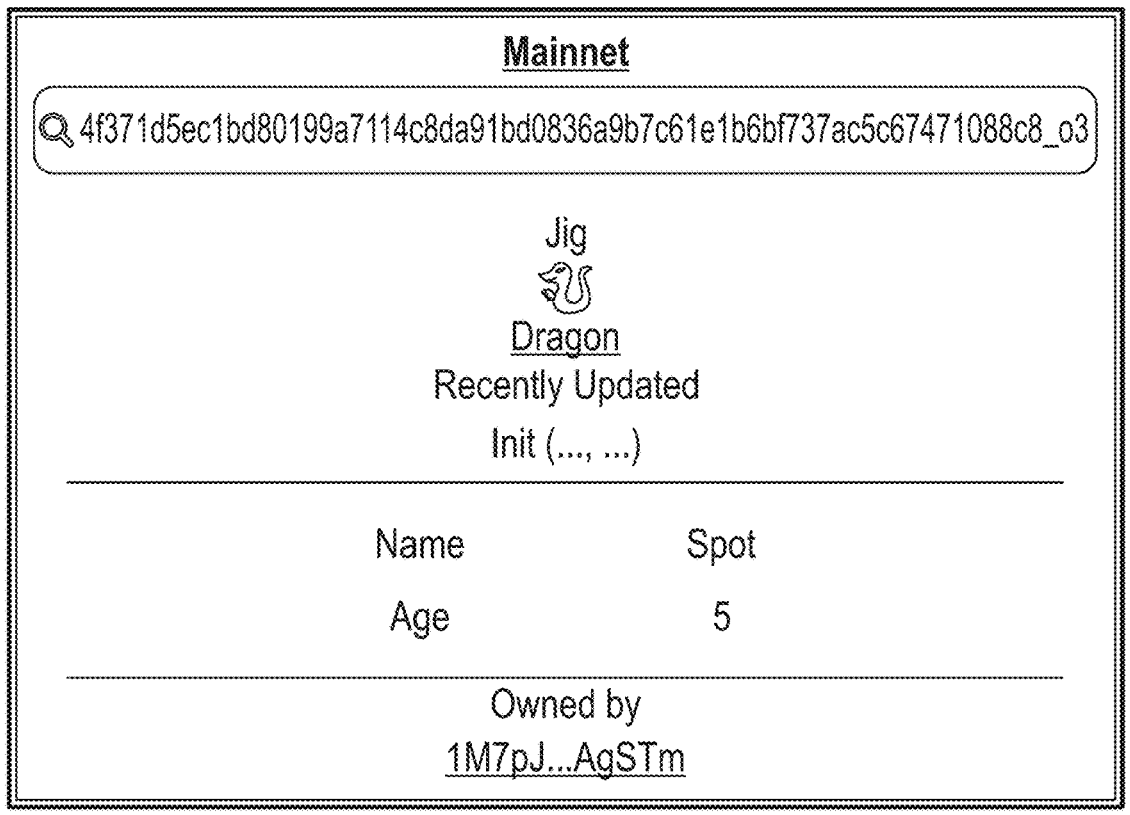
FIG. 49 illustrates an example of a jig explorer according to some embodiments.

FIG. 49 illustrates an example of a jig explorer according to some embodiments. In some embodiments, it may be useful to have a jig explorer. This jig explorer would let users paste a location of that jig and see what data the jig contains. It should allow the users to click from one jig to another jig that is being referenced. It may also provide the capability of showing all jigs owned by a particular address or public key, or all actions within a jig transaction. It might even allow the users to perform updates to the jig if the user is logged in as the owner of the jig.

In some embodiments, the explorer would use the jig library to load jigs. A state cache would likely be used by the hosting server to cache all jigs that are indexed. Optionally, the state cache on the server might only cache jigs once a user requests them. Exploring object tokens like this is novel and existing smart contract explorers do not allow the exploration of tokens, and the navigation of the relationships between them, with the same flexibility.

Jig Query Service

In some embodiments, it is possible for a service to load every jig, or every jig belonging to an application or group of applications, in order to collect and index information about those jigs. That indexed information may be used to provide search queries, fast lookups, analytics, and more. It may also be used by businesses to find information about their business data, such as how many tokens have been created of a certain kind.

In some embodiments, a service could specifically index these metrics for businesses. This is a potential business model for jig library developers. The values in the STATE_CACHE would be indexed in secondary tables that would be fast for lookups of specific data, like the owner and the class. It is possible to provide a library that exposes the results of this indexing to applications. Applications should be able to query these metrics using an SQL-like language.

This is useful because there is no general way to access indexed data from the jigs themselves. It is non-obvious because jigs are non-obvious.

EXAMPLES

In some embodiments, an example can include deploying a class, creating two instances of a class, and linking those instances together. The jig system can use layer 1 executable transactions, but these may just as well be layer 2 colored coin executable transactions. The disclosure can assume there are no fees required on this blockchain for simplicity.

In some embodiments, the user code can create a base class Weapon and a specific Sword that is a weapon. Then the jig system have a player with an attach method that allows the player to attach a Weapon instance. The jig system can create an instance of the player and the sword and then attach the sword to the player.

```
class Weapon extends Jig { }
class Sword extends Weapon { }
class Player extends Jig {
    attach(weapon) {
        if (!(weapon instanceof Weapon)) throw new Error( )
            this.weapon = weapon
    }
}
// Transaction #1
deploy(Sword)
// Transaction #2
deploy(Player, { Weapon })
---
// Transaction #3
begin( )
var sword = new Sword( )
var player = new Player( )
end( )
// Transaction #4
player.attach(sword)
```

Transaction #1—Two deploys, and no inputs or references

```
{
    "inputs": [ ],
    "references": [ ],
    "hashes": [
        "<hash1>",
        "<hash2>"
    ],
    "program": {
        "commands": [{
```

101
-continued

```
      "name": "deploy",
      "data": {
        "source": "class Weapon extends Jig { }",
        "dependencies": { },
        "props": { }
      }
    },
    {
      "name": "deploy",
      "data": {
        "source": "class Sword extends Weapon { }",
        "dependencies": {
          "Weapon": {
            "$localJigReference": 0
          }
        },
        "props": { }
      }
    }],
    "owners": ["<owner1>", "<owner2>"]
  }
}
```

Transaction #1 Outputs Generated

```
[
  {
    "kind": "class",
    "owner": "<owner1>",
    "origin": {
      "txid": null,
      "vout": 0
    },
    "nonce": 0,
    "properties": { },
    "class": null,
    "source": "class Weapon extends Jig { }",
    "dependencies": { }
  },
  {
    "kind": "class",
    "owner": "<owner2>",
    "origin": {
      "txid": null,
      "vout": 1
    },
    "nonce": 0,
    "properties": { },
    "class": null,
    "source": "class Sword extends Weapon { }",
    "dependencies": {
      "Weapon": {
        "$jigReference": {
          "txid": null,
          "vout": 0
        }
      }
    }
  }
]
```

Transaction #2

```
{
  "inputs": [ ],
  "references": [
    {
      "txid": "<tx1-hash>",
      "vout": 0
    }
  ],
  "hashes": [
    "<hash3>"
  ],
  "program": {
```

102
-continued

```
    "commands": [{
      "name": "deploy",
      "data": {
        "source": "class Player extends Jig { attach(weapon) { if (!(weapon instanceof Weapon)) throw new Error( ) this.weapon = weapon } }",
        "dependencies": {
          "Weapon": {
            "localJigReference": 0
          }
        },
        "props": { }
      }
    }],
    "owners": ["<owner3>"]
  }
}
```

Transaction #2 Outputs Generated

```
[
  {
    "kind": "class",
    "owner": "<owner3>",
    "origin": {
      "txid": null,
      "vout": 0
    },
    "nonce": 0,
    "properties": { },
    "class": null,
    "source": "class Player extends Jig { attach(weapon) { if (!(weapon instanceof Weapon)) throw new Error( ) this.weapon = weapon } }",
    "dependencies": {
      "Weapon": {
        "$jigReference": {
          "txid": "<tx1-hash>",
          "vout": 0
        }
      }
    }
  }
]
```

Transaction #3

```
{
  "inputs": [ ],
  "references": [
    {
      "txid": "<tx1-hash>",
      "vout": 0
    },
    {
      "txid": "<tx1-hash>",
      "vout": 1
    }
  ],
  "hashes": [
    "<hash4>",
    "<hash5>"
  ],
  "program": {
    "commands": [{
      "name": "instantiate",
      "data": {
        "class": {
          "$localJigReference": 0
        },
        "args": [ ]
      }
    },
    {
      "name": "instantiate",
```

```
            "data": {
                "class": {
                    "$localJigReference": 1
                },
                "args": [ ]
            }
        }],
        "owners": ["<owner4>"]
    }
}
```

Transaction #3 Outputs Generated

```
[
    {
        "kind": "instance",
        "owner": "<owner4>",
        "origin": {
            "txid": null,
            "vout": 0
        },
        "nonce": 0,
        "properties": { },
        "class": {
            "$jigReference": {
                "txid": "<tx2-hash>",
                "vout": 0
            }
        },
        "source": null,
        "dependencies": null
    },
    {
        "kind": "instance",
        "owner": "<owner5>",
        "origin": {
            "txid": null,
            "vout": 1
        },
        "nonce": 0,
        "properties": { },
        "class": {
            "$jigReference": {
                "txid": "<tx1-hash>",
                "vout": 1
            }
        },
        "source": null,
        "dependencies": null
    }
]
```

Transaction #4

```
{
    "inputs": [
        {
            "txid": "<tx3-hash>",
            "vout": 1
        }
    ],
    "references": [
        {
            "txid": "<tx2-hash>",
            "vout": 0
        },
        {
            "txid": "<tx3-hash>",
            "vout": 0
        }
    ],
    "hashes": [
        "<hash6>"
    ],
    "program": {
```

```
        "commands": [{
            "name": "call",
            "data": {
                "method": "attach",
                "args": [
                    {
                        "$localJigReference": 1
                    }
                ]
            }
        }],
        "owners": [ ]
    }
}
```

Transaction #4 Outputs Generated

```
[
    {
        "kind": "instance",
        "owner": "<owner4>",
        "origin": {
            "txid": "<tx3-hash>",
            "vout": 0
        },
        "nonce": 1,
        "properties": {
            "weapon": {
                "$jigReference": {
                    "txid": "<tx3-hash>",
                    "vout": 0
                }
            }
        },
        "class": {
            "$jigReference": {
                "txid": "<tx2-hash>",
                "vout": 0
            }
        },
        "source": null,
        "dependencies": null
    }
]
```

ADDITIONAL EMBODIMENTS

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

As used herein, the terms "determine" or "determining" encompass a wide variety of actions. For example, "determining" may include calculating, computing, processing, deriving, generating, obtaining, looking up (for example, looking up in a table, a database or another data structure), ascertaining and the like via a hardware element without user intervention. Also, "determining" may include receiving (for example, receiving information), accessing (for example, accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (for example, transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, and so forth, in multiple parts.

As used herein "receive" or "receiving" may include specific algorithms for obtaining information. For example, receiving may include transmitting a request message for the information. The request message may be transmitted via a network as described above. The request message may be transmitted according to one or more well-defined, machine readable standards which are known in the art. The request message may be stateful in which case the requesting device and the device to which the request was transmitted maintain a state between requests. The request message may be a stateless request in which case the state information for the request is included within the messages exchanged between the requesting device and the device serving the request. One example of such state information includes a unique token that can be generated by either the requesting or serving device and included in messages exchanged. For example, the response message may include the state information to indicate what request message caused the serving device to transmit the response message.

As used herein "generate" or "generating" may include specific algorithms for creating information based on or using other input information. Generating may include retrieving the input information such as from memory or as provided input parameters to the hardware performing the generating. After obtained, the generating may include combining the input information. The combination may be performed through specific circuitry configured to provide an output indicating the result of the generating. The combination may be dynamically performed such as through dynamic selection of execution paths based on, for example, the input information, device operational characteristics (for example, hardware resources available, power level, power source, memory levels, network connectivity, bandwidth, and the like). Generating may also include storing the generated information in a memory location. The memory location may be identified as part of the request message that initiates the generating. In some implementations, the generating may return location information identifying where the generated information can be accessed. The location information may include a memory location, network locate, file system location, or the like.

As used herein, "activate" or "activating" may refer to causing or triggering a mechanical, electronic, or electromechanical state change to a device. Activation of a device may cause the device, or a feature associated therewith, to change from a first state to a second state. In some implementations, activation may include changing a characteristic from a first state to a second state such as, for example, changing the viewing state of a lens of stereoscopic viewing glasses. Activating may include generating a control message indicating the desired state change and providing the control message to the device to cause the device to change state.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

What is claimed is:

1. A blockchain computing system, comprising:
a computer system having a processor and a memory, the computer system configured to:
receive instructions to generate an instance of a class object;
retrieve a first transaction from a database associated with a blockchain ledger, wherein a blockchain associated with the blockchain ledger is Unspent Transaction Output (UTXO)-based, wherein the first transaction includes computer-executable instructions to generate the class object;
process the first transaction to generate a first instance of the class object, wherein the first instance comprises an occurrence of the class object, wherein characteristics of the first instance is detected by at least the class object; and
record a second transaction onto the blockchain ledger, wherein the second transaction includes computer-executable instructions to generate the first instance of the class object, wherein the second transaction has at least one or more input or a reference to at least one output of the first transaction.

2. A blockchain computing system of claim 1, wherein the computing system is further configured to:
receive a request to generate the class object;
generate the class object; and
record the first transaction onto the blockchain ledger.

3. A blockchain computing system of claim 1, wherein the blockchain is a layer 1 blockchain.

4. A blockchain computing system of claim 1, wherein the blockchain is a layer 2 protocol that operates on a layer 1 blockchain.

5. The blockchain computing system of claim 1, wherein the class object includes a class type characteristic, and instances from the class object share the same class type characteristic.

6. A blockchain method, comprising:
receiving instructions to generate a class object;
generating the class object; and
recording a first transaction onto a blockchain ledger, wherein a blockchain associated with the blockchain ledger is Unspent Transaction Output (UTXO)-based, wherein the first transaction includes computer-executable instructions to generate the class object, wherein an instance is generated from the class object and that instance includes at least one characteristic of the class object, wherein a second transaction is recorded onto the blockchain ledger that includes computer-executable instructions to generate the instance, wherein the second transaction has at least one or more input or a reference to at least one output of the first transaction.

7. The blockchain method of claim 6, wherein the class object comprises an object that defines characteristics for instances that are created for the class object.

8. The blockchain method of claim 7, wherein the characteristics include one or more functions for the corresponding instance.

9. The blockchain method of claim 7, wherein the characteristics include one or more properties for the corresponding instance.

10. The blockchain method of claim 7, wherein the characteristics include initial properties for the corresponding instance.

11. The blockchain method of claim 6, wherein the second transaction has at least one or more input of the first transaction.

12. The blockchain method of claim 6, wherein the second transaction has a reference to the at least one output of the first transaction.

13. The blockchain method of claim 6, wherein the method further comprises generating the computer-executable instructions to generate the class object.

14. The blockchain method of claim 6, wherein the instance comprises an object that includes an occurrence of the class object, wherein characteristics of the instance is determined by the class object, wherein the class object includes a class type characteristic, and instances from the class object share the same class type characteristic.

15. A non-transitory computer storage medium storing computer-executable instructions that, when executed by a processor, cause the processor to perform the following method:
receiving instructions to generate a resource type;
generating a first resource type; and
recording a first transaction onto a blockchain ledger, wherein a blockchain associated with the blockchain ledger is Unspent Transaction Output (UTXO)-based, wherein the first transaction includes computer-executable instructions to generate the first resource type, wherein a second resource type is generated from the first resource type and that second resource type includes at least one characteristic of the first resource type, wherein a second transaction is recorded onto the blockchain ledger that includes computer-executable instructions to generate the second resource type, wherein the second transaction has at least one or more input or a reference to at least one output of the first transaction.

16. The non-transitory computer storage medium of claim 15, wherein to generate the second resource type comprises deleting or modifying a prior object within the first resource type.

17. The non-transitory computer storage medium of claim 15, wherein the method further comprises determining an identifier for the second transaction in order to identify the second resource type on the blockchain ledger.

18. The non-transitory computer storage medium of claim 15, wherein the recorded computer-executable instructions to recreate the second resource type onto the blockchain ledger includes a token payment from a user providing the instructions to generate the second resource type, wherein the token payment is provided to one or more users assisting in the recordation of the second resource type onto the blockchain ledger.

19. The non-transitory computer storage medium of claim 15, wherein executing the second transaction comprises executing the first transaction and inputting the output of the first transaction as the input to the second transaction for executing the second transaction.

20. The non-transitory computer storage medium of claim 15, wherein the method further comprises:
- receiving instructions to perform a function on the second resource type;
- processing the function on the second resource type to generate an updated state for the second resource type; and
- recording a third transaction onto a blockchain ledger, wherein the third transaction include computer-executable instructions to recreate the updated state of the second resource type.

\* \* \* \* \*